(12) United States Patent
Spina et al.

(10) Patent No.: US 12,410,064 B2
(45) Date of Patent: Sep. 9, 2025

(54) PREPARATION OF SOLUBLE COMPOUNDS

(71) Applicant: EXCITON PHARMA CORP., Toronto (CA)

(72) Inventors: Carla Jehan Catherine Spina, Toronto (CA); Johanny Elizabeth Notarandrea Alfonzo, Toronto (CA)

(73) Assignee: EXCITON PHARMA CORP. (CA)

( * ) Notice: Subject to any disclaimer, the term of this patent is extended or adjusted under 35 U.S.C. 154(b) by 976 days.

(21) Appl. No.: 17/599,357

(22) PCT Filed: Apr. 9, 2020

(86) PCT No.: PCT/CA2020/050485
§ 371 (c)(1),
(2) Date: Sep. 28, 2021

(87) PCT Pub. No.: WO2020/206525
PCT Pub. Date: Oct. 15, 2020

(65) Prior Publication Data
US 2022/0177322 A1    Jun. 9, 2022

Related U.S. Application Data

(63) Continuation of application No. PCT/CA2019/050432, filed on Apr. 9, 2019.

(51) Int. Cl.
*C01G 5/00* (2006.01)
*A01N 59/16* (2006.01)
(Continued)

(52) U.S. Cl.
CPC ............. *C01G 5/006* (2013.01); *A01N 59/16* (2013.01); *B01J 23/50* (2013.01); *C01P 2006/90* (2013.01); *C08K 3/105* (2018.01)

(58) Field of Classification Search
None
See application file for complete search history.

(56) References Cited

U.S. PATENT DOCUMENTS

2008/0075860 A1   3/2008  Djokic
2012/0058169 A1*  3/2012  Olson .................. C01G 5/02
                                                       424/618
2012/0328713 A1  12/2012  Olsen et al.

FOREIGN PATENT DOCUMENTS

WO    WO-2014029013 A1 *  2/2014  ............. A01N 59/12

OTHER PUBLICATIONS

Cohen, G. and Atkinson, G. The chemistry of argentic oxide. The formation of a silver(III) complex with periodate in basic solution. Inorganic Chemistry, 1964, 3, 12, 1741-1743. (Year: 1964).*

(Continued)

*Primary Examiner* — Anthony J Zimmer
*Assistant Examiner* — Zachary John Baum
(74) *Attorney, Agent, or Firm* — Kirsten M. Oates; Rodman & Rodman LLP

(57) ABSTRACT

Oxidized metal complexes are formed using methods which adjust the pH of solutions to obtain oxidized metal complexes having particular physicochemical properties. A method for preparing an oxidized metal complex includes providing a first solution comprising a highly oxidized metal and having a pH between 0 to 7; providing a second solution comprising one or more ligands or a ligand precursor and having a pH between 7 to 13 or greater; and combining the first solution and the second solution to form a third solution comprising the first oxidized metal complex. A method for preparing an oxidized metal complex includes providing a species solution comprising a first oxidized metal complex and having a pH of at least pH 11; and adjusting the pH of the species solution to form a second oxidized metal com- (Continued)

plex. Compositions and methods for preparing and using same are provided.

13 Claims, 18 Drawing Sheets

(51) Int. Cl.
  *B01J 23/50* (2006.01)
  *C08K 3/105* (2018.01)

(56) References Cited

OTHER PUBLICATIONS

Masse, R., et al. An inorganic complex of silver(III): K5Ag(IO5OH)2•8H2O. Journal of Solid State Chemistry, 1982, 14, 201-207. (Year: 1982).*
Cohen and Atkinson, "The Chemistry of Argentic Oxide. The Formation of a Silver (III) Complex with Periodate in Basic Solution." Inorg. Chem., Dec. 1964, 3, 12, 1741-1743.
Masse, R. et al., "An inorganic complex of silver (III): K5Ag(IO5OH)2*8H2O." Journal of Solid State Chemistry, 1982, 44, 201-207.
Kirschenbaum, L.J. et al., "Polypeptide complexes of silver (III)." Journal of the American Chemical Society, 1984, 106, 1003-1010.

* cited by examiner

PREPARATION OF SOLUBLE COMPOUNDS

CROSS-REFERENCE TO RELATED APPLICATIONS

This application is a U.S. national stage patent application of International Patent Application No. PCT/CA2020/050485, filed on Apr. 9, 2020, which claims the benefit of Patent Cooperation Treaty Application No. PCT/CA2019/050432, filed Apr. 9, 2019, the entirety of which is incorporated by reference (where permitted).

TECHNICAL FIELD

The present invention relates to oxidized metal complexes, compositions comprising same, and methods for preparing and using same. The oxidized metal complexes may be periodate metal complexes.

BACKGROUND OF THE INVENTION

An oxidized metal complex refers to a coordination complex consisting of a metal atom surrounded by bound molecules, atoms, or ion, with the metal having been subjected to oxidation or loss of electrons during a reaction by a molecule, atom, or ion. Depending on the selected metal, oxidized metal complexes may exhibit various physicochemical properties.

However, the prior art reports numerous challenges in developing and producing oxidized metal complexes, particularly those including metals in "high" oxidation states of (II) or greater. Certain oxidized metal complexes may be subjected to accelerated degradation in acidic media, or decompose in air, necessitating handling under argon to prevent degradation. Further, addition of periodate to form oxidized metal complexes typically requires a highly basic environment which adversely affects yields and limits the stability of the oxidized metal complexes. The oxidized metal complexes produced in this manner may have a short half-life in slightly basic, neutral, and acidic media (or less basic environments).

Particular metals (such as silver) exhibit antimicrobial properties, and may thus be incorporated into medical solutions, devices, and dressings. However, due to the instability and insufficient yields of complexes of silver (II and III) using conventional production methods, the applications of silver (II and III) complexes have been sorely limited.

There is thus a need in the art for the development of oxidized metal complexes having improved physicochemical properties (for example, greater stability and yield), and for efficient production processes for same to render the improved oxidized metal complexes suitable for industrial and commercial applications.

SUMMARY OF THE INVENTION

The present invention relates to oxidized metal complexes, compositions comprising same, and methods for preparing and using same. The methods may comprise modifying the pH of solutions to form desired oxidized metal complexes exhibiting various physicochemical properties, particularly stability and yield, rendering them suitable for industrial and commercial applications. Notably, the pH of solutions used in the present invention may be atypical compared to the pH of solutions used in the prior art which report accelerated degradation, instability, and poor yield of oxidized metal complexes obtained in solutions having such pH.

In the various embodiments, the methods may comprise transforming a first oxidized metal complex into a second oxidized metal complex by adjusting the pH of a solution comprising the first oxidized metal complex. In the various embodiments, the oxidized metal complexes may be periodate metal complexes. In the various embodiments, the oxidized metal complexes may be diperiodate metal complexes.

In the various embodiments, the oxidized metal complexes may be silver periodate complexes. In the various embodiments, the oxidized metal complexes may be silver diperiodate complexes. In the various embodiments, the oxidized metal complexes may be alkali metal silver periodate complexes. In the various embodiments, the oxidized metal complexes may be alkali metal silver diperiodate complexes. In the various embodiments, the oxidized metal complexes may be potassium silver periodate complexes. In the various embodiments, the oxidized metal complexes may be potassium silver diperiodate complexes. In the various embodiments, the oxidized metal complexes may be sodium silver periodate complexes. In the various embodiments, the oxidized metal complexes may be sodium silver diperiodate complexes.

In the various embodiments, the oxidized metal complexes may be alkaline earth metal silver periodate complexes. In the various embodiments, the oxidized metal complexes may be alkaline earth metal silver diperiodate complexes. In the various embodiments, the oxidized metal complexes may be calcium silver periodate complexes. In the various embodiments, the oxidized metal complexes may be calcium silver diperiodate complexes. In the various embodiments, the oxidized metal complexes may be magnesium silver periodate complexes. In the various embodiments, the oxidized metal complexes may be magnesium silver diperiodate complexes. In the various embodiments, the oxidized metal complexes may be barium silver periodate complexes. In the various embodiments, the oxidized metal complexes may be barium silver diperiodate complexes.

Broadly stated, in a first aspect, the invention comprises a method for preparing an oxidized metal complex, comprising: a) providing a first solution comprising a highly oxidized metal and having a pH between 0 to 7; b) providing a second solution comprising one or more ligands or a ligand precursor and having a pH between 7 to 13 or greater; and c) combining the first solution and the second solution to form a third solution comprising the first oxidized metal complex. In the various embodiments, the pH of the third solution may have a pH ranging from 7 to 13 or greater.

In the various embodiments, the method may further comprise purifying the first oxidized metal complex in solid form from the third solution.

In the various embodiments, the first oxidized metal complex may be a periodate metal complex. In the various embodiments, the first oxidized metal complex may be a diperiodate metal complex. In the various embodiments, the first oxidized metal complex may be a silver periodate complex. In the various embodiments, the first oxidized metal complex may be a silver diperiodate complex. In the various embodiments, the first oxidized metal complex may be a potassium silver periodate complex. In the various embodiments, the first oxidized metal complex may be a potassium silver diperiodate complex. In the various embodiments, the first oxidized metal complex may be a sodium silver periodate complex. In the various embodiments, the first oxidized metal complex may be a sodium silver diperiodate complex.

In the various embodiments, the first oxidized metal complex may be a calcium silver periodate complex. In the various embodiments, the first oxidized metal complex may be a calcium silver diperiodate complex. In the various embodiments, the first oxidized metal complex may be a magnesium silver periodate complex. In the various embodiments, the first oxidized metal complex may be a magnesium silver diperiodate complex. In the various embodiments, the first oxidized metal complex may be a barium silver periodate complex. In the various embodiments, the first oxidized metal complex may be a barium silver diperiodate complex. In the various embodiments, the first oxidized metal complex may be a silver periodate complex comprising an alkali metal cation and an alkaline earth metal cation. In the various embodiments, the first oxidized metal complex may be a silver diperiodate complex comprising an alkali metal cation and an alkaline earth metal cation.

In the various embodiments, the method may be an in situ or one-pot method.

In the various embodiments, the first solution may be formed by reacting a low oxidation state metal with an oxidizing means in an aqueous solution. In the various embodiments, the oxidizing means may be selected from an oxidizing agent, an electrochemical assembly, or a combination thereof. In the various embodiments, the oxidizing agent may be selected from a persulfate, permanganate, periodate, perchlorate, peroxide, salt thereof, or combinations thereof, or ozone.

In the various embodiments, the concentration of the oxidizing agent may range from about 0.01 mM to about 4.0 M. In the various embodiments, the reaction of the low oxidation state metal and the oxidizing agent may be conducted at a temperature ranging from about 0° C. to about 100° C. for about 0 minutes to about 90 minutes.

In the various embodiments, the low oxidation state metal may be selected from silver, gold, copper, lead, ruthenium, molybdenum, iron, manganese, cobalt, platinum, lead, osmium, tungsten, nickel, cerium, low oxidation state salts thereof selected from $HCO_3^-$, $BF_4^-$, $CO_3^{2-}$, $NO_3^-$, $ClO_4^-$, $SO_4^{2-}$, $F^-$, $Br^-$, $C_3H_3O_2^-$, $NH_3$, $MnO_4^-$, $NO_2^-$, $BrO_3^-$, $IO_3^-$, $Cr_2O_7^{2-}$, $OH^-$, $ClO_3^-$, $HCO_2^-$, or combinations thereof. In the various embodiments, the concentration of the low oxidation state metal in the aqueous solution may range from about 0.01 mM to about 2.0 M.

In the various embodiments, the highly oxidized metal may be selected from oxidized silver, gold, copper, lead, ruthenium, molybdenum, iron, manganese, cobalt, platinum, lead, osmium, tungsten, nickel, cerium, and combinations thereof.

In the various embodiments, the highly oxidized metal may be selected from silver fluoride, silver bipyridine, silver carbamate, silver pyridinecarboxylic acid, a silver porphyrin, silver biguanide, a silver oxide including AgO, $Ag_2O_2$, $Ag_4O_4$, $Ag_2O_3$, $Ag_3O_4$, $Ag_7O_8X$, wherein X comprises $HCO_3^-$, $BF_4^-$, $CO_3^{2-}$, $NO_3^-$, $ClO_4^-$, $SO_4^{2-}$, $F^-$, or a combination thereof.

In the various embodiments, one or more ligands may be selected from a tellurate, iodate, periodate, phosphate, borate, carbonate, ammonium hydroxide, ammonium carbonate, ammonium sulfate, arsenate, dithiocarbamate, aliphatic dithioloate, aromatic dithioloate, selenium ligand, sulfur ligand, ethylenediaminetetraacetic acid, imine ligand, oxime ligand, dimethylglyoxime, macrocylic amine, porphyrin, tetraazacyclohexadiene, pyridine, pyrazine, bipyridyl, phenanthroline, dimethylphosphine, dimethylarsine, dibutylthiourea, ethylenediimine, polypeptide, guanide, biguanide, polyguanide, phosphine, arsine, and combinations thereof. In the various embodiments, one or more ligands may be selected from an iodate or a periodate.

In the various embodiments, the first oxidized metal complex may be a periodate metal complex. In the various embodiments, the first oxidized metal complex may be a diperiodate metal complex. In the various embodiments, the first oxidized metal complex may be a silver periodate complex. In the various embodiments, the first oxidized metal complex may be a silver diperiodate complex. In the various embodiments, the first oxidized metal complex may be a potassium silver periodate complex. In the various embodiments, the first oxidized metal complex may be a potassium silver diperiodate complex. In the various embodiments, the first oxidized metal complex may be a sodium silver periodate complex. In the various embodiments, the first oxidized metal complex may be a sodium silver diperiodate complex. In the various embodiments, the first oxidized metal complex may be a calcium silver periodate complex. In the various embodiments, the first oxidized metal complex may be a calcium silver diperiodate complex. In the various embodiments, the first oxidized metal complex may be a magnesium silver periodate complex. In the various embodiments, the first oxidized metal complex may be a magnesium silver diperiodate complex. In the various embodiments, the first oxidized metal complex may be a barium silver periodate complex. In the various embodiments, the first oxidized metal complex may be a barium silver diperiodate complex.

In the various embodiments, the concentration of the ligand may range from about 0.02 mM to about 4.0 M, and the concentration of the highly oxidized metal may range from about 0.01 mM to about 2.0 M. In the various embodiments, the reaction of the highly oxidized metal and the ligand may be conducted at a temperature ranging from about 0° C. to about 100° C. for about 10 minutes to about 48 hours.

In the various embodiments, hydroxide ions may be present in the third solution at a concentration ranging from about 0.01 mM to about 11 M.

In the various embodiments, the method further comprises adding an alkali metal, alkaline earth metal, or both to one or more of the first solution, the second solution, and the third solution. In the various embodiments, the alkali metal is selected from lithium, sodium, potassium, rubidium, cesium, francium, or salts thereof selected from $O^{2-}$, $Cl^-$, $Br^-$, $F^-$, $I^-$, $CrO_4^{2-}$, $CN^-$, $PO_2^{3-}$, $S_2O_5^{2-}$, $C_2O_4^{2-}$, $IO_4^-$, $P_2O_7^{4-}$, $SO_4^{2-}$, $B_4O_7^{2-}$, $HCO_3^-$, $BF_4^-$, $CO_3^{2-}$, $NO_3^-$, $ClO_4^-$, $SO_4^{2-}$, $F^-$, $Br^-$, $C_3H_3O_2^-$, $NH_4^-$, $MnO_4^-$, $NO_2^-$, $BrO_3^-$, $IO_3^-$, $Cr_2O_7^{2-}$, $OH^-$, $ClO_3^-$, $HCO_2^-$, or combinations thereof. In the various embodiments, the alkaline earth metal is selected from beryllium, magnesium, calcium, strontium, barium, radium, or salts thereof selected from $O^{2-}$, $Cl^-$, $Br^-$, $F^-$, $I^-$, $CrO_4^{2-}$, $CN^-$, $PO_2^{3-}$, $S_2O_5^{2-}$, $C_2O_4^{2-}$, $IO_4^-$, $P_2O_7^{4-}$, $SO_4^{2}$, $B_4O_7^{2-}$, $HCO_3^-$, $BF_4^-$, $CO_3^{2-}$, $NO_3^-$, $ClO_4^-$, $SO_4^{2-}$, $F^-$, $Br^-$, $C_3H_3O_2^-$, $NH_4^-$, $MnO_4^-$, $NO_2^-$, $BrO_3^-$, $IO_3^-$, $Cr_2O_7^{2-}$, $OH^-$, $ClO_3^-$, $HCO_2^-$, or combinations thereof.

In a second aspect, the invention comprises a method for preparing an oxidized metal complex comprising: a) providing a species solution comprising a first oxidized metal complex and having a pH of at least pH 11; and b) adjusting the pH of the species solution to form a second oxidized metal complex. In the various embodiments, the method may further comprise adjusting one or more of pH, temperature, concentration, or combinations thereof so that the second oxidized metal complex exhibits one or more desired properties. In the various embodiments, the pH may be adjusted to between pH 2.0 to 11. In the various embodiments, one or more properties may be selected from morphology, crystalline size, stability, rate of dissolution, and flowability.

In the various embodiments, the first oxidized metal complex, the second oxidized metal complex, or both may be periodate metal complexes. In the various embodiments, the first oxidized metal complex, the second oxidized metal complex, or both may be diperiodate metal complexes. In the various embodiments, the first oxidized metal complex, the second oxidized metal complex, or both may be silver periodate complexes. In the various embodiments, the first oxidized metal complex, the second oxidized metal complex, or both may be silver diperiodate complexes.

In the various embodiments, the first oxidized metal complex, the second oxidized metal complex, or both may be potassium silver periodate complexes. In the various embodiments, the first oxidized metal complex, the second oxidized metal complex, or both may be potassium silver diperiodate complexes. In the various embodiments, the first oxidized metal complex, the second oxidized metal complex, or both may be sodium silver periodate complexes. In the various embodiments, the first oxidized metal complex, the second oxidized metal complex, or both may be sodium silver diperiodate complexes. In the various embodiments, the first oxidized metal complex, the second oxidized metal complex, or both may be calcium silver periodate complexes. In the various embodiments, the first oxidized metal complex, the second oxidized metal complex, or both may be calcium silver diperiodate complexes. In the various embodiments, the first oxidized metal complex, the second oxidized metal complex, or both may be magnesium silver periodate complexes. In the various embodiments, the first oxidized metal complex, the second oxidized metal complex, or both may be magnesium silver diperiodate complexes. In the various embodiments, the first oxidized metal complex, the second oxidized metal complex, or both may be barium silver periodate complexes. In the various embodiments, the first oxidized metal complex, the second oxidized metal complex, or both may be barium silver diperiodate complexes.

In the various embodiments, the method further comprises adding an alkali metal, alkaline earth metal, or both to one or more of the first solution, the second solution, and the third solution. In the various embodiments, the alkali metal is selected from lithium, sodium, potassium, rubidium, cesium, francium, or salts thereof selected from $O^{2-}$, $Br^-$, $F^-$, $I^-$, $CrO_4^{2-}$, $CN^-$, $PO_2^{3-}$, $S_2O_5^{2-}$, $C_2O_4^{2-}$, $IO_4^-$, $P_2O_7^{4-}$, $SO_4^{2-}$, $B_4O_7^{2-}$, $HCO_3^-$, $BF_4^-$, $CO_3^{2-}$, $NO_3^-$, $ClO_4^-$, $SO_4^{2-}$, $F^-$, $Br^-$, $C_3H_3O_2^-$, $NH_4^+$, $MnO_4^-$, $NO_2^-$, $BrO_3^-$, $IO_3^-$, $Cr_2O_7^{2-}$, $OH^-$, $ClO_3^-$, $HCO_2^-$, or combinations thereof. In the various embodiments, the alkaline earth metal is selected from beryllium, magnesium, calcium, strontium, barium, radium, or salts thereof selected from $O^{2-}$, $Br^-$, $F^-$, $CrO_4^{2-}$, $CN^-$, $PO_2^-$, $S_2O_5^{2-}$, $C_2O_4^{2-}$, $IO_4^-$, $P_2O_7^{4-}$, $SO_4^{2-}$, $B_4O_7^{2-}$, $HCO_3^-$, $BF_4^-$, $CO_3^{2-}$, $NO_3^-$, $ClO_4^-$, $SO_4^{2-}$, $F^-$, $Br^-$, $C_3H_3O_2^-$, $NH_4^+$, $MnO_4^-$, $NO_2^-$, $BrO_3^-$, $IO_3^-$, $Cr_2O_7^{2-}$, $OH^-$, $ClO_3^-$, $HCO_2^-$, or combinations thereof.

In a third aspect, the invention comprises an oxidized metal complex formed by above methods.

In a fourth aspect, the invention comprises a composition comprising the oxidized metal complex formed by the above methods, and one or more excipients.

In a fifth aspect, the invention comprises an article of manufacture comprising one or more oxidized metal complexes formed by the above methods.

In a sixth aspect, the invention comprises an article of manufacture which may be formed by depositing one or more oxidized metal complexes on or within the article of manufacture. In the various embodiments, the one or more oxidized metal complexes are deposited by precipitating the one or more oxidized metal complexes on or within the article of manufacture by modifying the pH of a solution comprising the one or more oxidized metal complexes. In the various embodiments, the pH of the solution may be adjusted from pH 11 or greater to a pH between 2.0 to 8.5. In the various embodiments, the one or more oxidized metal complexes are deposited by immersing the article of manufacture in a solution comprising the one or more oxidized metal complexes, and evaporating the solution.

In a seventh aspect, the invention comprises use of the oxidized metal complex formed by the above methods for antimicrobial, antifungal, anti-biofilm, catalytic, or oxidizing activity; acid base titration; or buffering.

Additional aspects and advantages of the present invention will be apparent in view of the description, which follows. It should be understood, however, that the detailed description and the specific examples, while indicating preferred embodiments of the invention, are given by way of illustration only, since various changes and modifications within the spirit and scope of the invention will become apparent to those skilled in the art from this detailed description.

BRIEF DESCRIPTION OF DRAWINGS

Embodiments of the invention will now be described with reference to the accompanying drawings, in which:

(FIG. 6A), ambient room temperature (FIG. 6B), and 4° C. (FIG. 6C) over 75 days.

DETAILED DESCRIPTION

Figure 1:
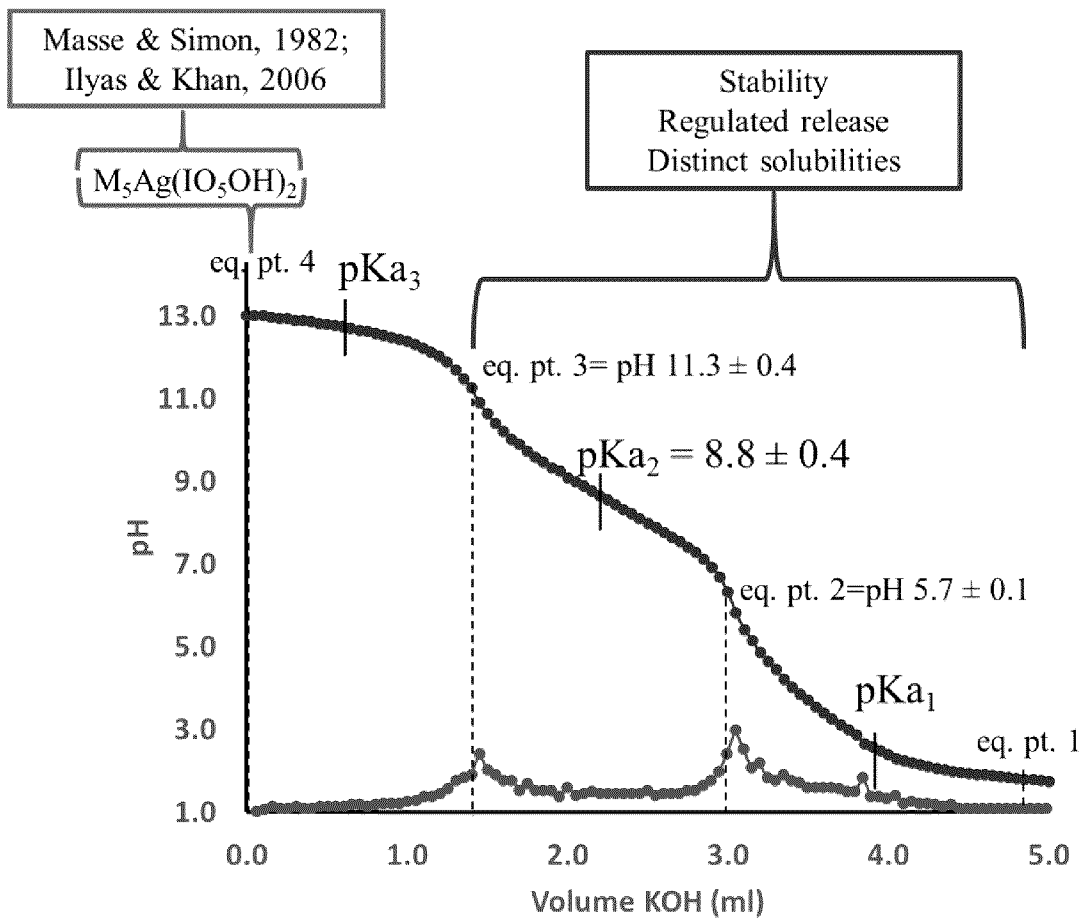
FIG. 1 is a graph showing an acid-base titration curve for a solution comprising JN300118-1.

Unless defined otherwise in this specification, all technical and scientific terms are used herein according to their conventional definitions as they are commonly used and understood by those of ordinary skill in the art of synthetic chemistry, pharmacology and cosmetology.

The present invention comprises oxidized metal complexes, compositions comprising same, and methods for preparing and using same. The oxidized metal complexes may be periodate metal complexes. The oxidized metal complexes may be silver periodate complexes. The oxidized metal complexes may be silver diperiodate complexes. In the various embodiments, the oxidized metal complexes may be potassium silver periodate complexes. In the various embodiments, the oxidized metal complexes may be potassium silver diperiodate complexes.

In the various embodiments, the oxidized metal complexes may be sodium silver periodate complexes. In the various embodiments, the oxidized metal complexes may be sodium silver diperiodate complexes. In the various embodiments, the oxidized metal complexes may be calcium silver periodate complexes. In the various embodiments, the oxidized metal complexes may be calcium silver diperiodate complexes. In the various embodiments, the oxidized metal complexes may be magnesium silver periodate complexes. In the various embodiments, the oxidized metal complexes may be magnesium silver diperiodate complexes. In the various embodiments, the oxidized metal complexes may be barium silver periodate complexes. In the various embodiments, the oxidized metal complexes may be barium silver diperiodate complexes.

The methods may comprise modifying the pH of solutions to form desired oxidized metal complexes exhibiting various physicochemical properties, particularly yield and stability. As used herein, the term "physicochemical properties" refers to both physical and chemical properties, changes, and reactions according to physical chemistry including, but not limited to, stability, solubility, and efficacy as antimicrobial, antifungal, anti-biofilm, catalytic, oxidizing, acid-base titration, or buffering agents.

First and Second Oxidized Metal Complexes and their Preparation
i) Method for Preparing First Oxidized Metal Complexes In a first aspect, the present invention comprises a method for preparing an oxidized metal complex. The method generally comprises: a) providing a first solution comprising a highly oxidized metal and having a pH between 0 to 7; b) providing a second solution comprising one or more ligands or a ligand precursor and having a pH between 7 to 13 or greater; and c) combining the first solution and the second solution to form a third solution comprising the first oxidized metal complex. In the various embodiments, the third solution may have a pH ranging from 7 to 13 or greater. In the various embodiments, the method may be an in situ or one-pot method. As used herein, the term "in situ" or "one-pot" refers to a method of conducting chemical reactions in a single reactor.

The prior art reports that certain oxidized metal complexes may be subjected to accelerated degradation in acidic media. Further, addition of periodate to form oxidized metal complexes typically requires a basic environment having a pH greater than 11 which limits yields. Surprisingly, it was found that the combination of the first and second solutions having specific pH yielded unexpected results. In the various embodiments, the first solution may comprise a highly oxidized metal and may have a pH between 0 to 7. The first solution may increase the yield of the first oxidized metal complex in comparison to methods which are performed exclusively with a pH above 7. In the various embodiments, the pH of the first solution may be less than 2, or even less than 1.5 in order to maximize the yield. In addition, the second solution comprising one or more ligands or a ligand precursor and having a pH between 7 to 13 or greater does not appear to affect the yield adversely regardless of the resulting increased pH of the third solution. In the various embodiments, the first oxidized metal complex may be obtained with a yield ranging between about 60% to about 85% or greater.

The first solution may be formed by reacting a low oxidation state metal and an oxidizing means. As used herein, the term "metal" refers to a metal element in the form of a metallic form, alloy, ion, or compound. In the various embodiments, the metal may comprise a transition, lanthanide, or actinide metal in an oxidized state greater than a metallic state. As used herein, the term "metallic state" as pertaining for example, to silver, means silver Ag(0) where the metal may lose electrons to form cations in a variety of oxidation states. In the various embodiments, the metal may comprise silver, gold, copper, lead, ruthenium, molybdenum, iron, manganese, cobalt, platinum, lead, osmium, tungsten, nickel, cerium, or mixtures of such metals with the same or different metals, with silver being most preferred.

As used herein, the term "low oxidation state" metal refers to a metal in an oxidation state of (I). Low oxidation state salts or complexes of the metals may include, but are not limited to, $HCO_3^-$, $BF_4^-$, $CO_3^{2-}$, $NO_3^-$, $ClO_4^-$, $SO_4^{2-}$, $F^-$, $Br^-$, $C_3H_5O_2^-$, $NH_3$, $MnO_4^-$, $NO_2^-$, $BrO_3^-$, $IO_3^-$, $Cr_2O_7^{2-}$, $OH^-$, $ClO_3^-$, $HCO_2^-$. Most preferably, salts of silver are in the nitrate form.

In the various embodiments, the metal may be oligodynamic or exhibit antimicrobial, antifungal, and anti-biofilm properties. In the various embodiments, the oligodynamic metal may be copper or silver.

In the various embodiments, the metal may exhibit complementary catalytic properties, such as for example, base-catalyzed oxidation resulting in the degradation of polysaccharides and metal catalyzed Fenton-like reactions may occur via reactive oxygen species, which can oxidize organic compounds including carbohydrates, amino acids, DNA, etc.

In the various embodiments, the metal may be dissolved or dispersed in an inert solvent to form a metal solution. As used herein, the term "inert solvent" refers to a solvent which does not react substantially with the metal in solution. Preferably, the solvent may be water. In the various embodiments, the water may be reverse osmosis water. As used herein, the term "reverse osmosis water" refers to pure water from which impurities have been removed. In the various embodiments, the concentration of the metal in the inert solvent may range from about 0.01 mM to about 2.0 M, more preferably from about 1 mM to about 0.6 M, and most preferably from about 10 mM to about 0.3 M.

In the various embodiments, the oxidizing means may be selected from a chemical oxidizing agent, an electrochemical oxidation assembly, or a combination thereof. As used herein, the term "oxidizing agent" means a substance which has the ability to oxidize other substances or cause them to lose electrons. Preferably, the oxidizing agent may be compatible with the metal and exhibit sufficient oxidation potential to change the valence state of the metal. Suitable oxidizing agents may include, but are not limited to, persulfates, permanganates, periodates, perchlorates, peroxides, and combinations thereof. In the various embodiments, the oxidizing agent may comprise a persulfate or a persulfate salt of sodium, potassium, ammonium, and combinations thereof. In the various embodiments, the oxidizing agent may comprise potassium persulfate. In the various embodiments, the oxidizing agent may comprise sodium persulfate. In the various embodiments, the oxidizing agent may comprise ozone which may be fed into the reaction solution through saturation of the solution or continuous feed throughout the duration of the reaction.

In the various embodiments, the oxidizing means may comprise an electrochemical oxidation assembly which polarizes a working electrode. In the various embodiments, the working electrode may be polarized to a potential ranging between 0.6 to 2.1 vs. a standard hydrogen electrode (SHE), and more preferably between 1.74 to 1.77 vs. SHE. As used herein, the SHE is the reference from which all standard reduction potentials are determined, with hydrogen's standard electrode potential being 0.0 V at all temperatures for comparison with other electrode reactions.

In the various embodiments, the oxidizing agent may be provided in a stoichiometrically appropriate amount relative to the number of ions of the metal. In the various embodiments, the concentration of the oxidizing agent may range from about 0.01 mM to about 4.0 M, more preferably between about 2 mM to about 1.2 M, and most preferably between about 20 mM to about 0.6 M.

The reaction between the metal and oxidizing agent may be conducted at a specified temperature and duration. The temperature may be selected to accelerate oxidation of the metal or formation of secondary oxidized metal complexes. Lesser oxidized metal complexes may form at a temperature above ambient conditions. In the various embodiments, the temperature may range from about 0° C. to about 100° C., more preferably from about 10° C. to about 90° C., and most preferably from about 25° C. to about 65° C.

In the various embodiments where the reaction is conducted at room temperature, the duration may range from about 0 minutes to about 90 minutes, more preferably from about 10 minutes to about 1 hour, and most preferably from about 20 minutes to about 30 minutes. In the various embodiments where the reaction is conducted at elevated temperatures of 40° C., the duration may range from about 0 minutes to about 30 minutes, more preferably from about 2 minutes to about 20 minutes, and most preferably from 5 minutes to 15 minutes. Without being bound by any theory, the duration of the reaction may impact the yield of the highly oxidized metal and concentration of reaction by-products, thereby influencing the pH and resultant yield of the first oxidized metal complex.

As used herein, the term "oxidized metal complex" refers to a coordination complex consisting of a central metal atom surrounded by bound molecules, atoms, or ions, the metal having been subjected to oxidation or loss of electrons during a reaction by a molecule, atom, or ion.

In the various embodiments, the reaction between the metal and the oxidizing agent may form the first solution comprising a highly oxidized metal and having a pH between 0 and 7. In the various embodiments, the pH of the first solution may be adjusted to provide a pH between 0 and 7. As used herein, the term "highly oxidized metal" refers to oxidized silver, gold, copper, lead, ruthenium, molybdenum, iron, manganese, cobalt, platinum, lead, osmium, tungsten, nickel, cerium, and combinations thereof, with silver being most preferred. High oxidation state salts or complexes of the aforementioned metals may include, but are not limited to, $Ag_7O_8X$, $HCO_3^-$, $BF_4^-$, $CO_3^{2-}$, $NO_3^-$, $ClO_4^-$, $SO_4^{2-}$, $F^-$, $Br^-$, $C_3H_3O_2^-$, $NH_3$, $MnO_4^-$, $NO_2^-$, $BrO_3^-$, $IO_3^-$, $Cr_2O_7^{2-}$, $OH^-$, $ClO_3^-$, $HCO_2^-$. Most preferably, salts of argentic oxides are in the nitrate form.

As used herein, the term "high oxidation state" metal refers to a metal in an oxidation state of (II) or greater. In the various embodiments, the metal may comprise silver, gold, copper, lead, ruthenium, molybdenum, iron, manganese, cobalt, platinum, lead, osmium, tungsten, nickel, cerium, and combinations thereof in an oxidation state of (II) of greater.

In the various embodiments, the metal may comprise silver with at least one element in a high oxidation state of silver Ag(II) or Ag(III) oxidation states or a combination thereof. These oxidized species include, but are not limited to, silver fluoride, silver bipyridine, silver carbamate, silver pyridinecarboxylic acid, a silver porphyrin, silver biguanide, a silver oxide including AgO, $Ag_2O_2$, $Ag_4O_4$, $Ag_2O_3$, $Ag_3O_4$, $Ag_7O_8X$, wherein X comprises $HCO_3^-$, $BF_4^-$, $CO_3^{2-}$, $NO_3^-$, $ClO_4^-$, $SO_4^{2-}$, $F^-$, or a combination thereof.

In the various embodiments, the second solution may comprise one or more ligands or a ligand precursor and having a pH between 7 to 13 or greater. The second solution may be formed by dissolving one or more ligands or a ligand precursor in an aqueous solution. In the various embodiments, the pH of the second solution may be adjusted to optimize the solubility of the ligand.

As used herein, the term "ligand" refers to an ion or molecule that binds to a metal to form a metal complex. The ligand may donate electrons to the metal to achieve dative, covalent, or ionic bonding on one site (unidentate), two sites (bidentate), or more than two sites (multidentate). The ligand may thereby stabilize the high oxidation state metal complex. Suitable ligands may include, but are not limited to, tellurates, iodates, periodates, phosphates, borates, carbonates, ammonium hydroxide, ammonium carbonate, ammonium sulfate, arsenates, dithiocarbamate, aliphatic dithioloate, aromatic dithioloate, selenium ligand, sulfur ligand, ethylenediaminetetraacetic acid, imine ligand, oxime ligand, dimethylglyoxime, macrocyclic amine, porphyrin, tetraazacyclohexadiene, pyridine, pyrazine, bipyridyl, phenanthroline, dimethylphosphine, dimethylarsine, dibutylthiourea, ethylenediimine, polypeptide, guanide, biguanide, polyguanide, phosphine, arsine, and combinations thereof. In the various embodiments, the ligand may be potassium iodate or potassium periodate.

In the various embodiments, the ligand may be selected to yield a square planar configuration with the metal, with the one edge of the ligand contributing to the planar geometry of the metal, as in the case of octahedral ligands such as tellurates or periodates, or in the case of planar, monodentate, divalent, or multidentate ligand coordination including amine compounds including, but not limited to, ammonium hydroxide, ammonium carbonate, ammonium nitrate, macrocylic amine, porphyrin, tetraazacyclohexadiene, pyridine, pyrazine, bipyridyl, phenanthroline, ethylenediimine, polypeptide, guanide, biguanide, polyguanide, and combinations thereof.

In the various embodiments, the ligand may enhance antimicrobial, antifungal, and anti-biofilm properties. In the various embodiments, the antimicrobial activity of the ligand may be additive or synergistic to the metal. In the various embodiments, the ligand may exhibit antimicrobial, antifungal, pro-healing, or anti-inflammatory properties independent of the metal.

In the various embodiments, the ligand may be oxidized prior to the formation of the oxidized metal complex. Oxidation of the ligand may occur prior to complexation with the oxidized metal or in-situ.

In the various embodiments, a ligand precursor may be used. As used herein, the term "precursor ligand" refers to a ligand which participates in a preceding reaction to produce a subsequent ligand which is used for forming the metal complex. Suitable precursor ligands may include, but are not limited to, iodates, tellurous acid, chlorate, manganate, sulfate, and combination thereof.

In the various embodiments, the first solution (comprising the highly oxidized metal and having a pH between 0 to 7) and the second solution (comprising the ligand(s) or ligand precursor and having a pH between 7 to 13 or greater) may be combined to form a third solution comprising a first oxidized metal complex. In the various embodiments, the pH of the third solution may have a pH ranging from 7 to 13 or greater.

The concentration of the second solution should be such that an appropriate stoichiometric equivalent is obtained in the third solution to complete formation of the first oxidized metal complex. In the various embodiments, the concentration of the ligand may range from about 0.02 mM to about 4.0 M. In the various embodiments, the concentration of the highly oxidized metal may range from about 2 mM to about 1.2 M, and more preferably, from about 20 mM to about 0.6 M. In the various embodiments, the temperature may range from about 0° C. to about 100° C., more preferably from about 10° C. to about 90° C., and most preferably from about 40° C. to about 90° C. In the various embodiments, the duration may range from about 10 minutes to about 48 hours, more preferably from about 30 minutes to about 24 hours, and most preferably from about 60 minutes to about 12 hours.

Without being bound by any theory, it is believed that the ligand may donate electrons and bind to the highly oxidized metal, thereby forming and stabilizing the first oxidized metal complex. At the end of the reaction, the third solution may have a pH ranging from 7 to 13 or greater. The third solution may comprise the first oxidized metal complex having the formula (I):

$$M_{(x+y)}\text{Metal}(\text{Ligand})_2 \qquad (I)$$

where $M_{(x+y)=5}$, $M_x$ is an alkali or alkali earth metal, x=1 to 5; and $M_y$ is a hydrogen ion, y=0 to 4.

As used herein, the term "hydrogen ion" refers to the cation $H^+$ and the term "hydronium ion" refers to the aquated or hydrated form of the H+ cation, or conjugate acid of water, or $H_3O^+$, which is produced by protonation of water. The ratio of hydronium ions to hydroxide ions may determine the pH of the third solution. As used herein, the term "hydroxide ion" refers to the anion OH-. In the various embodiments, hydroxide ions may be present in the third solution at a concentration ranging from about 0.01 mM to about 11 M. In the various embodiments, the hydroxide may be sodium hydroxide. In the various embodiments, the hydroxide may be barium hydroxide. In the various embodiments the hydroxide may be calcium hydroxide.

In the various embodiments, the first oxidized metal complex may be purified in a solid form from the third solution. As used herein, the term "purification" refers to the physical separation of a chemical substance of interest from other substances or impurities to yield an isolate. As used herein, the term "isolate" refers to a pure form of the first oxidized metal complex. As used herein, the term "pure form" refers to the purified isolate in which any traces of other substances or impurities which might remain are of acceptable levels for the intended purpose.

Purification of the first oxidized metal complex may be conducted using a method which minimizes degradation of the first oxidized metal complex from the third solution. Suitable purification methods include, but are not limited to, crystallization, precipitation, evaporation, recrystallization, phase extraction, lyophilisation, spray drying, titration with acid (for example, nitric acid), and combinations thereof. As used herein, the term "solid form" refers to the isolate of the first oxidized metal complex in the form of a powder or crystals.

ii) Method for Preparing Second Oxidized Metal Complexes

The first oxidized metal complex may be transformed into a second oxidized metal complex exhibiting one or more desired properties by adjusting the pH of a species solution. As used herein, the term "species solution" refers to a solution comprising a mixture of chemical species which may include the first oxidized metal complex. Without being bound by any theory, it is believed that adjustment of the pH of the species solution may alter the protonation state of the first oxidized metal complex, thereby transforming it into a second oxidized metal complex. As used herein, the term "protonation" refers to addition of a proton ($H^+$) to an atom, molecule, or ion. As used herein, the term "deprotonation" refers to removal of a proton ($H^+$) from an atom, molecule, or ion. The first and second oxidized metal complexes may exhibit varying solubility, with varying pH. Addition of acid or base may regulate the solubility of the first oxidized metal complex, while addition of sufficient acid may transform the first oxidized metal complex into a second oxidized metal complex having diminished solubility and which may then be isolated, facilitating its purification.

In a second aspect, the present invention comprises a method for preparing an oxidized metal complex by providing a species solution comprising a first oxidized metal complex and having a pH of at least pH 11; and adjusting the pH of the species solution to form a second oxidized metal complex. In the various embodiments, the method may further comprise adjusting one or more of the pH, temperature, concentration, or combinations thereof so that the second oxidized metal complex exhibits one or more desired properties. In the various embodiments, the pH of the species solution may be adjusted between 2.0 to 11.0. In the various embodiments, one or more properties may be selected from morphology, crystalline size, stability, rate of dissolution, and flowability.

As previously described with respect to the first aspect and applicable to the second aspect, one or more ligands may be selected from a tellurate, iodate, periodate, phosphate, borate, carbonate, ammonium hydroxide, ammonium carbonate, ammonium sulfate, arsenate, dithiocarbamate, aliphatic dithioloate, aromatic dithioloate, selenium ligand, sulfur ligand, ethylenediaminetetraacetic acid, imine ligand, oxime ligand, dimethylglyoxime, macrocylic amine, porphyrin, tetraazacyclohexadiene, pyridine, pyrazine, bipyridyl, phenanthroline, dimethylphosphine, dimethylarsine, dibutylthiourea, ethylenediimine, polypeptide, guanide, biguanide, polyguanide, phosphine, arsine, and combinations thereof. In various embodiments, one or more ligands may be selected from an iodate or a periodate.

In the various embodiments, the first oxidized metal complex, the second oxidized metal complex, or both may be periodate metal complexes. In the various embodiments, the first oxidized metal complex, the second oxidized metal complex, or both may be diperiodate metal complexes. In the various embodiments, the first oxidized metal complex, the second oxidized metal complex, or both may be silver periodate complexes. In the various embodiments, the first oxidized metal complex, the second oxidized metal complex, or both may be silver diperiodate complexes. In the various embodiments, the first oxidized metal complex, the second oxidized metal complex, or both may be potassium silver periodate complexes. In the various embodiments, the first oxidized metal complex, the second oxidized metal complex, or both may be potassium silver diperiodate complexes. In the various embodiments, the first oxidized metal complex, the second oxidized metal complex, or both may be sodium silver periodate complexes. In the various embodiments, the first oxidized metal complex, the second oxidized metal complex, or both may be sodium silver diperiodate complexes.

In the various embodiments, the first oxidized metal complex, the second oxidized metal complex, or both may be calcium silver periodate complexes. In the various embodiments, the first oxidized metal complex, the second oxidized metal complex, or both may be calcium silver diperiodate complexes. In the various embodiments, the first oxidized metal complex, the second oxidized metal complex, or both may be magnesium silver periodate complexes. In the various embodiments, the first oxidized metal complex, the second oxidized metal complex, or both may be magnesium silver diperiodate complexes. In the various embodiments, the first oxidized metal complex, the second oxidized metal complex, or both may be barium silver periodate complexes. In the various embodiments, the first oxidized metal complex, the second oxidized metal complex, or both may be barium silver diperiodate complexes.

In the various embodiments, the pH of the species solution may be adjusted by the addition of an acid to transform the first oxidized metal complex into a second oxidized metal complex. In the various embodiments, a sufficient concentration of acid may be added to reduce the pH of the species solution between 11.0 to 2.0. In the various embodiments, the acid may be nitric acid.

Adjusting the pH of the species solution is "reversible," meaning that the pH can be shifted from basic to acidic, or from acidic to basic, as required in order to transform the first oxidized metal complex into the desired second oxidized metal complex. In the various embodiments, the pH of the species solution may be increased by addition of a base. In the various embodiments, the base may be potassium hydroxide. In the various embodiments, a sufficient concentration of base may be added to increase the pH of the species solution between 2.0 to 11.0.

In the various embodiments, sufficient concentrations of the acid or base to transform the first oxidized metal complex into the desired second oxidized metal complex may be determined using acid-base titration. As used herein, the term "acid-base titration" refers to a method of quantitative analysis for determining the concentration of an acid or base by exactly neutralizing it with a standard solution of base or acid having known concentration. A pH indicator may be used to monitor the progress of the acid-base reaction. An acid-base titration curve may be plotted on a graph to show the changes in the pH upon addition of acid or base. As shown for example in FIG. 1, the curve falls near equivalence points (inflection points of the curve). The quantity of acid or base required to reach each equivalence point (e.g., FIG. 1, pH 11.3, 5.7) may be identified from the graph.

At each equivalence point or corresponding pH, the first oxidized metal complex may be transformed into a different second oxidized metal complex. Without being bound by any theory, it is believed that as a particular equivalence point or corresponding pH is approached (e.g., FIG. 1, approaching pH 5.7 from pH 11.3), the species solution may comprise a greater concentration of the second oxidized metal complex (e.g., at pH 5.7) compared to the concentration of the first oxidized metal complex (e.g., at pH 11.3) which has undergone transformation. "Residual" chemical species may thus be present in the species solution comprising predominantly the second oxidized metal complex (e.g., at pH 5.7). In comparison to the first oxidized metal complex (e.g., predominant and stable in the species solution at pH 11.3), the second oxidized metal complex may exhibit diminished solubility (e.g., predominant and unstable in the species solution at pH 5.7), facilitating its isolation and purification from the species solution.

In the various embodiments, the second oxidized metal complex may be obtained from the species solution at a pH 11.0 to pH 6.0 such that the second oxidized metal complex may have the formula (I):

$$M_{(x+y)}Metal(Ligand)_2 \quad (I)$$

where $M_{(x+y)=5}$, $M_x$ is an alkali or alkali earth metal, x=1 to 4; and $M_y$ is a hydrogen ion, y=1 to 4.

In the various embodiments, the second oxidized metal complex may be obtained from the species solution at a pH from 9.0 to 2.5 such that the second oxidized metal complex may have the formula (I) where $M_{(x+y)=5}$ is $M_x$ is an alkali or alkali earth metal, x=0 to 3; and $M_y$ is a hydrogen ion, y=2 to 5.

In the various embodiments, the second oxidized metal complex may be obtained from the species solution at a pH between 9.0 to 5.5 such that the second oxidized metal complex may have the formula (I) where $M_{(x+y)=5}$, $M_x$ is an alkali or alkali earth metal, x=1 to 3; and $M_y$ is a hydrogen ion, y=2 to 4.

The method thus yields a second oxidized metal complex at variable hydronium ion concentrations. After formation, the second oxidized metal complex may be purified in a solid form from the species solution using a suitable purification method as previously described. In the various embodiments, after purification, the second oxidized metal complex may have the formula (I):

$$M_{(x+y)}Metal(Ligand)_2 \quad (I)$$

where $M_{(x+y)}$, $M_x$ is an alkali or alkali earth metal, x=0 to 4; and $M_y$ is a hydrogen ion, y=1 to 5.

iii) Methods for Introducing Secondary Counterions into First and Second Oxidized Metal Complexes In the various embodiments, counterions may be introduced into the first and second oxidized metal complexes. As used herein the term "counterion" means an ion which accompanies an ionic species in order to maintain electric neutrality. The term refers to an anion or a cation, depending on whether it is negatively (anion) or positively (cation) charged. The counterion to an anion is a cation, while the counterion to a cation is an anion. In the various embodiments, the counterion may be a cation. In the various embodiments, a secondary cation may be introduced to the first and second oxidized metal complexes. As used herein, the term "secondary cation" means a second positively charged ionic species which is introduced to the first and second oxidized metal complexes.

In the various embodiments, the secondary cation may be an alkali metal. As used herein, the term "alkali metal" means any of the elements occupying Group 1A(1) of the periodic table, and being reactive, electropositive monovalent metals. The alkali metals are lithium, sodium, potassium, rubidium, cesium, and francium. In the various embodiments, the alkali metal may be sodium. In the various embodiments, the alkali metal may be provided in the form of a compound, metal or salt thereof including, but not limited to, $O^{2-}$, $Br^-$, $F^-$, $CrO_4^{2-}$, $CN^-$, $PO_2^{3-}$, $S_2O_5^{2-}$, $C_2O_4^{2-}$, $IO_4^-$, $P_2O_7^{4-}$, $SO_4^{2-}$, $B_4O_7^{2-}$, $HCO_3^-$, $BF_4^-$, $CO_3^{2-}$, $NO_3^-$, $ClO_4^-$, $SO_4^{2-}$, $F^-$, $Br^-$, $C_3H_3O_2$, $NH_4^+$, $MnO_4^-$, $NO_2^-$, $BrO_3^-$, $IO_3^-$, $Cr_2O_7^{2-}$, $OH^-$, $ClO_3^-$, $HCO_2^-$, or combinations thereof. Any of these forms of the alkali metal may be suitable for introduction to a selected solution to yield a desired product.

In the various embodiments, the secondary cation may be an alkaline earth metal. As used herein, the term "alkaline earth metal" means any of the elements occupying Group 2 of the periodic table, and being reactive, electropositive, and divalent metals. The alkaline earth metals are beryllium, magnesium, calcium, strontium, barium, and radium. In the various embodiments, the alkaline earth metal may be calcium, magnesium, or barium. In the various embodiments, the alkaline earth metal may be provided in the form of a compound, metal or salt thereof including, but not limited to, $O^{2-}$, $Cl^-$, $Br^-$, $F^-$, $I^-$, $CrO_4^{2-}$, $CN^-$, $PO_2^{3-}$, $S_2O_5^{2-}$, $C_2O_4^{2-}$, $IO_4^-$, $P_2O_7^{4-}$, $SO_4^{2-}$, $B_4O_7^{2-}$, $HCO_3^-$, $BF_4^-$, $CO_3^{2-}$, $NO_3^-$, $ClO_4^-$, $SO_4^{2-}$, $F^-$, $Br^-$, $C_3H_3O_2$, $NH_4^+$, $MnO_4^-$, $NO_2^-$, $BrO_3^-$, $IO_3^-$, $Cr_2O_7^{2-}$, $OH^-$, $ClO_3^-$, $HCO_2^-$, or combinations thereof. Any of these forms of the alkaline earth metal may be suitable for introduction into a selected solution to yield a desired product.

Figure 10:
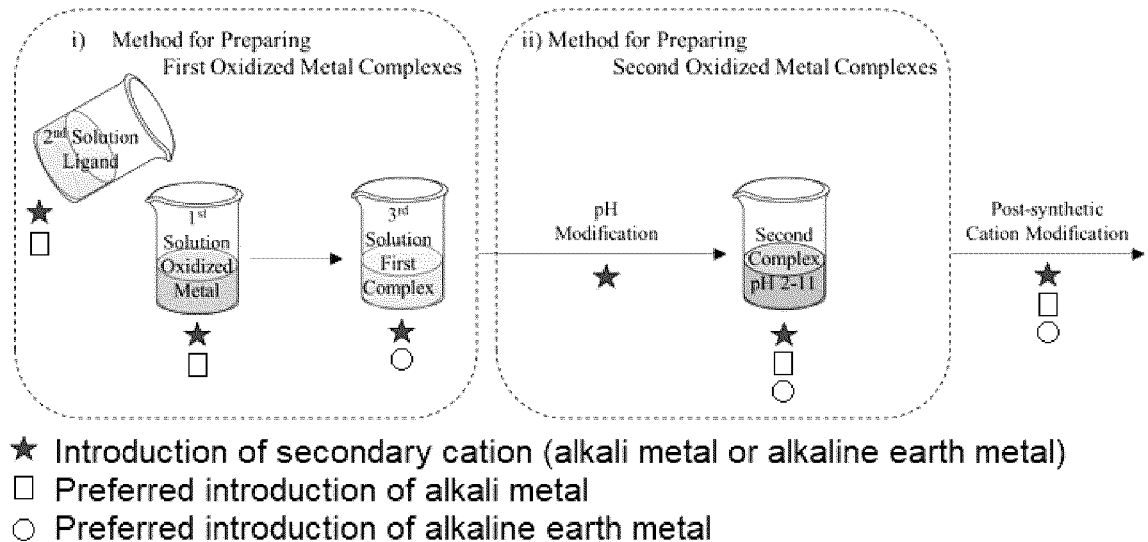
FIG. 10 is a schematic diagram showing various points of introduction of a secondary cation (alkali metal or alkaline earth metal) throughout the preparation of the first and second oxidized metal complexes or subsequent to the formation of the second oxidized metal complex, and the preferred introduction points for each of the alkali metal and alkaline earth metal.

In the various embodiments, the alkali metal and the alkaline earth metal may be introduced into one or more selected solutions throughout the preparation steps of the first and second oxidized metal complexes, and subsequent to the formation of the second oxidized metal complex (FIG. 10).

In the various embodiments, there may be preferred solutions into which the alkali metal and alkaline earth metal are introduced (FIG. 10). In the various embodiments, the alkali metal may be introduced into the first solution comprising the highly oxidized metal; the second solution comprising the ligand(s) or ligand precursor; the solution comprising the second oxidized metal complex; post-synthesis of the second oxidized metal complex; or post-isolation of the second oxidized metal complex.

In the various embodiments, the alkaline earth metal may be introduced into the third solution comprising the first oxidized metal complex; the solution comprising the second oxidized metal complex; post-synthesis of the second oxidized metal complex; or post-isolation of the second oxidized metal complex.

In the various embodiments, the alkali metal and alkaline earth metal may be introduced together into one or more selected solutions. In the various embodiments, the alkali metal and alkaline earth metal may be introduced together into the third solution comprising the first oxidized metal complex; the solution comprising the second oxidized metal complex; post-synthesis of the second oxidized metal complex; or post-isolation of the second oxidized metal complex.

As used herein, the term "ion exchange" means a chemical process in which ions are exchanged for other ions. In the various embodiments, ion exchange may result in a partial or complete exchange of ions. With respect to partial or incomplete exchange of ions, an oxidized metal complex may include more than one ion. In the various embodiments, ion exchange may occur between the alkali metal and the first oxidized metal complex to yield a first oxidized metal complex including the alkali metal counterion. In the various embodiments, ion exchange may occur between the alkali metal and the second oxidized metal complex to yield a second oxidized metal complex including the alkali metal counterion. In the various embodiments, ion exchange may occur between the alkaline earth metal and the first oxidized metal complex to yield a first oxidized metal complex including the alkaline earth metal counterion. In the various embodiments, ion exchange may occur between the alkaline earth metal and the second oxidized metal complex to yield a second oxidized metal complex including the alkaline earth metal counterion.

In the various embodiments, ion exchange may occur between the alkali metal and the alkaline earth metal to yield an oxidized metal complex including the alkaline earth metal counterion. In the various embodiments, ion exchange may occur between the alkaline earth metal and the alkali metal to yield an oxidized metal complex including the alkaline earth metal counterion.

The conditions under which the counterions of the alkali metals and alkaline earth metals may be introduced into the first oxidized metal complex and second oxidized metal complex in selected solutions are described as follows:

a) Methods for Introducing Counterions of Alkali Metals and Alkaline Earth Metals to First Oxidized Metal Complexes in Selected Solutions In the various embodiments, the alkali metal may be introduced to a first oxidized metal complex in a solution selected in accordance with the procedure shown in FIG. 10. As defined above, the alkali metal may be in the form of a compound, metal, or salt thereof. In the various embodiments, the alkali metal may be added in solid or solution form at a concentration ranging from about 0.01 mM to about 16.0 M in the selected solution. In the various embodiments, the molar concentration of the alkali metal to the first oxidized metal complex may range from about 0.25:1 to about 20:1, more preferably from about 1:1 to about 10:1, and most preferably from about 4:1 to about 8:1.

In the various embodiments, the alkali metal may be sodium. In the various embodiments, sodium may replace potassium through ion exchange. In the various embodiments, the first oxidized metal complex may be a potassium oxidized metal complex, and addition of sodium may yield a sodium oxidized metal complex. In the various embodiments, the first oxidized metal complex may be potassium silver periodate complex, and addition of sodium may yield sodium silver periodate complex. In the various embodiments, the first oxidized metal complex may be potassium silver diperiodate complex, and addition of sodium may yield sodium silver diperiodate complex.

In the various embodiments, the alkaline earth metal may be introduced into a first oxidized metal complex in a solution selected in accordance with the procedure shown in FIG. 10. As defined above, the alkaline metal earth may be in the form of a compound, metal, or salt thereof. In the various embodiments, the alkaline earth metal may be added in solid or solution form at a concentration ranging from about 0.01 mM to about 8.0 M, and more preferably from about 20 mM to about 4.0 M in the selected solution. In various embodiments, the molar concentration of the alkaline earth metal to the first oxidized metal complex may range from about 0.25:1 to 10:1, more preferably from about 1:1 to 5:1, and most preferably from about 3:1 to about 5:1.

In the various embodiments, the counterion of the alkaline earth metal may replace potassium through ion exchange. In the various embodiments, the first oxidized metal complex may be a potassium oxidized metal complex, and addition of an alkaline earth metal may yield an alkaline earth metal salt of the first oxidized metal complex. In the various embodiments, the first oxidized metal complex may be potassium silver periodate complex. Addition of the alkaline earth metal may yield an alkaline earth metal salt of the silver periodate complex. In the various embodiments, the first oxidized metal complex may be potassium silver diperiodate complex. Addition of the alkaline earth metal may yield an alkaline earth metal salt of the silver diperiodate complex.

In the various embodiments, the presence of a hydroxide ion of an alkaline earth metal in the third solution may yield an alkaline earth metal salt of the first oxidized metal complex.

In the various embodiments, addition of the alkali metal or alkaline earth metal to the first oxidized metal complex in the selected solution may proceed over a time period ranging from about 1 hour to about 10 seconds, preferably from about 20 minutes to about 10 seconds, and most preferably from about 10 minutes to about 10 seconds. In the various embodiments, addition of the alkali metal or alkaline earth metal to the selected solution may be conducted at a temperature ranging from about 0° C. to about 100° C., and more preferably from about 21° C. to about 85° C. In the various embodiments, the reaction time of the alkali metal or alkaline earth metal with the first oxidized metal complex may range from about 0 minutes to about 48 hours, preferably from 5 minutes to about 90 minutes, and most preferably from 10 minutes to about 30 minutes.

b) Methods for Introducing Counterions of Alkali Metals and Alkaline Earth Metals to Second Oxidized Metal Complexes in Selected Solutions As previously described, a method for preparing a second oxidized metal complex may comprise providing a species solution comprising a mixture of chemical species which may include a first oxidized metal complex, and adjusting the pH of the species solution to form a second oxidized metal complex (FIG. 10). In the various embodiments, the alkali metal and the alkaline earth metal may be introduced before adjusting the pH of the species solution to form the second oxidized metal complex. In the various embodiments, the alkali metal and the alkaline earth metal may be introduced after adjustment of the pH of the species solution to form the second oxidized metal complex.

In the various embodiments, the pH of the species solution may be adjusted from pH 11 or greater to a pH between 2.0 to 11. In the various embodiments, the pH of the species solution may be adjusted from a pH of 11 or greater to an equivalence point in the range of pH 10 to 11, more preferably 10.5 to 11, or pH 5 to pH 7, and most preferably pH 5.5 to pH 6.8.

As defined above, the alkali metal may be in the form of a compound, metal, or salt thereof. In the various embodiments, the alkali metal may be added in solid or solution form at a concentration ranging from about 0.01 mM to about 8.0 M. In the various embodiments, the molar concentration of the alkali metal to the oxidized metal complex may range from about 0.25:1 to about 20:1, more preferably from about 1:1 to about 10:1, and most preferably from about 4:1 to about 8:1.

As defined above, the alkaline earth metal may be in the form of a compound, metal, or salt thereof. In the various embodiments, the alkaline earth metal may be added in solid or solution form at a concentration ranging from about 0.01 mM to about 4.0 M. In various embodiments, the molar concentration of the alkaline earth metal to the oxidized metal complex may range from about 0.25:1 to about 10:1, more preferably from about 1:1 to about 5:1, and most preferably from about 1:1 to about 4:1.

In the various embodiments, addition of the alkali metal or alkaline earth metal to the species solution may proceed over a time period ranging from about 1 hour to about 10 seconds, preferably from about 20 minutes to about 10 seconds, and most preferably from about 10 minutes to about 10 seconds.

In the various embodiments, addition of the alkali metal or alkaline earth metal to the species solution may be conducted at a temperature ranging from about 0° C. to about 100° C., and more preferably from about 21° C. to about 85° C. In the various embodiments, addition of the alkali metal or alkaline earth metal to the species solution may be conducted over an increasing or decreasing temperature gradient. In the various embodiments, the initial temperature may range from about 45° C. to about 100° C. ramping to a temperature of about 0° C. to about 45° C., at a temperature ramping rate ranging from about 1° C./min to about 10° C./min. In the various embodiments, the initial temperature may range from about 0° C. to about 45° C. ramping to a temperature of about 45° C. to about 100° C., at a temperature ramping rates of about 1° C./min to about 10° C./min.

In the various embodiments, the reaction time of the alkali metal or alkaline earth metal with the oxidized metal complex may range from about 0 minutes to about 48 hours, preferably from 5 minutes to about 90 minutes, and most preferably from 10 minutes to about 30 minutes.

In the various embodiments, the alkali metal may be sodium. In the various embodiments, the first oxidized metal complex may be a potassium oxidized metal complex. Ion exchange may proceed by adding sodium to the species solution including the potassium oxidized metal complex, resulting in a partial or complete exchange of the original counterion (in this example, potassium) with the secondary counterion (in this example, sodium). The pH of the species solution may be adjusted before or after addition of sodium. The product thus formed may be an oxidized metal complex including the counterion of sodium. In the various embodiments, the addition of sodium may facilitate the purification of the product in solid form from the species solution using a suitable purification method as previously described.

In the various embodiments, the alkali metal may be introduced after both adjustment of the pH of the species solution and formation of the second oxidized metal complex (i.e., post-synthetic cation modification, as shown in FIG. 10). In the various embodiments, the alkali metal may be introduced after adjustment of the pH of the species solution, formation of the second oxidized complex, and isolation of the second oxidized metal complex. In the various embodiments, the second oxidized metal complex may be a potassium oxidized metal complex. The potassium oxidized metal complex may first be dissolved in an aqueous solution. In the various embodiments, the concentration of the second oxidized metal complex in the aqueous solution may range from about 0.001 M to about 10.0 M, and more preferably from about 0.01 M to about 10 M. In the various embodiments, the temperature may range from about 0° C. to about 100° C., preferably from about 15° C. to about 85° C., and most preferably from about 20° C. to about 75° C. Sodium may then be added in solid or solution form to the aqueous solution to achieve ion exchange between potassium and sodium to yield an oxidized metal complex including the counterion of sodium. In the various embodiments, the molar concentration of sodium to potassium may range from about 0.25:1 to about 20:1, more preferably from about 1:1 to about 10:1, and most preferably from about 2:1 to about 8:1.

In the various embodiments, ion exchange through addition of the alkali metal may result in the formation of more than one oxidized metal complex or salt, where the oxidized metal complex may have the formula:

$$M_{(x+y)}\text{Metal}^{(\alpha)}(\text{Ligand})^{(\gamma)}_{(\beta)} \quad (II)$$

and may be a combination of M=xH+yM; where M=alkali metal(s) and a metal with an oxidation state of α, H=hydrogen ion(s)/hydronium ion(s), β=number of ligand(s) and γ=charge of ligand(s), where [x+y+α=−γβ], or combinations thereof.

In the various embodiments, the first oxidized metal complex may be an alkali metal salt of an oxidized metal complex. Ion exchange may proceed by adding an alkaline earth metal to the species solution including the alkali metal salt of an oxidized metal complex, resulting in a partial or complete exchange of the original counterion (in this example, the alkali metal) with the secondary counterion (in this example, the alkaline earth metal). The pH of the species solution may be adjusted before or after addition of the alkaline earth metal. In the various embodiments, the pH of the species solution may be adjusted in the course of the addition of the alkaline earth metal. The product thus formed may be an oxidized metal complex including the counterion of the alkaline earth metal. In the various embodiments, the addition of the alkaline earth metal may facilitate that purification of the product in solid form from the species solution using a suitable purification method as previously described.

In the various embodiments, the alkaline earth metal may be introduced after adjustment of the pH of the species solution and formation and isolation of the second oxidized metal complex (i.e., post-synthetic cation modification as shown in FIG. 10). In the various embodiments, the second oxidized metal complex may be an alkali salt of an oxidized metal complex, and may be first dissolved in an aqueous solution at a concentration ranging from about 0.001 M to about 10.0 M, and more preferably from about 0.01 M to about 10 M. In the various embodiments, the temperature may range from about 0° C. to about 100° C., preferably from about 15° C. to about 85° C., and most preferably from about 20° C. to about 75° C. The alkaline earth metal may then be added in solid or solution form to the aqueous solution to achieve ion exchange between the alkaline earth metal and the alkali salt to yield an oxidized metal complex including the counterion of the alkaline earth metal. In the various embodiments, the molar concentration of the secondary alkaline earth metal to the alkali salt of the oxidized metal complex may range from about 0.25:1 to 10:1, more preferably from about 1:1 to 5:1, more preferably from about 1:1 to about 4:1.

In the various embodiments, ion exchange through addition of the alkaline earth metal may result in the formation of more than one oxidized metal complex or salt, wherein the oxidized metal complex may have the formula:

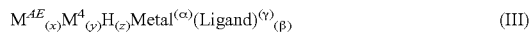

$$M^{AE}{}_{(x)}M^{A}{}_{(y)}H_{(z)}\text{Metal}^{(\alpha)}(\text{Ligand})^{(\gamma)}{}_{(\beta)} \quad \text{(III)}$$

wherein (x) atoms of $M^{AE}$=alkaline earth metal(s) are contained within the oxidized metal complex formula, (y) atoms of $M^{A}$=alkali metal(s) are contained within the oxidized metal complex formula, (z) atoms of H=hydrogen ion(s) are contained within the oxidized metal complex formula, and a Metal with an oxidation state of $\alpha$, $\beta$=number of ligand(s) and $\gamma$=charge of ligand(s), where $[2x+y+z+\alpha=-\gamma\beta]$, or combinations thereof.

In the various embodiments, the alkali metal and alkaline earth metal may be selected to yield a desired resulting product which may demonstrate one or more of superior thermal stability, chemical stability, and UV (ultraviolet) stability compared to the first and second oxidized metal complexes. In the various embodiments, greater chemical stability may facilitate incorporation of the product into various substrates and materials including, but not limited to films, fibres, woven, non-woven, substrates, structures and porous materials of biodegradable, bioresorbable or biocompatible polymers, synthetic polymers, thermoplastic or thermoset materials, metals, alloys, inorganic materials, natural or organic polymers and composites such as collagens, cellulose, chitin, and keratin. In the various embodiments, greater chemical stability of the product may facilitate processing requirements under solvent conditions where solvents may include, but are not limited to, alcohols, ketones, aldehydes, aromatics, oils, alkenes, and alkynes. In the various embodiments, greater thermal stability of the product may facilitate thermal processing requirements at temperatures of about 20° C. to 250° C. In the various embodiments, the alkali metal and alkaline earth metal may be selected to yield a desired resulting product which may demonstrate variable release profiles in aqueous or non-aqueous media. In the various embodiments, the resulting product may afford release of the metal and/or ligand into solution prior to or following incorporation into various substrates or materials.

Exemplary First and Second Oxidized Metal Complexes

Selected first and second oxidized metal complexes formed by the above methods may be evaluated to assess their physicochemical properties including, but not limited to, stability, solubility, and efficacy.

As used herein, the term "stability" means the tendency of the first or second oxidized metal complex to resist degradation when exposed to an aqueous media and/or light over a broad temperature and pH range. In the various embodiments, the first or second oxidized metal complex may exhibit long term stability within an aqueous solution, solid state, or both. As used herein, the term "degradation" means the physical or chemical decomposition or deterioration of the first or second oxidized metal complex.

As used herein, the term "solubility" refers to the ability of the first or second oxidized metal complex to dissolve in a solvent such as, for example, water.

As used herein, the term "efficacy" refers to the ability of the first or second oxidized metal complex to function as an antimicrobial, antifungal, anti-biofilm, pro-healing, and/or anti-inflammatory agent, buffering agent, or as a catalyst.

In the various embodiments, selecting one or more protonated states, $H_y$, y=0 to 5, may result in first or second oxidized metal complexes that may exhibit variable solubilities and release profiles into biological media, buffering capacity, or pH modification. In the various embodiments, the protonation states of the first or second oxidized metal complexes may be such that the buffering region may range between pH 6 to pH 9. In the various embodiments, the variable solubility of different protonated first and second oxidized metal complexes may be combined such that control over the rate of release of the first or second oxidized metal complexes into aqueous solution may be regulated to provide a bolus with sustained release, resulting in a mechanism for combined controlled release and pH regulation.

Exemplary oxidized metal complexes are listed in Table 1 and are further described in Examples 1-9.

TABLE 1

Summary of Oxidized Metal Complexes.

| pH | Sample ID | Proposed/Theoretical Formula as $K_xH_yAg(IO_5OH)_2$ (potassium silver diperiodate complex) | Physicochemical Properties | Example |
|---|---|---|---|---|
| N/A | JN300518-2a | x = 5, y = 0 (solid state) x = 4 – 1, y = 1 – 4 (aqueous phase) | bright red crystals, solid state stability, aqueous phase stability at pH 7 | 1 |
| N/A | JN150618-3 | x = 5 – 3, y = 0 – 2 | bright red crystals, antimicrobial activity | 2 |
| 6.38 | JN231118-1b | x = 1 – 4, y = 1 – 4 | bright orange powder, silver content, yield | 3 |
| 6.77 | JN301118-1 | x = 1 – 4, y = 1 – 4 | bright orange powder, silver content, yield | 3 |
| 6.81 | JN160119-2 | x = 1 – 4, y = 1 – 4 | bright orange powder, yield | 4 |
| N/A | JN240718-1a | x = 5 – 3, y = 0 – 2 | bright orange powder | 5 |
| 4 | | x = 0 – 2, y = 1 – 3 | long term aqueous stability | 5 |
| 6 | | x = 1 – 4, y = 1 – 4 | long term aqueous stability | 5 |
| 8 | | x = 1 – 4, y = 1 – 4 | long term aqueous stability | 5 |
| 9 | | x = 3 – 4, y = 1 – 2 | long term aqueous stability | 5 |
| 10 | | x = 3 – 4, y = 1 – 2 | long term aqueous stability | 5 |
| 13 | | x = 5 – 3, y = 0 – 2 | long term aqueous stability | 5 |
| 7.01 | JN171218-1 | x = 1 – 4, y = 1 – 4 | bright orange powder, yield, coating on | 6 |

TABLE 1-continued

Summary of Oxidized Metal Complexes.

| pH | Sample ID | Proposed/Theoretical Formula as $K_xH_yAg(IO_5OH)_2$ (potassium silver diperiodate complex) | Physicochemical Properties | Example |
|---|---|---|---|---|
| 10.5 | JN161018-2 | x = 5 – 1, y = 0 – 4 | substrates and stability bright orange powder, acid base titration and buffering capacities, antimicrobial activity | 7 |
| 8.29 | JN061118-1a | x = 1 – 4, y = 1 – 4 | deep orange-red powder, silver content, long term stability | 7 |
| N/A | JN081118-2a | x = 5 – 3, y = 0 – 2 | deep orange crystal, silver content | 7 |
| 7.5 | JN081118-2b | x = 1 – 4, y = 1 – 4 | deep orange-red powder, silver content | 7 |
| 7.16 | JN081118-2c | x = 1 – 4, y = 1 – 4 | orange powder, silver content | 7 |
| 2.51 | CS061118-2 | x = 0 – 2, y = 3 – 5 | red-brown powder, silver content | 7 |
| N/A | JN091118-2 | x = 5 (Na), y 0 0 | $Na_5Ag(IO_5OH)_2 \cdot 16H_2O$ as per Cohen & Atkinson, antimicrobial activity, yield | 8 |
| N/A | JN111018-3 | $Ag_5IO_6$ | antimicrobial activity, yield | 9 |

Exemplary oxidized metal complexes including secondary counterions of alkali metals and alkaline earth metals are listed in Table 2 and are further described in Examples 10-25.

TABLE 2

Summary of Oxidized Metal Complexes Including Counterions of Alkali Metals and Alkaline Earth Metals.

| pH | Sample ID | Proposed/Theoretical Formula as $Cation_xAg(IO_6)_2$ | Physicochemical Properties | Example |
|---|---|---|---|---|
| 7.43 | JN070519-1b | Cation = Sodium | Orange powder | 10 |
| 10.49 | VM261119-1, VM100220-5 | Cation = Sodium | Orange crystalline powder and single crystals | 11, 12 |
| 7 | VM211119-2 | Cation = Magnesium | Yellow fine powder | 13 |
| 10.64 | VM171019-2 | Cation = Magnesium | Light yellow fine powder | 14 |
| 13.49 | VM161019-2 | Cation = Magnesium | Yellow fine powder | 15 |
| 7 | VM180919-2 | Cation = Calcium | Red-brown powder | 16 |
| 7 | VM100220-1, GT270220-7, GT221019-1 | Cation = Calcium | Red-brown powder, collagen composite film, & HDPE/PP composite substrate | 17 |
| 10.69 | VM111019-1A | Cation = Calcium | Fine orange powder | 18 |
| 13.50 | VM111019-1B | Cation = Calcium | Brown-yellow fine powder | 19 |
| 7 | VM201119-2 | Cation = Calcium | Orange powder | 20 |
| 7 | VM211119-1 | Cation = Calcium | Red-brown powder | 21 |
| 7 | VM211019-2 | Cation = Barium | Orange fine powder | 22 |
| 7 | CS270220-3 | Cation = Barium | Orange cellulose composite fibre | 23 |
| 10.77 | VM211019-5 | Cation = Barium | Orange fine powder | 24 |
| 13.51 | VM221019-2 | Cation = Barium | Orange fine powder | 25 |

Exemplary Compositions and Uses of the First and Second Oxidized Metal Complexes The first and second oxidized metal complexes of the present invention (including those listed in Tables 1 and 2) may be used alone, as an ingredient combined with and/or formulated into a composition, or as a component of an article of manufacture.

The first and second oxidized metal complexes may be used in the solid state or within an aqueous solution. In the various embodiments, solid states (for example, powders or crystals of the oxidized metal complexes) may be re-solubilized, with the hydronium concentration modified so as to increase the concentration of the oxidized metal complex to a desired molarity or reduce the solubility of the oxidized metal complex for a desired application.

A composition may be prepared by selecting particular components and proportions based on the desired characteristics of the composition. In the various embodiments, the first and/or second oxidized metal complexes may be formulated into a composition comprising an aqueous or non-aqueous solvent. In the various embodiments, the solvent is an aprotic solvent. As used herein, the term "aprotic solvent" refers to a solvent which cannot donate hydrogen. Dissolving or suspending the first and/or second oxidized metal complexes in the solvent may be conducted in various ways including, but not limited to, sonication, mixing, milling, shearing, or combinations thereof.

In the various embodiments, the first and/or second oxidized metal complexes may be used in a dry power formulation (for example, a capsule or tablet).

In the various embodiments, the composition may be prepared by combining the first and/or second oxidized metal complexes with one or more excipients. As used herein, the term "excipient" means any ingredient which is added optionally to a composition of the present invention, other than the first or second oxidized metal complex which is described separately above. Suitable excipients include, but are not limited to, surface-active agents, thickeners, gelling agents, emulsifiers, fillers, oils, and combinations thereof. As used herein, the term "surface-active agent" refers to a surfactant or substance which lowers the surface tension of the medium in which it is dissolved, the interfacial tension with other phases, and is positively adsorbed at the liquid-vapour interface and other interfaces. As used herein, the term "thickener" refers to a substance which increases the viscosity of the composition. As used herein, the term "gelling agent" refers to a substance which provides texture through formation of a gel. As used herein, the term "emulsifier" refers to a substance which forms and maintains a homogenous mixture of two or more immiscible phases in a composition. As used herein, the term "filler" refers to an inert solid substance which adds bulk to the composition. As used herein, the term "oil" refers to any nonpolar substance which is a viscous liquid at ambient temperature and is both hydrophobic and lipophilic.

In the various embodiments, the first and/or second oxidized metal complexes may be applied as a coating to a secondary surface, interface, or substrate (for example, foams, fibres, films, sheets, hydrogels, porous matrices, non-woven materials, etc.) by means of air-knife blowing, rotogravure printing, dipping, rolling, screening, slot-die coating, spraying, spinning, printing, or combinations thereof.

In the various embodiments, the first and/or second oxidized metal complexes may be used as a component of an article of manufacture (for example, a wound dressing, splint, suture, catheter, implant, tracheal tube, orthopedic device, ophthalmic device, prosthetic device, and other laboratory, medical, dental, and consumer devices, equipment, furniture, and furnishings). In the various embodiments, the first and/or second oxidized metal complexes may be combined with a thermoplastic or curable polymer and deposited, coated, formed, or molded into the desired article of manufacture. Suitable methods of combining the first and/or second oxidized metal complexes with the polymer may include, but are not limited to, mixing, sonication, shearing, milling, or combinations thereof. In the various embodiments, the thermoplastic polymer may have a melt transition temperature of less than about 200° C., preferably less than about 60° C. In the various embodiments, the first and/or second oxidized metal complexes may be combined with a curable polymer and cured using ultraviolet light, heat, addition of a catalyst or radical initiator, drying, or combinations thereof. In the various embodiments, an article of manufacture comprising one or more oxidized metal complexes may be formed by depositing one or more oxidized metal complexes on or within the article of manufacture. In the various embodiments, the one or more oxidized metal complexes may be deposited by precipitating the one or more oxidized metal complexes onto the article of manufacture by modifying the pH of a solution comprising the oxidized metal complexes. In the various embodiments, the one or more oxidized metal complexes may be deposited by immersing the article of manufacture in a solution comprising the oxidized metal complexes and then evaporating the solution. In the various embodiments, the pH may be adjusted from pH 11 or greater to a pH between 2.0 to 8.5.

The first and second oxidized metal complexes of the present invention may be used in various applications including, but not limited to, medical, dental, pharmaceutical, cosmeceutical, personal care, veterinary, agricultural, materials engineering, and over-the-counter fields. Exemplary first and second oxidized metal complexes of this invention are biocompatible and intended for medical applications. As used herein, the term "biocompatible" means generating no significant undesirable host response for the intended utility. Most preferably, biocompatible compositions are non-toxic for the intended utility. Thus, for human utility, biocompatible is most preferably non-toxic to humans or human tissues.

In the various embodiments, the invention may comprise a method of treating, preventing, or ameliorating a disease or disorder in a subject, comprising administering the composition comprising the first and/or second oxidized metal complexes to the subject. As used herein, the terms "treating," "preventing," and "ameliorating" refer to interventions performed with the intention of alleviating the symptoms associated with, preventing the development of, or altering the pathology of a disease, disorder or condition. Thus, in the various embodiments, the terms may include the prevention (prophylaxis), moderation, reduction, or curing of a disease, disorder or condition at various stages. In the various embodiments, therefore, those in need of therapy/treatment may include those already having the disease, disorder or condition and/or those prone to, or at risk of developing, the disease, disorder or condition and/or those in whom the disease, disorder or condition is to be prevented. As used herein, the term "disease" or "disorder" refers to any condition characterized by infection, inflammation, or a combination thereof. As used herein, the term "subject" means a human or other vertebrate. The composition comprising the first and/or second oxidized metal complexes is useful for treating, preventing, or ameliorating a disease or disorder upon administration. The composition provides either subjective relief of symptoms or an objectively identifiable improvement as noted by the clinician or other qualified observer.

In the various embodiments, administration may be topical, with the composition comprising the first and/or second oxidized metal complexes being applied to the locally affected area of the skin. In the various embodiments, the invention may comprise use of the composition comprising the first and/or second oxidized metal complexes to treat, prevent, or ameliorate a disease or disorder in a subject.

A single application of the composition of the present invention may be sufficient, or the composition may be applied repeatedly over a period of time, such as several times a day for a period of days or weeks. The amount of the first and/or second oxidized metal complexes will vary with the condition being treated, the stage of advancement of the condition, the age and type of host, and the type and concentration of the composition being applied. Appropriate amounts in any given instance will be readily apparent to those skilled in the art or capable of determination by testing compositions containing the first and/or second oxidized metal complexes by in vitro or in vivo testing.

Exemplary compositions of this invention for medical applications include compositions comprising the first and/or second oxidized metal complexes which may exhibit antimicrobial activity. The first and/or second oxidized metal complexes may be locally or systemically acting. The first and/or second oxidized metal complexes may be administered to a subject by application of the composition (for example, topically by applying the composition or coated dressing directly to abraded skin, lacerations, wounds, burns, surgical incisions, etc.).

In the various embodiments, the disease or disorder may be characterized by infection caused by microbes such as, for example, bacteria, viruses, fungi, and protozoa. Bacteria may include, but are not limited to, *Staphylococcus aureus* and *Pseudomonas aeruginosa*. In an exemplary embodiment, the disorder may be a skin infection (for example, pimples, impetigo, boils, cellulitis, folliculitis, carbuncles, scalded skin syndrome, and abscesses) caused by *Staphylococcus aureus* or *Pseudomonas aeruginosa*. In the various embodiments, such disorder may be treated using an aqueous or non-aqueous formulation comprising first and/or second oxidized metal complexes having a weight percent concentration of silver ranging from about 0.1 wt % to about 50 wt %, and preferably from about 0.1 wt % to about 5.0 wt %, to impart antimicrobial or anti-biofilm properties (see Examples 2 and 7; FIGS. 4A-B, 7C and 9).

Embodiments of the present invention are described in the following Examples, which are set forth to aid in the understanding of the invention and should not be construed to limit in any way the scope of the invention as defined in the claims which follow thereafter.

Example 1

Reverse osmosis (RO) water (50.226 g) and potassium persulfate ($K_2S_2O_8$, 1.359 g) were mixed with stirring in a 100 mL beaker at room temperature until dissolved. A solution of RO water (10.211 g), potassium iodate ($KIO_3$, 5.092 g), and potassium hydroxide (KOH, 3.848 g) previously heated to 60° C. was then added until dissolved. To this clear colorless solution of periodate and persulfate, silver oxynitrate ($Ag_7NO_{11}$, 5.665 g) was added and left to stir at room temperature for 1 hour. Following this reaction time, the cloudy red solution was left to settle, the supernatant decanted, and filtered through Whatman 40 ashless filter paper under vacuum filtration in a Buchner funnel, and split into two portions:

The first portion was used for UV analysis.

The second portion was crystalized via evaporation resulting in the isolation of bright red crystals (JN300518-2a, diperiodatoargentate, proposed $K_5Ag(IO_5OH)_2$).

Figure 2A:
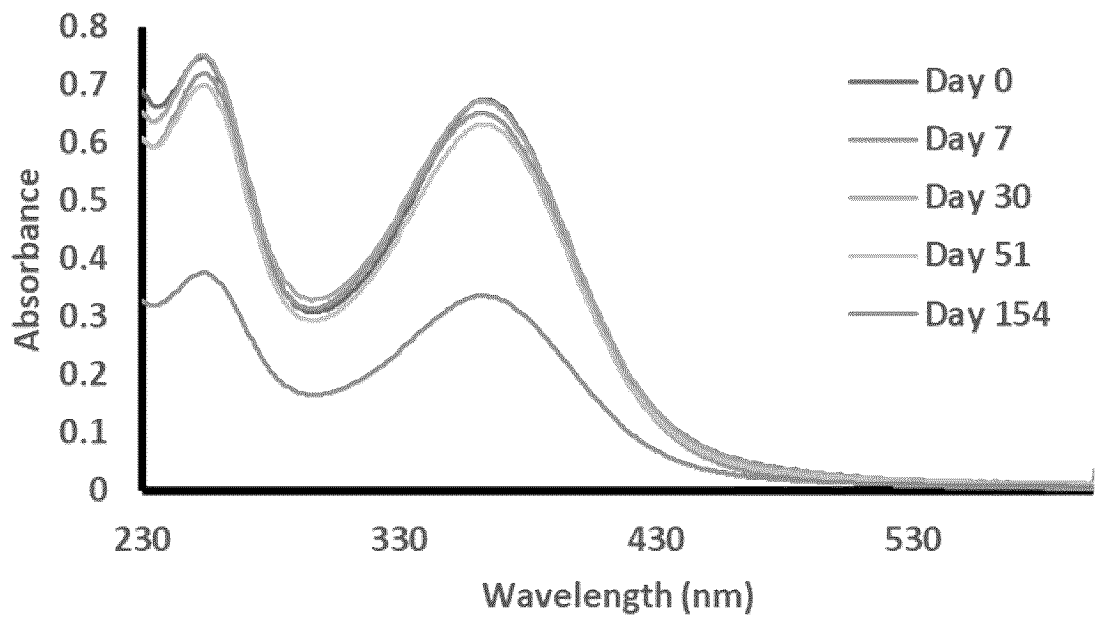
FIG. 2A shows the Ultraviolet Visible (UV/Vis) spectra of the stability of a diperiodatoargentate potassium salt (JN300518-2a; 1.8 mM) at pH 7, room temperature, and ambient light over five months.
Figure 2B:
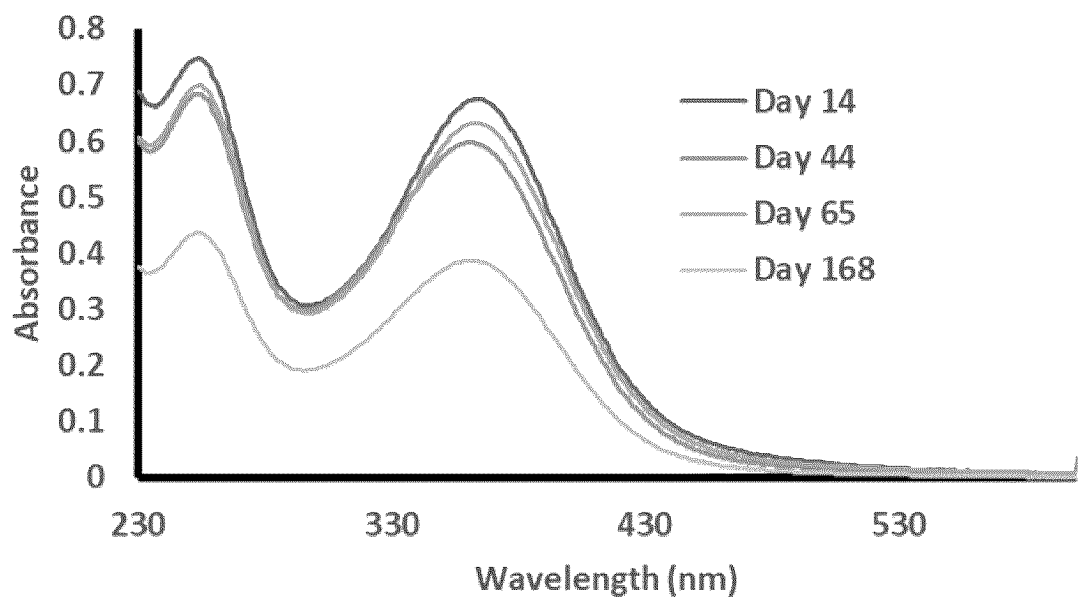
FIG. 2B shows the UV-Vis spectra of the stability of JN300518-2a at room temperature, and ambient air and light over five months.
Figure 2C:
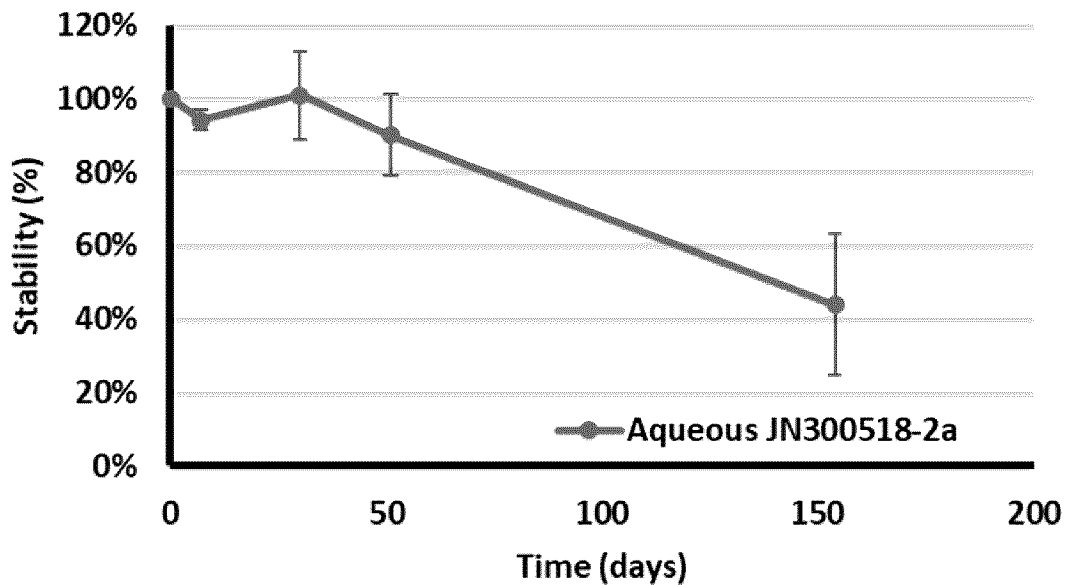
FIG. 2C is a graph showing the relative percent stability of JN300518-2a (1.8 mM) at room temperature, and ambient air and light over five months.
Figure 2D:
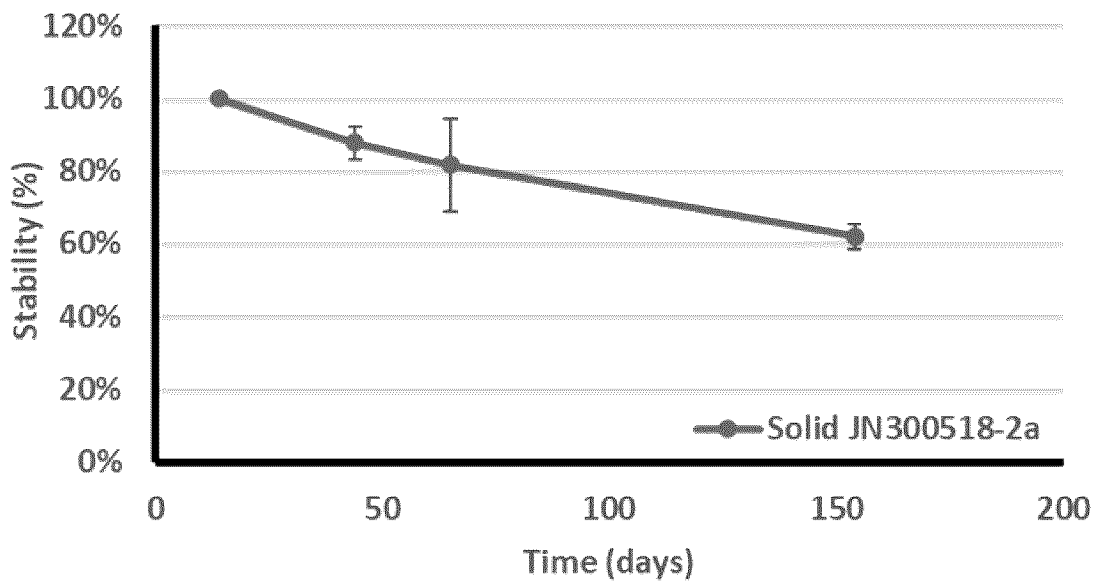
FIG. 2D is a graph showing the relative percent stability of JN300518-2a at room temperature, and ambient air and light over five months.

Stability evaluation of each compound in its solid state stored under ambient conditions was performed. At periodic time points, each sample of compound in its solid state (approximately 0.41 g) was transferred from the storage vial into a 25 mL volumetric flask which was filled with RO water. Each sample was analyzed via UV Vis spectroscopy (Synergy™ Neo2 HTS Hybrid Spectrophotometer, SickKids Core Facility University of Toronto) in triplicate as shown in FIGS. 2B and 2D. The concentration of the complex was determined as described below.

Solution phase stability was determined by preparing solutions of the original solid-state sample. The solid sample (approximately 0.41 g) was transferred from the storage vial into a 25 mL volumetric flask which was filled with RO water (pH 7.0). Each solution was stored in a sealed glass vial at room temperature under ambient lighting and aliquot samples were taken periodically from the solution and evaluated via UV-Vis spectroscopy in triplicate as shown in FIGS. 2A-2C. The concentration of the complex was determined as described below.

Solid state and solution phase stability was determined using the absorption coefficient as determined from the pure isolated compound $\lambda_{max}$ 360 nm=$1.44 \times 10^4$ $M^{-1}cm^{-1}$ cf. $1.40 \times 10^4$ $M^{-1}cm^{-1}$ (Cohen & Atkinson 1964).

Figure 3:
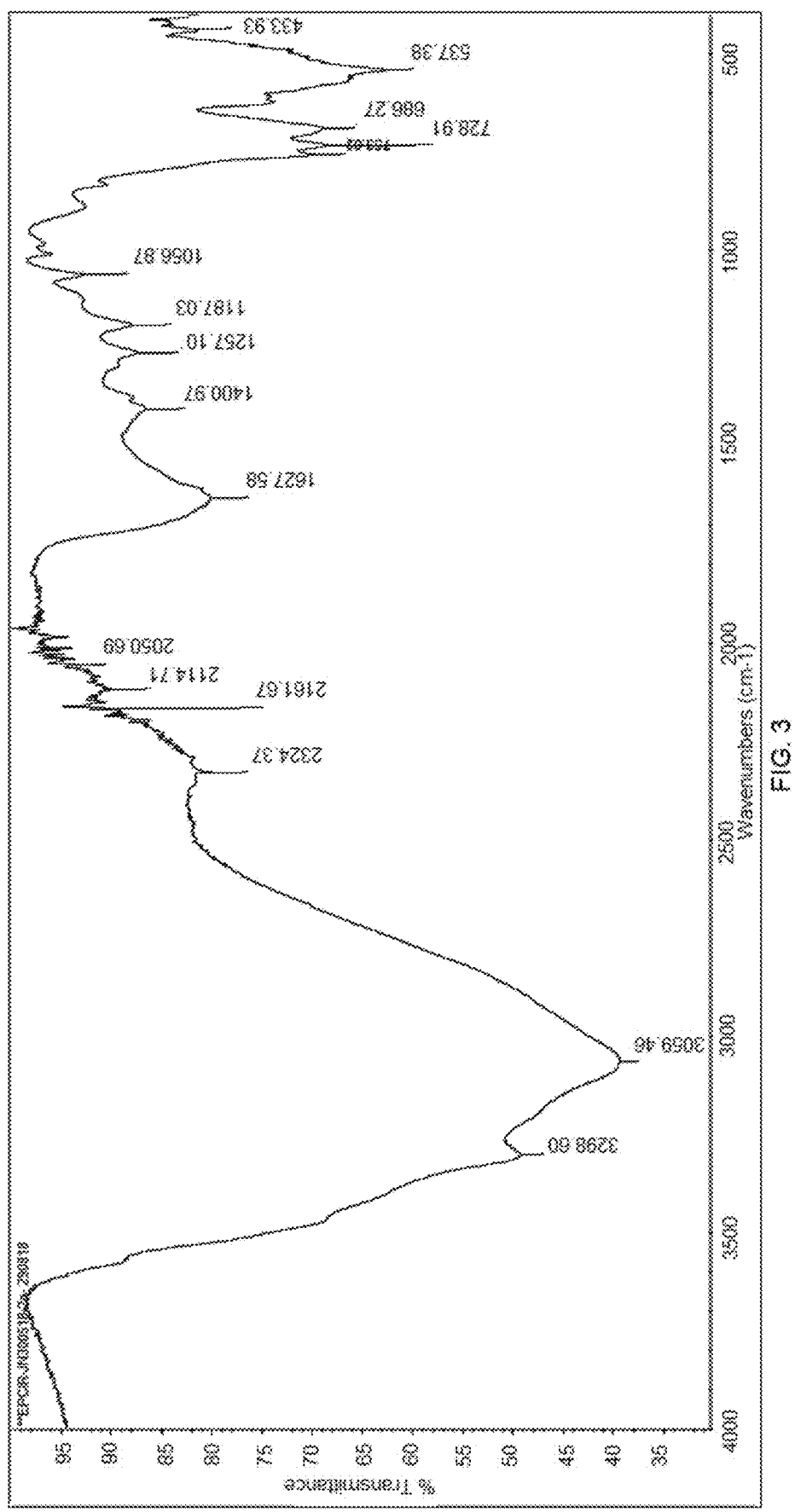
FIG. 3 shows the infrared spectra of a diperiodatoargentate potassium salt (JN300518-2a).

Solid state vibrational spectra of JN300518-2a was obtained via infrared spectroscopy (Thermo Scientific iS50 ATR Spectrometer, Analest, Analytical Laboratory for Environmental Science Research and Training Facility University of Toronto) and 8 scan background subtraction as shown in FIG. 3 and Table 3.

TABLE 3

Infrared vibrational frequencies of oxidized metal complexes.

| $Na_5Ag(IO_5OH)_2 \cdot 12$ $H_2O$ (Denger et al. 1993) IR ($cm^{-1}$) | $Na_5Ag(IO_5OH)_2 \cdot x$ $H_2O$ (Balikunger et al. 1977) | JN300518-2a | Assignment |
|---|---|---|---|
| 3580 vs | | 3200 sh | $\nu$(OH) |
| 3000 vs | 3300 | 3059 vs | $\nu$(OH) |
| 2392 m | 2200 | 2324 sh | $\nu$(OH) |
| 1668 sh | 1660 sh | | $\delta$(HOH) |
| 1639 s | 1620 s | 1628 br | $\delta$(HOH) |
| | | 1401 w | |
| 1216 m | | 1257 w | $\delta$(IOH) |
| 1160 w | | 1187 w | $\delta$(IOH) |
| 1063 w | 1050 | 1057 w | $\delta_{as}$(AgOH)/ |
| | | 753 sh | $\nu_{as}$(AgO2) |
| 723 s | 770 | 729 s | $\nu_{as}$(IO) |
| 691 sh | 715 | 686 sh | $\nu_{as}$(IO) |
| 619 s | 630 | | $\nu_{as}$(IO) |
| 530 s | | 537 s | $\nu_{as}$(AgO) $\nu_{as}$(IO) |
| 399 s | | 433 w | $\nu_{as}$(AgO) $\nu_{as}$(IO) |
| 340 m | | | $\nu_{as}$(AgO) $\nu_{as}$(IO) |

Example 2

Reverse osmosis (RO) water (200.456 g), potassium iodate ($KIO_3$, 20.083 g), and potassium hydroxide (KOH, 15.023 g) were mixed with stirring in a 250 mL beaker at room temperature until dissolved (about 5 minutes). Potassium persulfate ($K_2S_2O_8$, 5.580 g) was added and stirred at room temperature until dissolved (about 10 minutes). To this clear colourless solution of periodate and persulfate, silver oxynitrate ($Ag_7NO_{ii}$, 22.643 g) was added and left to stir at room temperature for 2 hours. Following this reaction time, the cloudy red solution was left to settle and the supernatant decanted, and filtered through Whatman 40 ashless filter paper under vacuum filtration in a Buchner funnel. The filtrate was transferred to a large glass vessel and the product was crystalized via evaporation, resulting in the isolation of bright red crystals (JN150618-3, proposed $K_{5-3}H_{0-2}Ag(IO_5OH)_2$). The isolated crystals were dried in a drying chamber at 25° C. with forced air until a steady weight was observed, transferred into transparent glass scintillation vials, and stored under ambient light and temperature.

Figure 4A:
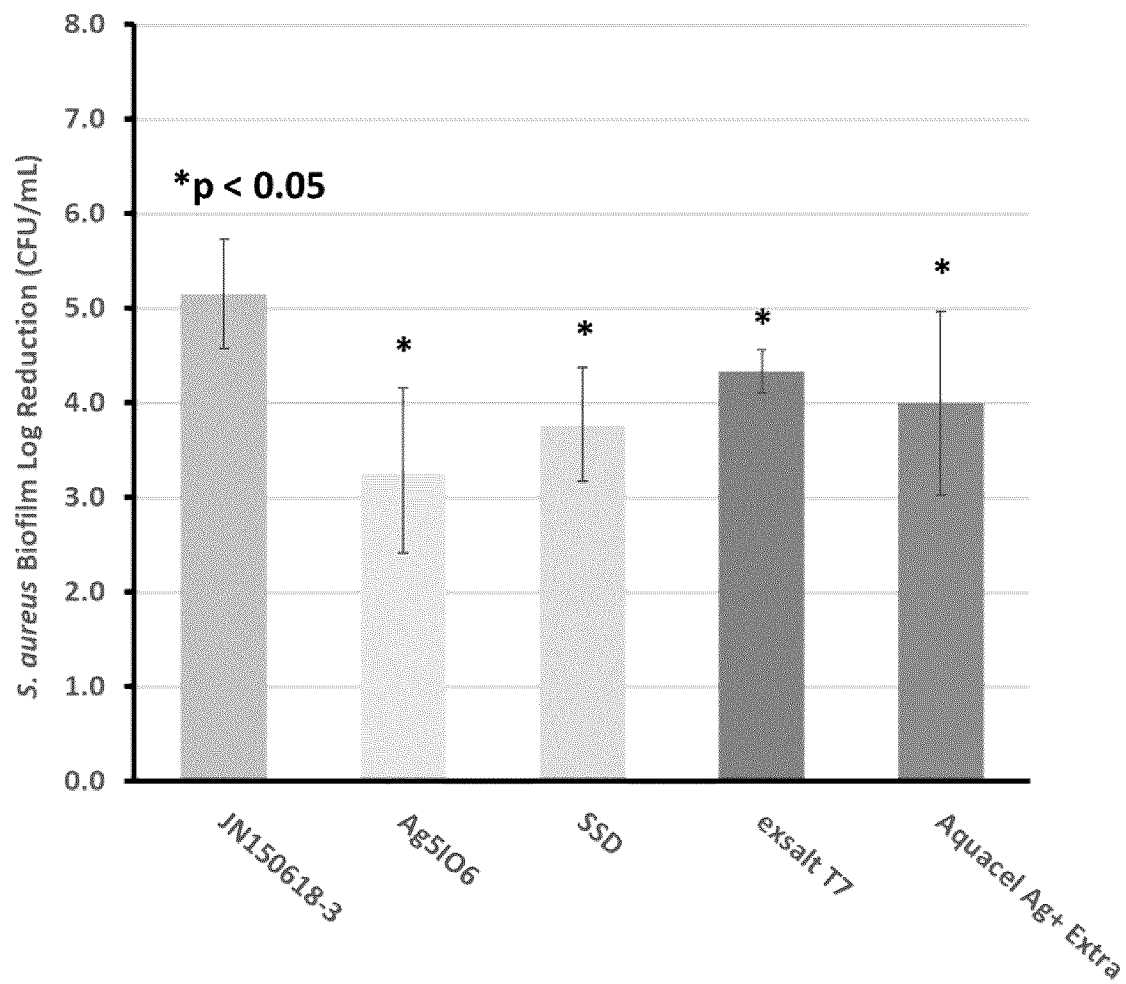
FIG. 4A is a graph showing results of a S. aureus antibiofilm assay comparing efficacy of oxidized metal complexes (JN150618-3, 0.4 mg Ag/cm² & JN-280518-1, 0.4 mg Ag/cm²), pentasilver periodate ($Ag_5IO_6$, 0.4 mg Ag/cm²), commercially available silver oxynitrate (Exsalt™ T7, 0.4 mg Ag/cm²), silver sulfadiazine, and silver chloride with benzethonium chloride and ethylenediamine-tetraacetic acid (Aquacel™ Ag Extra) silver antimicrobial agents.
Figure 4B:
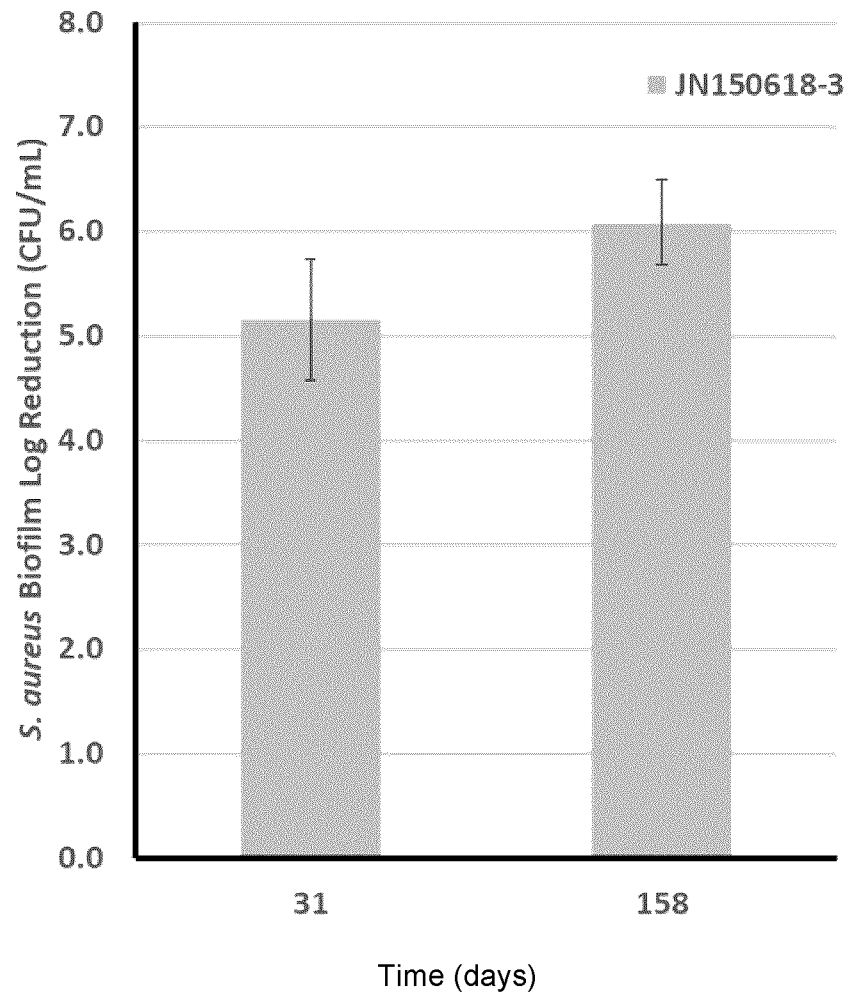
FIG. 4B is a graph showing results of a S. aureus antibiofilm assay comparing efficacy of JN150618-3 (0.4 mg Ag/cm²) over time.

The antimicrobial activity of the compound was evaluated by exposure to *Staphylococcus aureus* biofilms. Briefly, *S. aureus* biofilms were grown on sterile gauze at 37° C. for 72 hours (gauze was re-inoculated with *S. aureus* at 24 hours and 48 hours). After incubation, the gauze was rinsed with sterile water and placed onto Mueller Hinton agar (MHA) plates. The compound was dissolved in aqueous (RO water) solution at a concentration of 0.4 mg Ag/$cm^2$ or 10 mg Ag per 5×5 cm testing and placed on top of the gauze. The plates were incubated for 6 hours at 37° C. The remaining solution containing metal complexes was removed from the biofilm and the biofilm/gauze was neutralized in 10 mL of sodium thioglycolate. The bacteria were agitated to remove them from the gauze and the resulting bacterial suspensions were diluted and spread onto MHA plates which were incubated for 18-24 hours at 37° C. and the resulting viable bacterial colonies were enumerated. The log-reduction of *S. aureus* was calculated relative to the reduction achieved in the "no treatment" negative control samples. Results represent the average of triplicate data. The assay was repeated upon the aged solid state at a shelf life of 5 months (FIGS. 4A-B).

Example 3

In a 500 mL beaker, RO water (160.103 g) and potassium persulfate ($K_2S_2O_8$, 10.508 g) were mixed with stirring at room temperature until dissolved (about 10 minutes). In a 25 mL beaker, RO water (6.958 mL) and silver nitrate ($AgNO_3$, 3.018 g) were mixed with stirring at room temperature until dissolved (about 5 minutes). This silver nitrate solution was added to the potassium persulfate solution with stirring and reacted for 30 minutes at room temperature, resulting in a turbid black solution, pH 1.21. The 500 ml beaker was then transferred to a circulating hot water bath previously set at 80° C. In a 100 mL beaker, RO water (33.031 mL), potassium hydroxide (KOH, 9.439 g), and potassium periodate ($KIO_4$, 8.232 g) were mixed with stirring at room temperature until dissolved (about 5 minutes). This potassium periodate-potassium hydroxide solution was added to the silver nitrate-potassium persulfate solution at the 30-minute reaction time in the 80° C. circulating water bath. The temperature of the reaction solution reached 80±3° C. after 30 minutes. Heating at 80° C. with stirring was continued for 1.5 hours to provide a deep red solution, pH 11.78.

Following the reaction time, the slightly turbid deep red solution was transferred to an ice bath to cool rapidly to 24° C., and then was filtered to remove yellow/brown precipitate (4.020 g) from the deep red clear filtrate. The deep red filtrate was then titrated with 0.5 M $HNO_3$ while stirring down to pH 6.38 at which point an orange precipitate formed in solution. The orange precipitate was isolated via filtration from a pale-yellow solution, rinsing with cold water and acetone and dried in a drying chamber at 25° C. with forced air until a steady weight was observed, transferred into transparent glass scintillation vials, and stored under ambient light and temperature. The bright orange powder designated as JN231118-1b exhibited the following properties: 10.866 g, 14.6 wt/wt % Ag as evaluated by potentiometric titration, 83.4% yield as determined by UV-Vis $\lambda_{max}$ 364 nm, $\varepsilon = 1.36 \times 10^4$ $M^{-1}cm^{-1}$, proposed $K_{4-1}H_{1-4}Ag(IO_5OH)_2$.

Figure 5A:
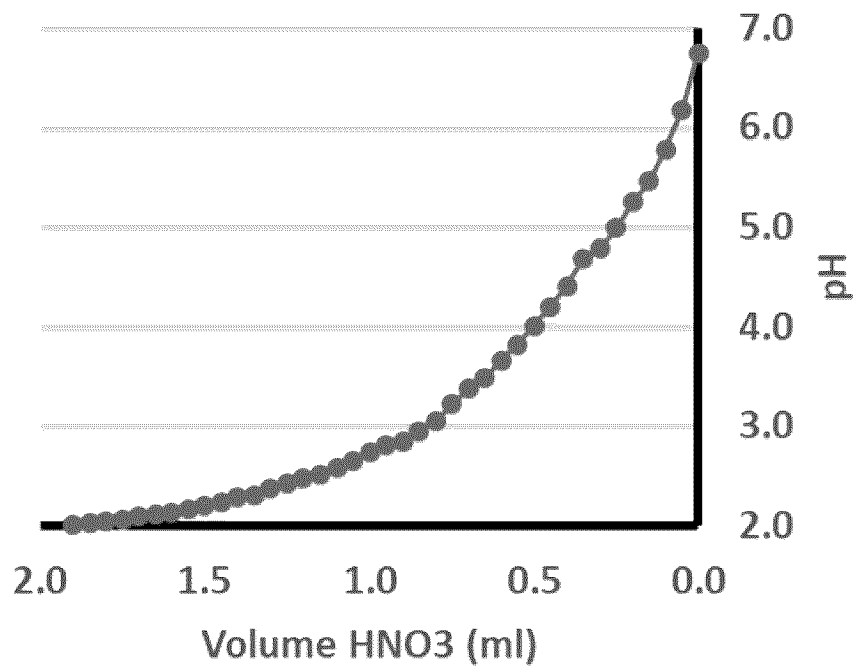
FIG. 5A is a graph showing the acid titration of JN301118-1 (0.256 g, 15.0 wt/wt % Ag, isolated at pH 6.77) conducted using standardized nitric acid solution (0.521 M $HNO_3$).
Figure 5B:
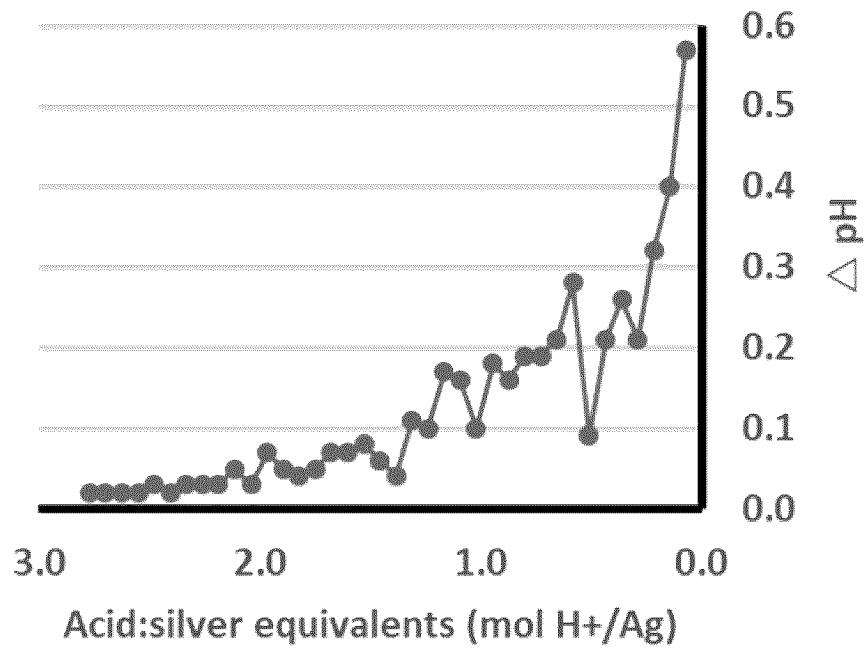
FIG. 5B is a graph showing the first derivative of acid titration of JN301118-1 (0.256 g, 15.0 wt/wt % Ag, isolated at pH 6.77) with standardized nitric acid solution (0.521 M $HNO_3$).
Figure 5C:
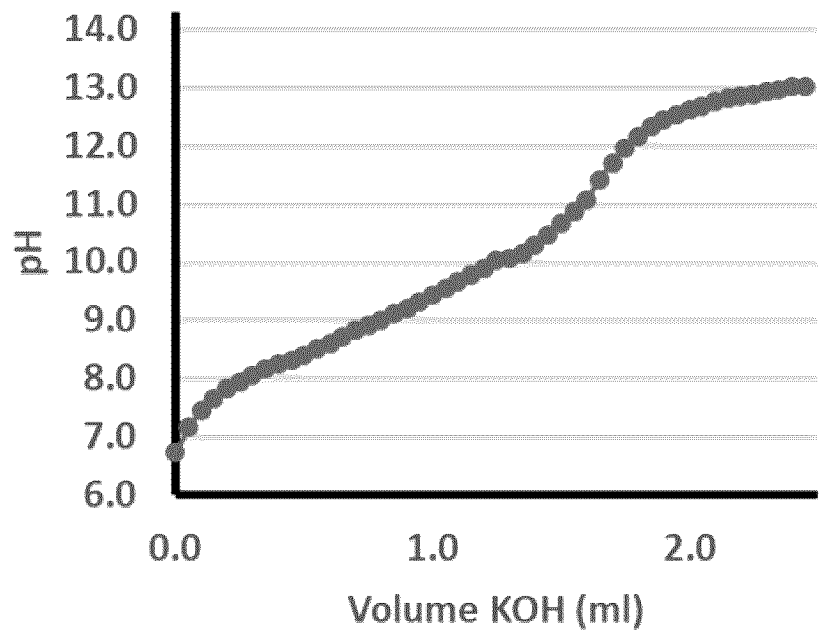
FIG. 5C is a graph showing the base titration of JN301118-1 (0.256 g, 15.0 wt/wt % Ag, isolated at pH 6.77) conducted using standardized potassium hydroxide solution (0.429 M KOH).
Figure 5D:
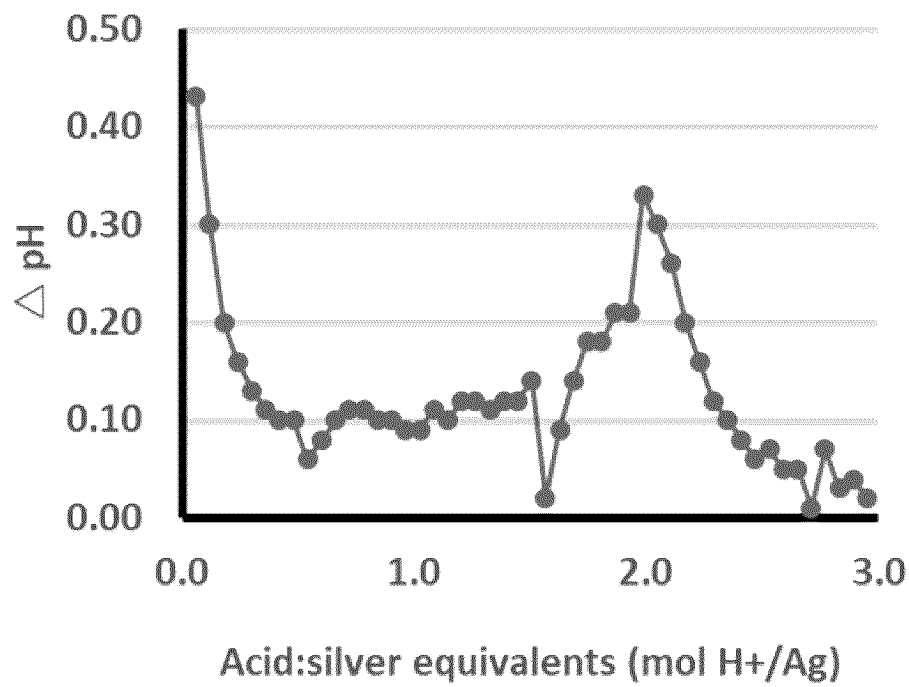
FIG. 5D is a graph showing the first derivative of base titration of JN301118-1 (0.256 g, 15.0 wt/wt % Ag, isolated at pH 6.77) with standardized potassium hydroxide solution (0.429 M KOH).

The bright orange powder (JN231118-1b) was recrystallized. Briefly, RO water (79.502 g) heated to 50° C. was added slowly to the bright orange powder (4.007 g) until the majority of the powder appeared to dissolve. Minor yellow precipitate was observed and removed through filtration using a 2 µm nylon syringe filter while hot (50° C.) to produce a clear dark red solution, pH 6.77. This solution was left to cool to room temperature while evaporating to produce bright red crystals (JN301118-1, 15.0 wt/wt % Ag as evaluated by potentiometric titration, proposed $K_{4-1}H_{1-4}Ag(IO_5OH)_2O$. Protonation state of the purified bright red crystals (JN301118-1) was determined by acid and base pH titration (Apera PC800 pH/conductivity meter, Exciton Technologies Inc, Toronto, Ontario). Base titration was conducted using potassium hydroxide solution (0.429 M KOH) standardized with potassium hydrogen phthalates (KHP, 99.99%, acidimetric standard). Briefly, JN301118-1 (0.256 g) was added to RO water (9.0 mL) and stirred to dissolve where upon KOH (0.429 M) was titrated while stirring in 50 µl increments. Acid titration was conducted using nitric acid solution (0.521 M $HNO_3$) standardized with sodium carbonate ($Na_2CO_3$, 99.95-100.05% ACS primary standard. JN301118-1 (0.257 g) was added to RO water (9.0 mL) and stirred to dissolve whereupon $HNO_3$ (0.521 M) was titrated while stirring in 50 µL increments. Titration curves for JN300118-1 are shown for the acid (FIGS. 5A-B) and base (FIGS. 5C-D) titrations.

Example 4

In a 500 mL beaker with lid and stir bar set into a circulating water bath set to 40° C., RO water (160.745 g) was placed and heated until the internal temperature was 40±3° C. Into this stirring solution, potassium persulfate ($K_2S_2O_8$, 30.782 g) was added and stirred until dissolved (about 5 minutes). In a 25 mL beaker, RO water (7.661 mL) and silver nitrate ($AgNO_3$, 9.010 g) were mixed with stirring at room temperature until dissolved (about 5 minutes). This silver nitrate solution was added to the 40° C. potassium persulfate solution with stirring in the circulating hot water bath and reacted for 5 minutes at 40° C., resulting in a turbid black solution, pH 1.14. In a 100 mL beaker, RO water (44.533 mL), potassium hydroxide (KOH, 28.10 g), and potassium periodate ($KIO_4$, 24.519 g) were mixed with stirring at room temperature until dissolved (about 5 minutes). This potassium periodate-potassium hydroxide solution was added to the silver nitrate-potassium persulfate solution at the 5-minute reaction time in the 40° C. circulating water bath. The temperature of the circulating hot water bath was then immediately increased to 90° C. The reaction solution reached 90±3° C. after 35 minutes. Heating at 90° C. with stirring was continued for an additional 1.5 hours to provide a deep red solution, pH 9.92.

Following the reaction time, the slightly turbid deep red solution was removed from stirring and heat and left to settle for approximately 10 minutes, and then was filtered to remove yellow/brown precipitate (9.485 g) from the deep red clear filtrate. The red clear filtrate was then titrated at room temperature with 2.0 M $HNO_3$ down to a final effective pH of 6.81 at which point a solid orange precipitate formed and was isolated from the pale-yellow clear filtrate. The precipitate was rinsed with cold water and acetone then placed drying chamber at 25° C. with forced air until a steady weight was observed, transferred into transparent glass scintillation vials, and stored under ambient light and temperature. The orange powder designated as JN160119-2 exhibited the following properties: 28.950 g, 65.4% yield as determined by UV-Vis $\lambda_{max}$ 364 nm, $\varepsilon = 1.36 \times 10^4$ $M^{-1}cm^{-1}$, proposed $K_{44}H_{1-4}Ag(IO_5OH)_2O$.

Example 5

RO water (300.07 g), potassium hydroxide (KOH, 28.19 g) and potassium periodate ($KIO_4$, 24.440 g) were mixed with stirring at room temperature in a 500 mL beaker until dissolved (about 5 minutes). Silver nitrate ($AgNO_3$, 9.04 g) was added immediately, followed by potassium persulfate ($K_2S_2O_8$, 31.59 g). The solution was maintained at room temperature and left to stir at room temperature for 2 hours. Following this reaction time, the cloudy red solution was left to settle and the supernatant decanted, and filtered through Whatman 40 ashless filter paper under vacuum filtration in a Buchner funnel. The filtrate was transferred to a large glass vessel and the product was crystalized via evaporation, resulting in the isolation of bright orange powder (JN240718-1a, proposed $K_{5-3}H_{0-2}Ag(IO_5OH)_2$). The isolated crystals were dried in a drying chamber at 25° C. with forced air until a steady weight was observed, transferred into transparent glass scintillation vials, and stored under ambient light and temperature.

Figure 6A:
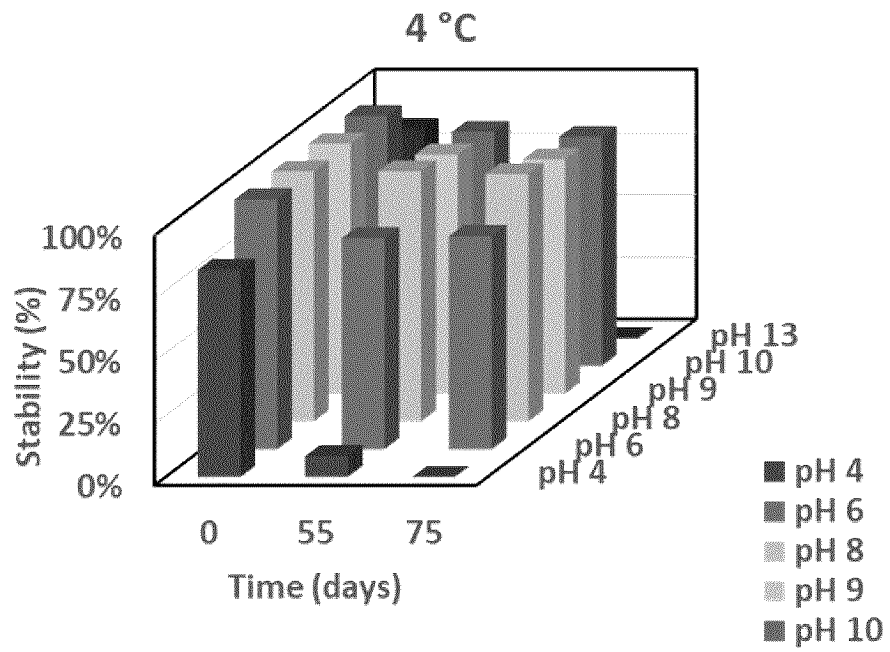
FIGS. 6A-C are graphs showing the relative percent stability as determined by the absorbance maximum of the UV-Vis spectra ($\lambda_{max}$=360 nm) of JN240718-1a (2.8 mM) from pH 4 to pH 13, pH adjusted with concentrated nitric acid (4 M) or potassium hydroxide (4 M), maintained at 37° C.
Figure 6B:
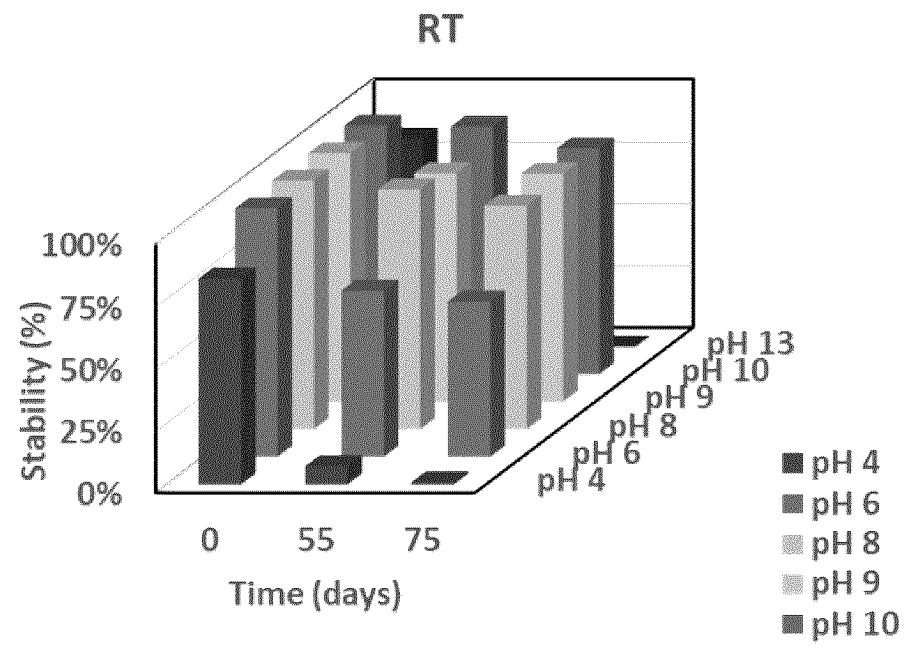
Figure 6C:
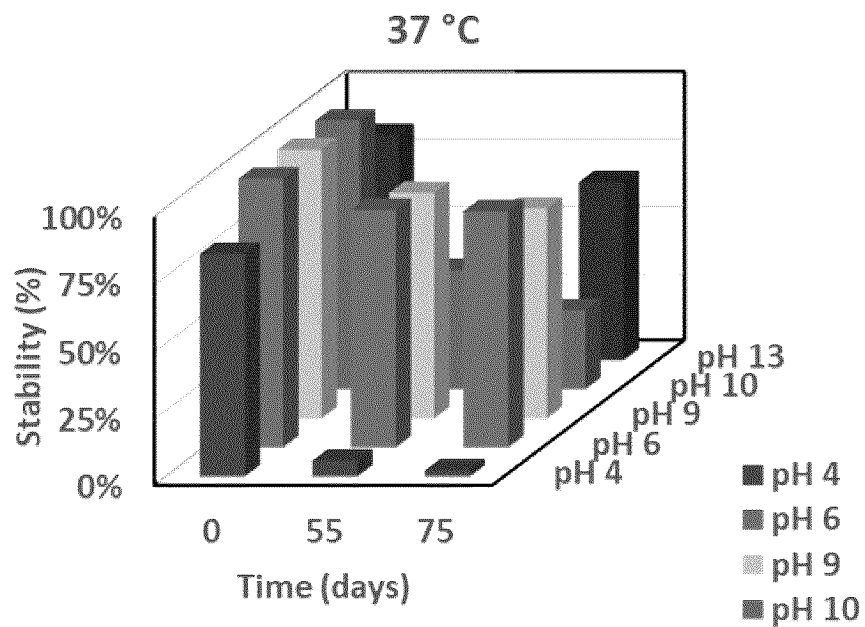

The long-term aqueous stability of the compound was evaluated over broad pH by titration of the original compound to a range of effective pH values (pH 4 to pH 13) and temperature ranges (4° C., ambient room temperature, and 37° C.). Individual sealed sample sets consisted of a 3 mM solution of the oxidized metal complex, JN240718-1a, adjusted to the following pH intervals:

pH 4—proposed $K_{0-2}H_{2-5}Ag(IO_5OH)_2$,
pH 6—proposed $K_{1-4}H_{1-4}Ag(IO_5OH)_2$, pH 8—proposed $K_{1-4}H_{1-4}Ag(IO_5OH)_2$,
pH 9—proposed $K_{3-4}H_{1-2}Ag(IO_5OH)_2$,
pH 10—proposed $K_{3-4}H_{1-2}Ag(IO_5OH)_2$, and
pH 13—proposed $K_{5-3}H_{0-2}Ag(IO_5OH)_2$ with either nitric acid ($HNO_3$; 4 M prepared by 4.4 mL $HNO_3$ in a 25 mL volumetric flask) or potassium hydroxide (KOH; 5.610 g in a 25 mL volumetric flask) and monitored over the duration of the experiment. Each pH range set was placed into stability evaluation over 75 days at 37° C., room temperature, and 4° C. These samples were analyzed in triplicate via UV Vis spectroscopy at periodic intervals (FIGS. 6A-C).

Example 6

In a 500 mL beaker, RO water (340.772 g) and potassium persulfate ($K_2S_2O_8$, 21.108 g) were mixed with stirring at room temperature until dissolved (about 10 minutes). In a 25 mL beaker, RO water (13.461 mL) and silver nitrate ($AgNO_3$, 6.350 g) were mixed with stirring at room temperature until dissolved (about 5 minutes). This silver nitrate solution was added to the potassium persulfate solution with stirring and reacted for 30 minutes at room temperature, resulting in a turbid black solution. The 500 ml beaker was then transferred to a circulating hot water bath previously set at 80° C. In a 100 mL beaker, RO water (42.447 mL), potassium hydroxide (KOH, 18.924 g), and potassium periodate ($KIO_4$, 16.450 g) were mixed with stirring at room temperature until dissolved (about 5 minutes). This potassium periodate-potassium hydroxide solution was added to the silver nitrate-potassium persulfate solution at the 30-minute reaction time in the 80° C. circulating water bath. The temperature of the reaction solution reached 80±3° C. after approximately 30 minutes. Heating at 80° C. with stirring was continued for 1.5 hours to provide a deep red solution, pH 12.30.

Following the reaction time, the slightly turbid deep red solution was transferred to an ice bath to rapidly cool to 24° C. then was filtered to remove yellow/brown precipitate (1.030 g) from the deep red clear filtrate. The deep red clear filtrate was then titrated with 0.5 M $HNO_3$ while stirring down to pH 7.01 at which point an orange precipitate formed in solution. The orange precipitate was isolated via filtration from a pale-yellow solution, rinsing with cold water and acetone and dried in a drying chamber at 25° C. with forced air until a steady weight was observed, transferred into transparent glass scintillation vials, and stored under ambient light and temperature. The bright orange powder was designated as JN171218-1 and exhibited the following properties: 19.99 g, 79.9% yield as determined by UV-Vis $\lambda_{max}$ 364 nm, $\varepsilon=1.36\times10^4$ $M^{-1}cm^{-1}$, proposed $K_{4-1}H_{1-4}Ag(IO_5OH)_2 \cdot O$.

Figure 7A:
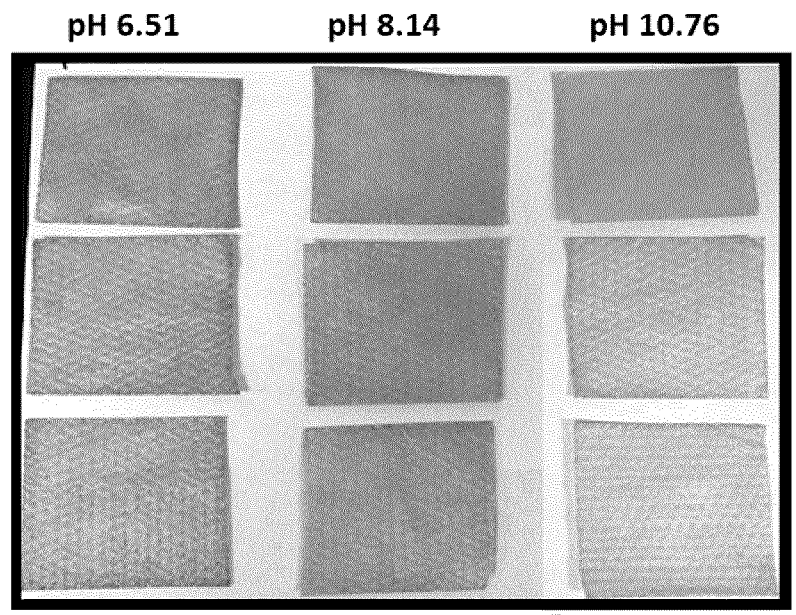
FIG. 7A shows images of diperiodatoargentate coated wound dressings coated at 0.1 mg Ag/cm$^2$ (JN171218-1b) adjusted to a range of effective pH values from 6.51 to 10.76.
Figure 7B:
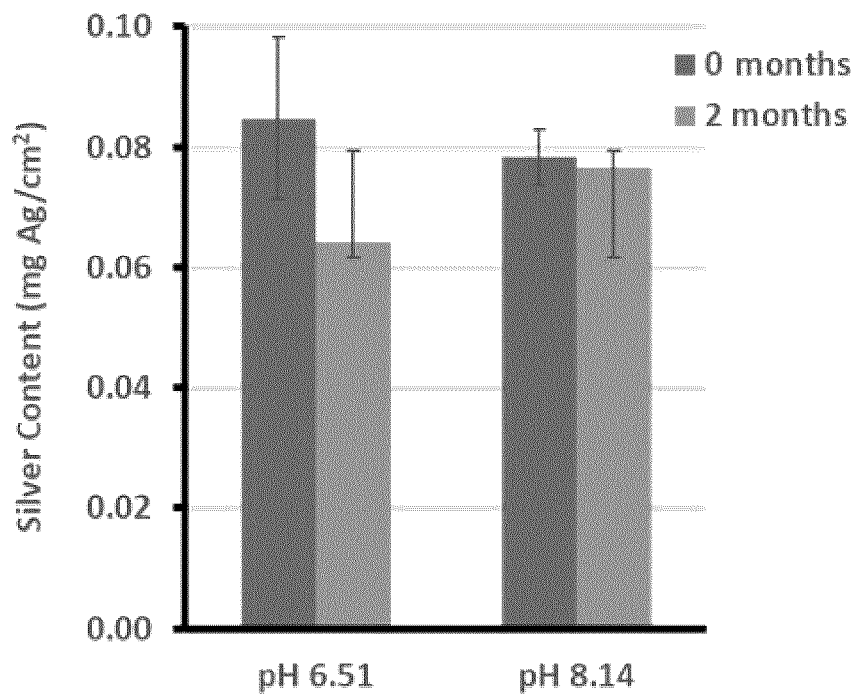
FIG. 7B is a graph showing the stability of diperiodatoargentate coated onto wound dressings substrates at pH 6.51 and pH 8.14 at 0.1 mg Ag/cm$^2$ (JN171218-1b) over two months in open air under ambient light and humidity. Diperiodatoargentate stability was evaluated via UV-Vis spectroscopy.

Composite non-woven and non-adherent substrate prototypes were prepared with the bright orange powder isolate (JN171218-1). Briefly, a stock solution was prepared by adding JN171218-1 (0.369 g) into RO water (20.221 g) stirring at room temperature for 10 minutes to dissolve, pH 6.51. Volumes of this solution (0.75 to 0.90 mL) were drip-coated onto triplicate sample sets of 5 cm×5 cm samples of a non-woven and non-adherent substrate. This same solution was then titrated with 2.0 M KOH to increase the pH to 8.14 and 10.76 where the solution (0.82±0.04 mL) was then drip-coated onto triplicate sample sets of 5 cm×5 cm samples of a non-woven and non-adherent substrate. Then the substrates were dried in a drying chamber at 25° C. with forced air until a steady weight was observed. Uniformly coated non-adherent substrates (FIG. 7A) were stored in open air under ambient light and humidity for 2 months and the stability of the silver (III) diperiodato were evaluated by UV-Vis ($\lambda_{max}$ 364 nm, $\varepsilon=1.36\times10^4$ $M^{-1}cm^{-1}$) as shown in FIG. 7B.

Figure 7C:
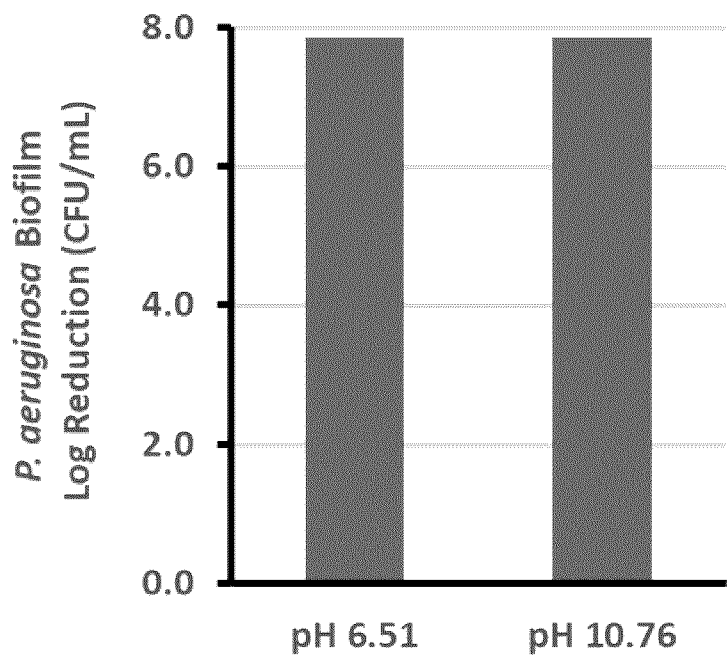
FIG. 7C is a graph showing the antimicrobial efficacy of diperiodatoargentate coated onto wound dressings substrates at pH 6.51 and pH 10.76 at 0.1 mg Ag/cm$^2$ (JN171218-1b) evaluated against *P. aeruginosa* established biofilm, 2 hour treatment time vs. untreated control.

The antimicrobial efficacy of silver (III) diperiodato coated substrates was evaluated by exposure to *Pseudomonas aeruginosa* biofilms. Briefly, *P. aeruginosa* biofilms were grown on sterile gauze at 37° C. for 72 hours (gauze was re-inoculated with *P. aeruginosa* at 24 hours and 48 hours). After incubation, the gauze was rinsed with sterile water and placed onto Mueller Hinton agar (MHA) plates. The silver (III) diperiodato coated substrates, pH 6.51 and pH 10.76, were placed on top of the gauze. The plates were incubated for 2 hours at 37° C. The silver (III) diperiodato coated substrates were then removed from the biofilm and the biofilm/gauze was neutralized in 10 mL of sodium thioglycolate. The bacteria were agitated to remove them from the gauze and the resulting bacterial suspensions were diluted and spread onto MHA plates which were incubated for 18-24 hours at 37° C. and the resulting viable bacterial colonies were enumerated. The log-reduction of *P. aeruginosa* was calculated relative to the reduction achieved in the "no treatment" negative control samples. Results represent the average of triplicate data (FIG. 7C).

Example 7

RO water (305.04 g) was added into a 1000 mL polypropylene beaker and set onto a Silverson™ L5M-A Laboratory Mixer with General-Purpose disintegrating roto-stator mixing head set to stir at 2000 rpm. The vessel was heated to 80° C. in a circulating bath. Potassium hydroxide (KOH, 28.149 g) and potassium periodate ($KIO_4$, 24.457 g) were added with stirring at room temperature until dissolved (about 5 minutes). Silver nitrate ($AgNO_3$, 9.066 g) was added immediately, followed by the addition of potassium persulfate ($K_2S_2O_8$, 31.524 g). The solution was maintained at 80° C. and left to stir for 2 hours. Following this reaction time, the cloudy red solution was left to settle and the deep red clear supernatant decanted, and transferred to a large glass vessel. The product was crystalized via evaporation, resulting in the isolation of bright orange powder (JN161018-2, proposed $K_{5-11}H_{0-4}Ag(IO_5OH)_2$). The isolated crystals were dried in a drying chamber at 25° C. with forced air until a steady weight was observed, transferred into transparent glass scintillation vials, and stored under ambient light and temperature.

Acid base titration and buffering capacities were assessed. JN161018-2 (10.343 g) and RO water (60 g) were mixed with stirring in a 100 mL beaker until dissolved to yield a clear deep red solution (pH 10.5). This solution was titrated at room temperature with nitric acid ($HNO_3$, 0.5 M) while monitoring pH (PC800 Benchtop pH/Conductivity Meter) down to pH 8.29 at which point a deep orange precipitate appeared and was filtered out of solution with a fine glass frit Buchner funnel to isolate a deep orange-red powder (JN061118-1a, proposed $K_{4-1}H_{1-4}Ag(IO_5OH)_2$) having a silver content of 12.5 wt/wt % as determined by potentiometric titration.

Figure 8A:
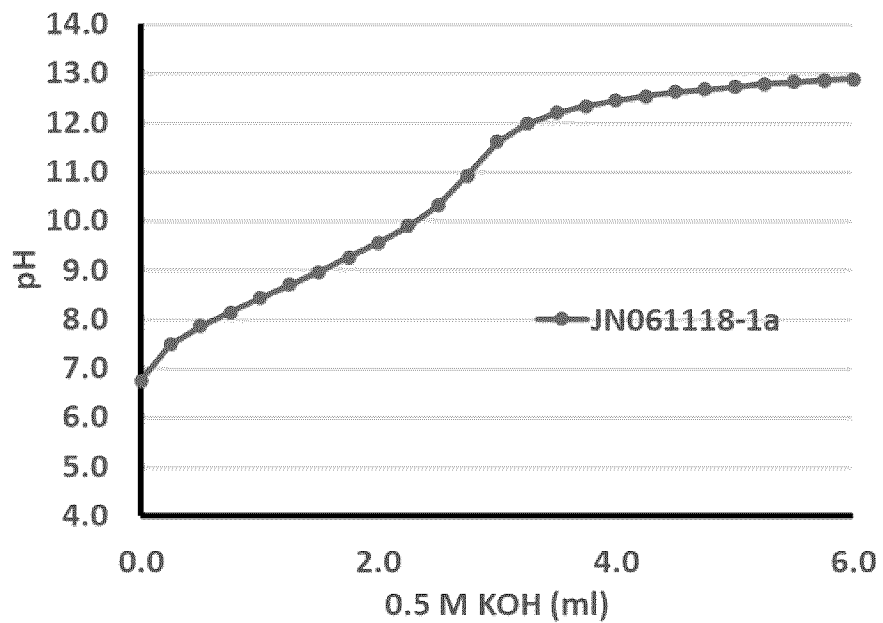
FIG. 8A is a graph showing the base titration of orange-red powder (JN061118-1a, 12.5 wt/wt % Ag, isolated at pH 8.29) conducted using standardized potassium hydroxide solution (0.429 M KOH).

JN061118-1a (0.504 g) was added into a 25 mL volumetric flask and dissolved with RO water. The solution was transferred to a 50 mL glass beaker with stirring, and titrated at room temperature with KOH (0.5 M) while monitoring pH up to a pH of 13.02 (FIG. 8A). Variable isolation and purification processes were performed on this sample in attempt to control purity and identify the isolated product.

Figure 8B:
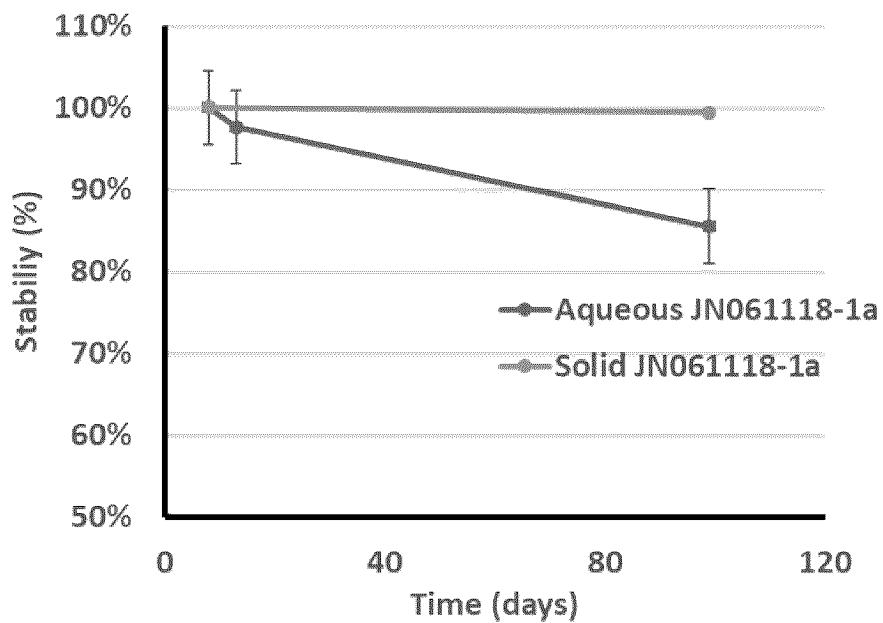
FIG. 8B is a graph showing the stability of the orange-red powder (JN061118-1a, 12.5 wt/wt % Ag, isolated at pH 8.29) which was evaluated in the solid state and solution phase stored under ambient conditions and analyzed via UV Vis spectroscopy.

Stability of the orange-red powder isolated at pH 8.29 (JN061118-1a) was evaluated in the solid state stored under ambient conditions. At periodic time points, a solid sample (approximately 0.041 g) was transferred from the storage vial into a 25 mL volumetric flask which was filled with RO water. Each sample was analyzed via UV Vis spectroscopy (Synergy™ Neo2 HTS Hybrid Spectrophotometer, SickKids Core Facility University of Toronto) in triplicate as shown in FIG. 8B. The concentration of the complex was determined as described below.

Solution phase stability of the orange-red powder isolated at pH 8.29 (JN061118-1a) was determined by monitoring the solutions of the original solid state sample (approximately 0.041 g sample/25 ml RO water) over time. Solutions were stored in sealed glass vials at room temperature under ambient lighting and aliquot samples were taken periodically from the solutions and evaluated via UV-Vis spectroscopy in triplicate as shown in FIG. 8B. The concentration of the complex was determined as described below.

Solid state and solution phase stability was determined using the absorption coefficient as determined from the pure isolated compound $\lambda_{max}$ 365 nm=$1.36 \times 10^4$ $M^{-1}cm^{-1}$ cf. $1.40 \times 10^4$ $M^{-1}cm^{-1}$ (Cohen & Atkinson 1964). JN161018-2 (20.010 g) was added to RO water (25 g) in a 100 mL beaker until dissolved to yield a clear deep red solution. This solution was chilled to 0° C. on a salted iced bath to precipitate a pale-yellow solid from solution. This solid was isolated from the product via filtration through a fine glass frit Buchner funnel and rinsed with 0° C. RO water (23.7 g) to isolate a deep red solution. This deep red solution was then split into three portions:

- Half of the solution was warmed to room temperature and isolated via evaporation, yielding a deep orange crystal (JN081118-2a, proposed $K_{3-5}H_{0-2}Ag(IO_5OH)_2$) having a silver content of 4.5 wt/wt % as determined by potentiometric titration.
- One quarter of the solution was titrated at room temperature with nitric acid ($HNO_3$, 2 M) while monitoring pH down to pH 7.5, at which a deep orange precipitate appeared and was filtered out of solution with a fine glass frit Buchner funnel to isolate a deep orange-red powder (JN081118-2b, proposed $K_{4-1}H_{1-4}Ag(IO_5OH)_2$) having a silver content of 14.6 wt/wt % as determined by potentiometric titration.
- One quarter of the solution was maintained at 0° C. on a salt-ice bath and titrated at room temperature with nitric acid ($HNO_3$, 2 M) while monitoring pH down to pH 7.16, at which an orange precipitate appeared and was filtered out of solution with a fine glass frit Buchner funnel to isolate an orange powder (JN081118-2c, proposed $K_{44}H_{1-4}Ag(IO_5OH)_2$) having a silver content of 14.7 wt/wt % as determined by potentiometric titration.

JN161018-2 (10.023 g) and RO water (30 g) were mixed with stirring in a 100 mL beaker until dissolved to yield a clear deep red solution. This solution was chilled to 0° C. on a salted iced bath to precipitate a pale-yellow solid from solution. This solid was isolated from the product via filtration through a fine glass frit Buchner funnel, and rinsed with RO water (0° C., 30 g) to isolate a deep red solution. This solution was titrated at room temperature with nitric acid ($HNO_3$, 2 M) while monitoring pH down to pH 2.51, at which a brown precipitate appeared and was filtered out of solution with a fine glass frit Buchner funnel to isolate a red-brown powder (CS061118-2, proposed $K_{0-2}H_{3-5}Ag(IO_5OH)_2$) having a silver content 16.0 wt/wt % as determined by potentiometric titration.

Figure 9:
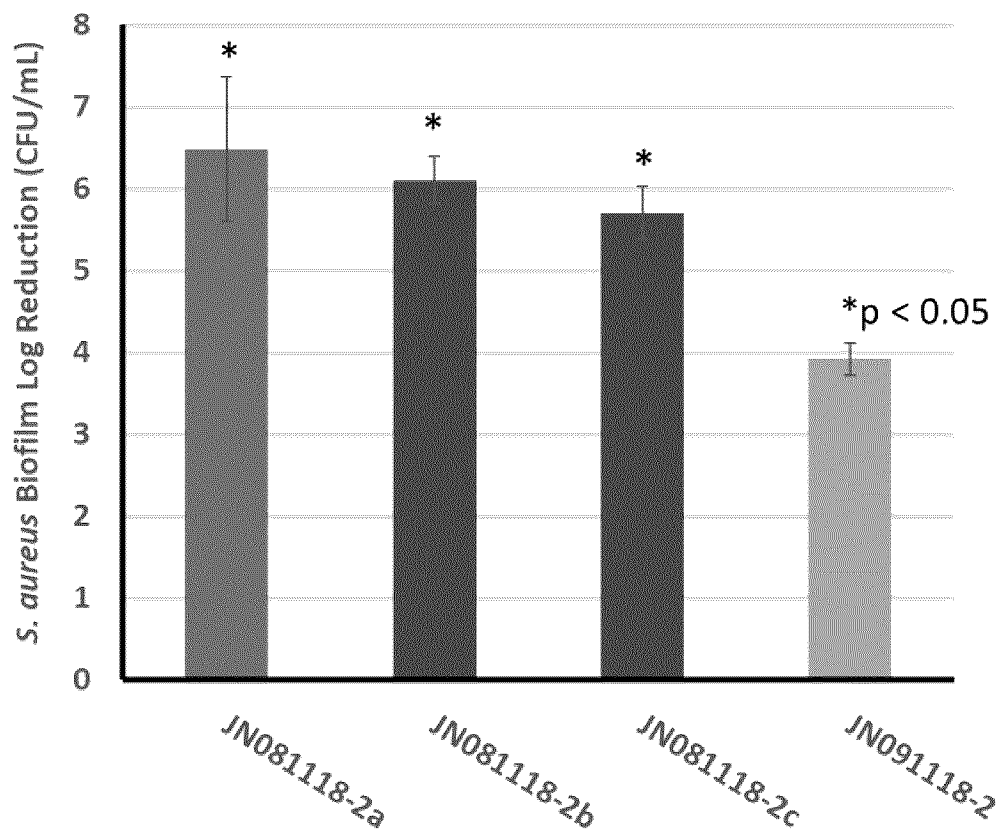
FIG. 9 is a graph showing results of a *S. aureus* antibiofilm assay evaluating efficacy of JN081118-2a, JN081118-2b, JN081118-2c, and JN091118-2 (0.4 mg Ag/cm$^2$).

The antimicrobial activity of the compounds was evaluated by exposure to *Staphylococcus aureus* biofilms as described in Example 2, with the exception that a semi-solid formulation (about 0.083 g) was dissolved into RO water (1 mL) and placed on top of the gauze biofilm. For comparison sodium diperiodatoargentate $Na_5Ag(IO_5OH)_2 16H_2O$ (JN091118-2) was prepared as per the methods of Cohen & Atkinson below in Example 8 (Cohen & Atkinson 1964). JN091118-2 was also evaluated at the same concentration (FIG. 9).

Example 8

Sodium diperiodatoargentate $Na_5Ag(IO_5OH)_2 16H_2O$ (JN091118-2) was prepared as per the methods of Cohen & Atkinson (1964). Briefly, RO water (50.529 g) was heated to 50° C. in a 100 mL beaker. Potassium hydroxide (KOH, 6.249 g) and potassium iodate ($KIO_3$, 5.004 g) were added with stirring until dissolved (about 5 minutes). Argentic oxide (AgO, 5.014 g) was then added. The solution was then immediately heated to boiling, 100° C. and removed from heat. Following this, the black cloudy red solution was filtered through a fine glass frit at elevated temperatures. The filtrate in the form of a deep red clear solution was then placed back to stir and to this solution, 10.008 g NaOH was added and an orange precipitate appeared. The precipitate was isolated via filtration, by rinsing with cold water, addition to RO water (50 mL), heated to 8° C., and then filtered hot. The dark red filtrate was left to cool and orange product (0.216 g, JN091118-2, theoretically $Na_5Ag(IO_5OH)_2 16H_2O$ 11.1 wt/wt % Ag, 0.55% yield) was collected and dried in a drying chamber at 25° C. with forced air until a steady weight was observed, transferred into transparent glass scintillation vials, and stored under ambient light and temperature.

Example 9

Pentasilver periodate was prepared following Nadworny et al. (International Publication No. WO/2014/029013, published Feb. 27, 2014) by mixing RO water (250 mL) and potassium hydroxide (KOH, 40.8 g, size reduced with a mortar and pestle to improve dissolution) with stirring in a 400 mL beaker until dissolved. Potassium meta-periodate (14.4 g) was added with stirring until dissolved. Silver nitrate (45.6 g) was added to yield a brown precipitate and stirred for a minimum of 10 minutes. Following this reaction time, the solution was left to settle for 2 hours and the supernatant decanted, and filtered through Whatman 40 ashless filter paper under vacuum filtration in a Buchner funnel. The pentasilver hexaoxoiodate ($Ag_5IO_6$) cake was initially washed using a small amount of RO water, followed by a slurry wash with RO water (200 mL) and an acetone wash. Larger aggregates were broken up using a spoonula. The wash sequence was repeated if white crystal (nitrate, $NO_3$) formed. The cake and filter paper were carefully removed onto a large petri dish and left to dry under cover in a fume hood for a minimum 2 hours. The pentasilver periodate was transferred into transparent glass scintillation vials, and stored under ambient light and temperature. The antimicrobial activity was evaluated by exposure to *Staphylococcus aureus* biofilms as described in Example 2.

Example 10

RO water (3.065 g) and silver nitrate (2.418 g) were mixed with stirring at room temperature in a 50 mL beaker.

RO water (64.904 g) and potassium persulfate (8.401 g) were mixed in a 250 mL beaker at 40° C. for 10 min. The silver nitrate solution was added to the persulfate solution and mixed at 40° C. for 8 min. RO water (14.232 g), potassium hydroxide (6.625 g), and potassium periodate (7.870 g) were mixed with stirring in a 50 mL beaker at 70° C. for 5 min. Following the reaction of silver nitrate with potassium persulfate, the basic periodate solution was added to the turbid black stirring silver suspension and the temperature was increased to 85° C. with stirring for 90 minutes. The dark red solution (pH 13.51) was cooled to 26° C. and titrated to pH 2.02 under stirring with 2 M $HNO_3$ to yield a red-brown precipitate. The precipitate was isolated under vacuum filtration and resuspended in RO water (51.621 g) under stirring and immediately titrated to pH 7.43 with 1 M NaOH to yield an orange powder which was filtered through a fine porosity glass frit. The orange powder (JN070519-1b) was washed 3×25 mL RO water and 3×15 mL acetone. The vacuum was left to run for an additional 10 mins to allow the powder to dry. The orange powder (7.746 g; JN070519-1b) was transferred into a transparent glass scintillation vial and stored under ambient light and temperature.

Example 11

RO water (50.121 g) and silver diperiodate ($K_3Ag(IO_4(OH)_2)_2(H_2O)_4$), 747.05 g/mol, 2.568 g) were mixed at room temperature (RT) with stirring in a 100 mL beaker. The silver diperiodate solution was titrated to pH 10.53 with 2 M KOH in 100 µl aliquots to yield a transparent red solution. Sodium nitrate ($NaNO_3$, 3.345 g) and RO water (10.53 g) were mixed with stirring in a 100 mL beaker at room temperature. The sodium nitrate solution was added directly to the silver diperiodate solution. The solution was left to stir at room temperature for 30 mins. The turbid orange solution was filtered through a medium porosity glass frit under vacuum. The isolated orange crystals (VM261119-1) were washed 3×25 mL RO water (40° C.) and 3×15 mL acetone ($C_6H_6O$, 58.8 g/mol), dried under vacuum for an additional 10 mins, and transferred to a weigh boat to dry under air until a steady weight was observed. The orange crystalline powder (2.223 g; VM261119-1) was transferred into a transparent glass scintillation vial and stored under ambient light and temperature.

Example 12

Figure 11:
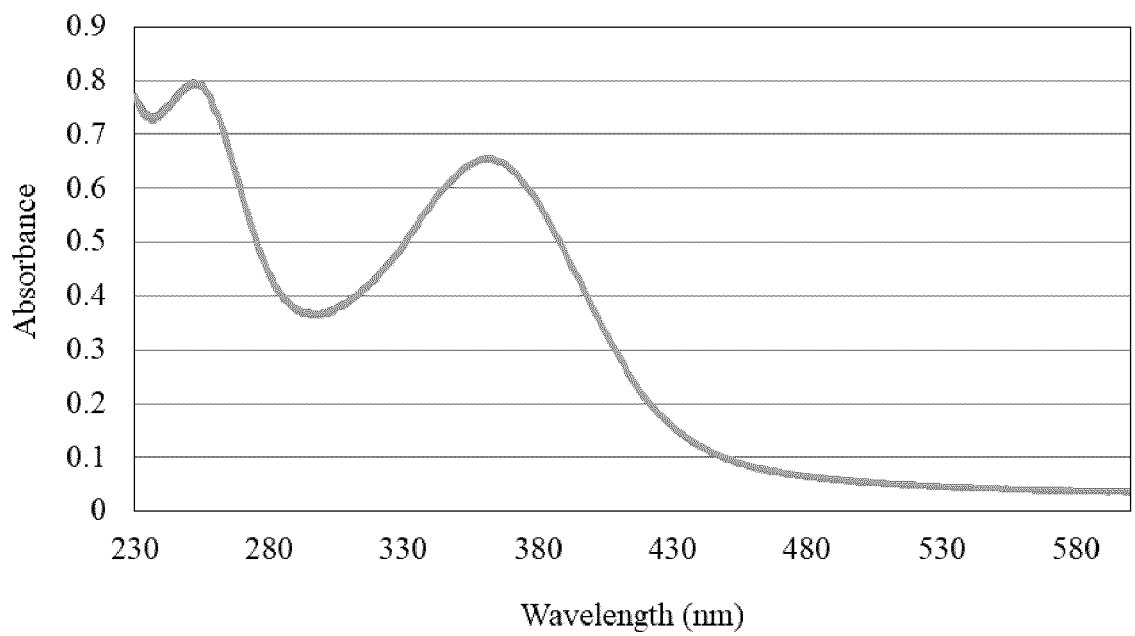
FIG. 11 shows the UV-Vis spectra of the tetrabasic silver diperiodate sodium salt (VM100220-5) at pH 10.5 and room temperature.

The orange crystalline powder (VM261119-1) was recrystallized. RO water (35 g) and sodium tribasic silver diperiodate ($Na_4Ag(IO_{4.5}(OH)_{1.5})_2$; 0.514 g) were mixed with stirring in a 50 mL beaker. The solution was heated to 75° C. to dissolve the sodium salt (pH 10.5). The solution was partially covered with parafilm to promote slow crystal growth over 8 days. Bright orange crystals (VM100220-5) were transferred to a transparent glass scintillation vial which was stored under ambient light and temperature. UV-Visible spectroscopy was performed in triplicate by dissolving the orange crystals (0.0089 g) into 100 mL RO water. The spectra shown exhibited $\lambda_{max}$=252 nm & 362 nm (FIG. 11; $Na_4Ag(IO_{4.5}(OH)_{1.5})_2$).

Example 13

Figure 12:
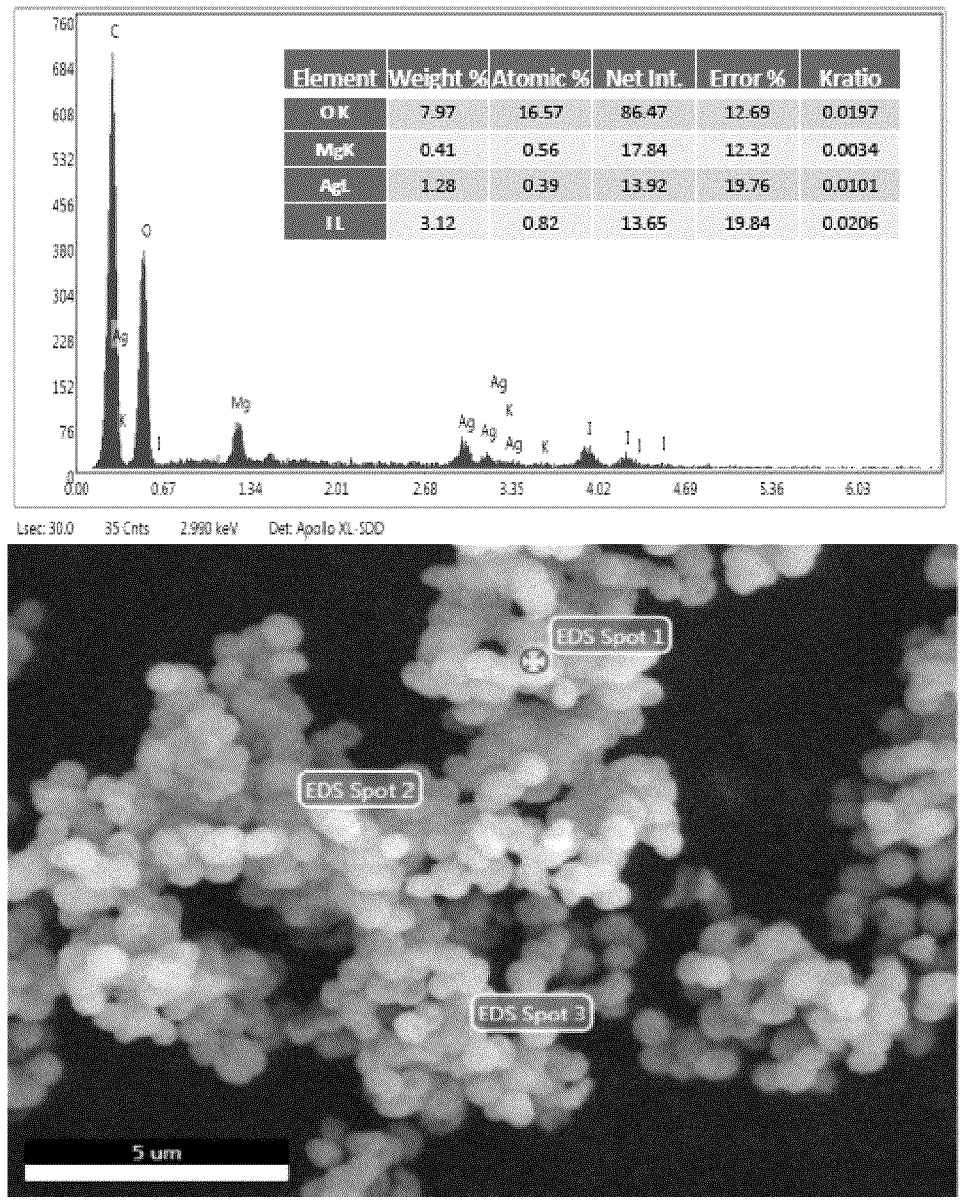
FIG. 12 shows a scanning electron micrograph (SEM) image and energy-dispersive X-ray spectroscopy (EDAX) analysis of tribasic silver diperiodate magnesium salt (VM211119-2, pH 7) captured at 10 kV, 130 Pa at room temperature.

RO water (100.165 g) and silver diperiodate ($K_3Ag(IO_4(OH)_2)_2(H_2O)_4$, 747.05 g/mol, 5.150 g) were mixed with stirring at room temperature in a 250 mL beaker to yield a turbid orange solution. Magnesium nitrate ($Mg(NO_3)_2(H_2O)_6$, 2.530 g) and RO water (2.96 g) were mixed at room temperature in a 50 mL beaker. The magnesium nitrate solution was then added to the DPA solution and left to stir at room temperature for 30 mins. The turbid yellow solution was left to settle (about 2 mins) and the supernatant was decanted and filtered through Whatman 40 ash-less filter paper under vacuum filtration in a Buchner funnel under vacuum. The fine yellow crystals (VM211119-2) were washed with 3×25 mL RO water and 3×15 mL of acetone ($C_6H_6O$ 58.8 g/mol), dried under vacuum for an additional 3 mins, transferred to a weigh boat and dried under air until a steady weight was observed. The fine yellow powder (3.5 g; VM211119-2) was transferred into a transparent glass scintillation vial and stored under ambient light and temperature. SEM was performed in a low vacuum 70-130 Pa, imaging at 5-10 eV, accompanied by EDAX (FIG. 12).

Example 14

Figure 13:
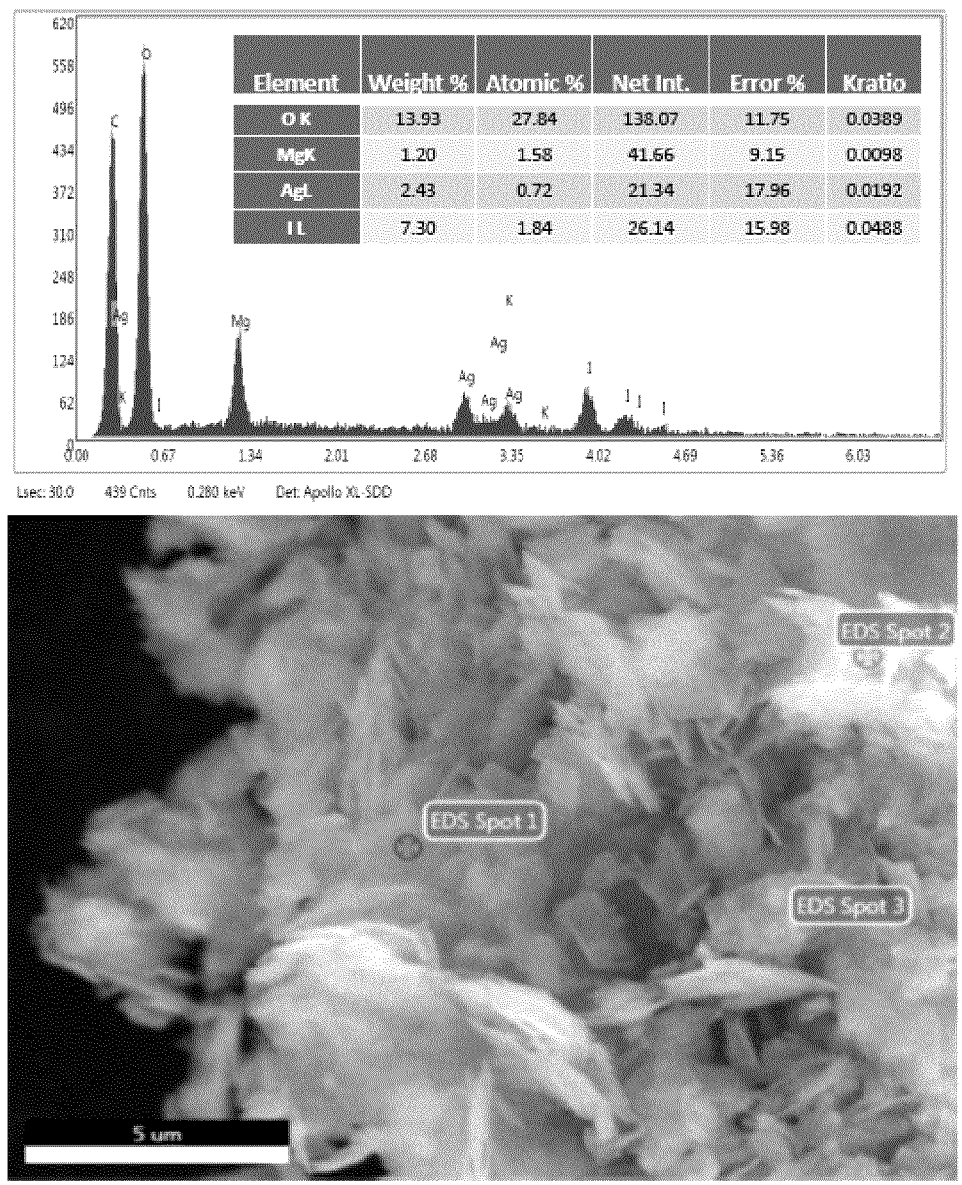
FIG. 13 shows a SEM image and EDAX analysis of tribasic silver diperiodate magnesium salt (VM171019-2, pH 10.5) captured at 10 kV, 130 Pa at room temperature.

RO water (9.539 g) and silver diperiodate ($K_3Ag(IO_4(OH)_2)_2(H_2O)_4$), 747.05 g/mol, 2.504 g) were mixed with stirring at room temperature in a 100 mL beaker. This solution was titrated to pH 10.64 with 2 M KOH in 100 µl aliquots to form a clear red solution. Magnesium nitrate ($Mg(NO_3)_2(H_2O)_6$, 3.086 g) and RO water (5.267 g) were mixed at room temperature in a 50 mL beaker. The magnesium nitrate solution was added to the silver periodate solution and left to stir at room temperature for 30 mins. The turbid light-yellow solution was left to settle (about 2 mins) and filtered through Whatman 40 ash-less filter paper under vacuum filtration in a Buchner funnel. The fine light-yellow powder (VM171019-2) was washed with 3×25 mL RO water and 3×15 mL acetone ($C_6H_6O$ 58.8 g/mol), left under vacuum for an additional 10 mins, and transferred to a weigh boat to dry under air until a steady weight was observed. The light-yellow fine powder (2.664 g; VM171019-2) was transferred into a transparent glass scintillation vial and stored under ambient light and temperature. SEM was performed in a low vacuum 70-130 Pa, imaging at 5-10 eV, accompanied by EDAX (FIG. 13).

Example 15

RO water (9.543 g) and silver diperiodate ($K_3Ag(IO_4(OH)_2)_2(H_2O)_4$), 747.05 g/mol, 2.513 g) were mixed with stirring at room temperature in a 100 mL beaker. The solution was titrated to pH 13.49 with 2 M KOH in 100 µl aliquots to yield a clear red solution after titration. Magnesium nitrate ($Mg(NO_3)_2(H_2O)_6$, 3.087 g) and RO water (3.566 g) were mixed at room temperature in a 50 mL beaker. The magnesium nitrate solution was added to the silver diperiodate solution and left to stir at room temperature for 30 mins. The turbid yellow solution was left to settle (about 2 mins) and filtered through Whatman 40 ash-less filter paper under vacuum filtration in a Buchner funnel. The fine yellow powder (VM161019-2) was washed with 3×25 mL RO water and 3×15 mL acetone ($C_6H_6O$ 58.8 g/mol), run under vacuum for an additional 10 mins, and transferred to a weigh boat to dry under air until a steady weight was observed. The yellow fine powder (2.903 g; VM161019-2) was transferred into a transparent glass scintillation vial and stored under ambient light and temperature.

Example 16

RO water (100.40 g) and silver diperiodate ($K_3Ag(IO_4(OH)_2)_2(H_2O)_4$), 747.05 g/mol, 2.568 g) were mixed with stirring in a 250 ml beaker at 75° C. to yield an orange-red clear solution. Calcium nitrate ($Ca(NO_3)_2(H_2O)_4$, 9.320 g) and RO water (9.504 g) were mixed at room temperature in a 50 mL beaker. The calcium nitrate solution was added to the silver diperiodate solution and left to stir at 75° C. for 30 mins. The turbid red-brown solution was left to settle (about 2 mins) and the supernatant decanted, and filtered through Whatman 40 ash-less filter paper under vacuum filtration in a Buchner funnel under vacuum. The red-brown powder (VM180919-2) was washed 3×45 mL RO water (40° C.) and 3×15 mL acetone ($C_6H_6O$ 58.8 g/mol), left under vacuum for an additional 3 mins, and transferred to a weigh boat to a weight boat to dry under air until a steady weight was observed. The red-brown powder (2.96 g; VM180919-2) was transferred into a transparent glass scintillation vial and stored under ambient light and temperature.

Example 17

RO water (1043 g) and silver diperiodate ($K_3Ag(IO_4(OH)_2)_2(H_2O)_4$), 747.05 g/mol, 55.848 g) were mixed with stirring at 75° C. in a 3 L beaker to yield an orange-red clear solution. Calcium nitrate ($Ca(NO_3)_2(H_2O)_4$, 35.27 g) and RO water (44.30 g) were mixed at room temperature in a 50 mL beaker. The calcium nitrate solution was added to the silver diperiodate solution and left to stir at 75° C. for 30 mins. The turbid red-brown solution was left to settle (about 2 mins) and the supernatant decanted, and filtered through Whatman 40 ash-less filter paper under vacuum filtration in a Buchner funnel under vacuum. The red-brown powder (VM100220-1) was washed 3×200 mL RO water (40° C.) and 3×50 mL acetone ($C_6H_6O$, 58.8 g/mol), left under vacuum for an additional 5 mins, and transferred to a weight boat to dry under air until a steady weight was observed. The red-brown powder (32.791 g; VM100220-1) was transferred into a transparent glass jar and stored under ambient light and temperature.

Figure 14:
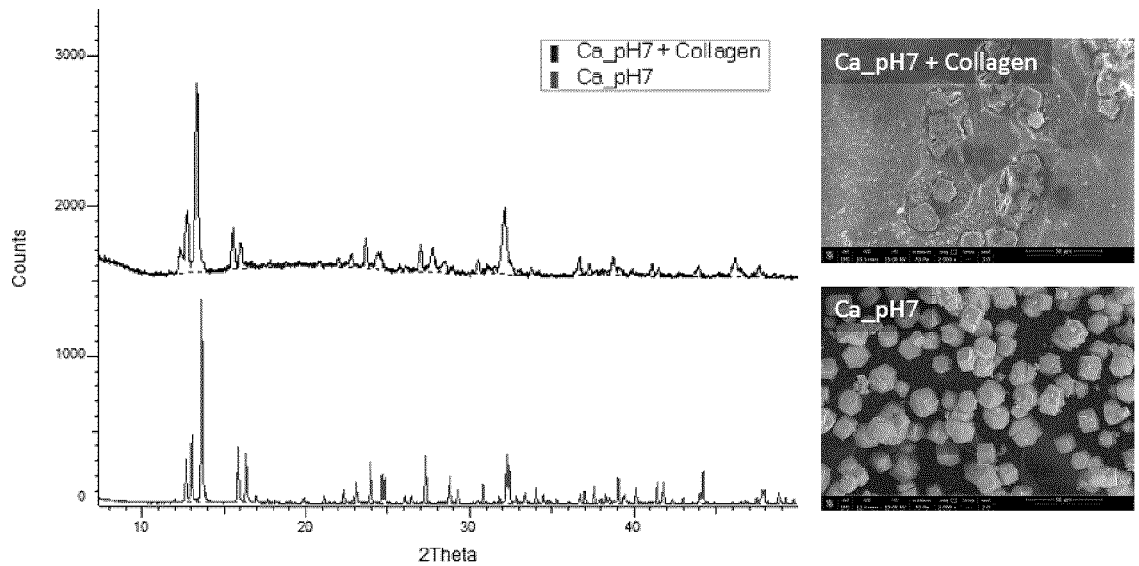
FIG. 14 shows a powder X-ray diffraction (XRD) spectrum of tribasic silver diperiodate calcium salt (VM100220-1, Ca_pH7) powder and subsequent integration into a bovine Type I collagen film (GT270220-7, Ca_pH7+Collagen); and adjacent corresponding SEM images of the tribasic silver diperiodate calcium salt (VM100220-1, Ca_pH7) and collagen film composite (GT270220-7, Ca_pH7+Collagen).

This red-brown powder was integrated into a collagen substrate (GT270220-7). RO water (35.65 g), type I bovine collagen powder (0.328 g) and VM100220 (0.073 g) were mixed with stirring at room temperature for 10 mins in a 50 mL polypropylene tube to yield a pale red-peach suspension. The suspension was removed from the stir plate and left to remain in solution at room temperature for one hour. The tube was vigorously shaken and its contents transferred to a petri dish (100×15 mm). The suspension in the petri dish was transferred to a heated, forced-air drying chamber at 75° C. for 12 hours to dryness to yield a translucent peach film (GT270220-7). The collagen composite films were evaluated by SEM, performed in a low vacuum 70-130 Pa imaging at 5-10 eV, and XRD, Cu Kα 1.54060 A with a divergence slit 0.6 mm, air scatter shield 3 mm, air scatter slit 8 mm, step size 0.010°, step time 42 sec with post-processing including stripping Cu Kα$_2$ (FIG. 14).

Figure 15:
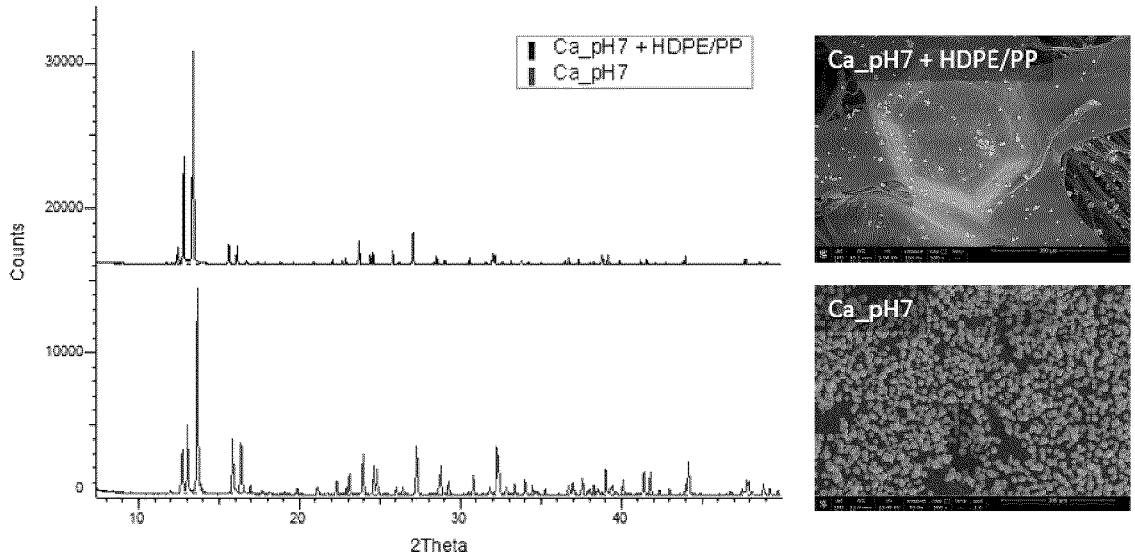
FIG. 15 shows a powder XRD spectrum of tribasic silver diperiodate calcium salt (VM100220-1, Ca_pH7) powder and subsequent integration into a synthetic non-woven substrate (GT221019-1, Ca_pH7+HDPE/PP); and adjacent corresponding SEM images of the tribasic silver diperiodate calcium salt (VM100220-1, Ca_pH7) and non-woven substrate composite (GT221019-1, Ca_pH7+HDPE/PP).

This red-brown powder (VM100220-1) was also integrated into a synthetic non-woven substrate (GT221019-1). RO water (43.231 g) and VM100220 (0.994 g) were mixed with stirring at room temperature in a 50 mL beaker to yield a red-brown suspension. While maintaining rapid stirring, 3.6 ml of this suspension was evenly distributed using a calibrated pipette to 4"×4" polypropylene (PP) non-woven core with high density polyethylene (HDPE) non-contact layer substrates. Pressure was applied to the substrate, using a silicone roller, to evenly distribute and saturate the substrate with the red-brown suspension. The coated substrates were then transferred to a heated, forced-air drying chamber at 75° C. for one hour and 5 mins, rotating the substrates every 10 mins to yield a dark peach substrate (GT221019-1). The coated substrates were evaluated by SEM, performed in a low vacuum 70-130 Pa imaging at 5-10 eV, and XRD, Cu Kα 1.54060 A with a divergence slit 0.6 mm, air scatter shield 3 mm, air scatter slit 8 mm, step size 0.010°, step time 42 sec with post-processing including stripping Cu Kα$_2$ (FIG. 15).

Example 18

RO water (9.540 g) and silver diperiodate ($K_3Ag(IO_4(OH)_2)_2(H_2O)_4$), 747.05 g/mol, 2.564 g) were mixed with stirring at room temperature in a 100 mL beaker. This solution was titrated to pH 10.69 with 2 M KOH with 100 µl aliquots to form a clear red solution. Calcium nitrate ($Ca(NO_3)_2(H_2O)_4$, 1.560 g) and RO water (2.641 g) were mixed at room temperature in a 50 mL beaker. The calcium nitrate solution was added to the silver diperiodate solution and left to stir at room temperature for 20 mins. The turbid orange solution was left to settle (about 2 mins) and filtered through Whatman 40 ash-less filter paper under vacuum filtration in a Buchner funnel. The fine orange powder (VM111019-1A) was washed with 3×25 mL RO water (40° C.) and 3×15 mL acetone ($C_6H_6O$ 58.8 g/mol), left under vacuum for an additional 5 mins to allow crystals, and transferred to a weigh boat to dry under air until a steady weight was observed. The fine orange powder (1.651 g; VM111019-1A) was transferred into a transparent glass scintillation vial and stored under ambient light and temperature.

Example 19

RO water (9.560 g) and silver diperiodate ($K_3Ag(IO_4(OH)_2)_2(H_2O)_4$), 747.05 g/mol, 2.567 g) were mixed with stirring at room temperature in a 100 mL beaker. This solution was titrated to pH 13.50 with 2 M KOH in 100 µl aliquots to yield a clear red solution. Calcium nitrate ($Ca(NO_3)_2(H_2O)_4$, 1.560 g) and RO water (2.641 g) were mixed at room temperature in a 50 mL beaker. The calcium nitrate solution was added to the silver diperiodate solution and left to stir at room temperature for 20 mins. The turbid brown-yellow solution was left to settle (about 2 mins) and filtered through Whatman 40 ash-less filter paper under vacuum filtration in a Buchner funnel under vacuum. The fine brown-yellow crystals (VM111019-1B) were washed with 3×25 mL RO water and 3×15 mL acetone ($C_6H_6O$ 58.8 g/mol), dried for an additional 5 mins under vacuum, and transferred to a weigh boat to dry under air until a steady weight was observed. The yellow-brown powder (1.586 g; VM111019-1B) was transferred into a transparent glass scintillation vial and stored under ambient light and temperature.

Example 20

RO water (100.063 g) and silver diperiodate ($K_3Ag(IO_4(OH)_2)_2(H_2O)_4$), 747.05 g/mol, 5.009 g) were mixed with stirring at room temperature in a 250 mL beaker to yield a red, clear solution. Calcium nitrate ($Ca(NO_3)_2(H_2O)_4$, 9.323 g) and RO water (9.557 g) were mixed at room temperature in a 50 mL beaker. The calcium nitrate solution was added to the DPA solution and left to stir at room temperature for 30 mins. The turbid orange-brown solution was left to settle (about 2 mins), the supernatant decanted, and filtered through Whatman 40 ash-less filter paper under vacuum filtration in a Buchner funnel under vacuum. The orange powder (VM201119-2) was washed with 3×25 mL cold RO water and 3×15 mL of acetone ($C_6H_6O$ 58.8 g/mol), left under vacuum an additional 5 mins, and transferred to a weigh boat to dry under air until a steady weight was observed. The orange powder (3.04 g; VM201119-2) was transferred into a transparent glass scintillation vial and stored under ambient light and temperature.

Example 21

RO water (50.217 g), silver diperiodate ($K_3Ag(IO_4(OH)_2)_2(H_2O)_4$), 747.05 g/mol, 2.523 g) and VM180919-2 (0.057 g) were mixed with stirring at 75° C. in a 250 mL beaker to yield a cloudy dark orange-red solution. Calcium nitrate ($Ca(NO_3)_2(H_2O)_4$, 1.530 g) and RO water (2.007 g) were mixed with stirring in a 100 mL beaker. The calcium nitrate solution was added to the silver diperiodate solution and left to stir at 75° C. for 30 mins. The red brown solution was left to settle (about 2 mins) and the supernatant decanted, and filtered through Whatman 40 ash-less filter paper under vacuum filtration in a large Buchner funnel under vacuum. The red-brown powder (VM211119-1) was washed with 3×25 mL RO water (40° C.) and 3×15 mL acetone ($C_6H_6O$ 58.8 g/mol), left under vacuum an additional 5 mins, and transferred to a weigh boat to dry under air until a steady weight was observed. The red-brown powder (1.49 g; VM211119-1) was transferred into a glass scintillation vial and stored under ambient light and temperature.

Example 22

Figure 16:
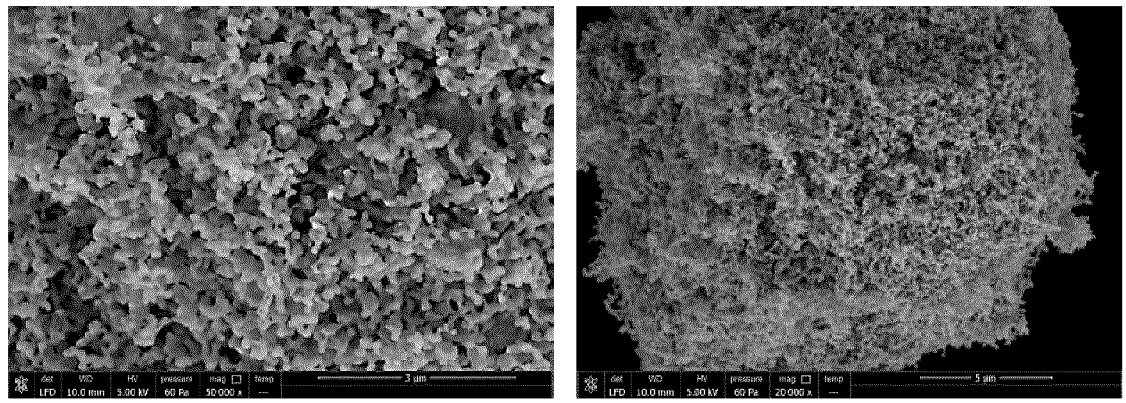
FIG. 16 shows a SEM image of tribasic silver diperiodate barium salt (VM211019-2, pH 7) captured at 10 kV, 130 Pa at room temperature.

RO water (12.253 g) and silver diperiodate ($K_3Ag(IO_4(OH)_2)_2(H_2O)_4$), 747.05 g/mol, 2.50 g) were mixed with stirring at room temperature in a 100 mL beaker. Barium nitrate ($Ba(NO_3)_2$, 2.55 g) and RO water (25.206 g) were mixed with stirring at room temperature in a 50 mL beaker. The barium nitrate solution was added to the silver diperiodate solution. The solution was left to stir at room temperature for 30 mins. The turbid yellow-orange solution was filtered through Whatman 40 ash-less filter paper under vacuum filtration in a Buchner funnel. The orange powder (VM211019-2) was washed with 3×25 mL RO water (40° C.) and 3×15 mL acetone ($C_6H_6O$ 58.8 g/mol), run under vacuum for an additional 10 mins, and transferred to a weigh boat to dry under air until a steady weight was observed. The fine orange powder (2.393 g; VM211019-2) was transferred into a transparent glass scintillation vial and stored under ambient light and temperature. The powder was evaluated by SEM, performed in a low vacuum 70-130 Pa imaging at 5-10 Ev (FIG. 16).

Example 23

Figure 17:
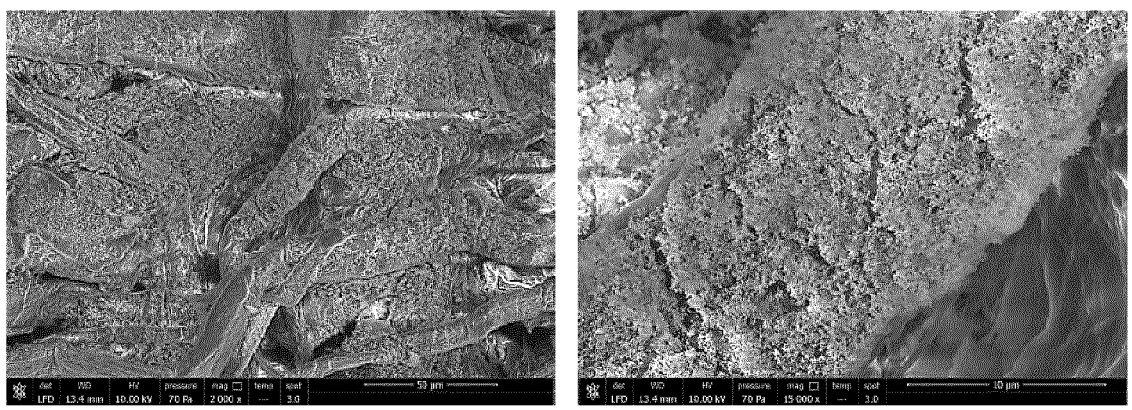
FIG. 17 shows a SEM image of non-woven cellulose-tribasic silver diperiodate barium salt composite (CS270220-3) captured at 10 kV, 130 Pa at room temperature.

RO water (20.197 g) and barium nitrate ($Ba(NO_3)_2$, 1.524 g) were mixed with stirring at room temperature in a 50 mL beaker to yield a clear, colourless solution. RO water (52.415 g) and silver diperiodate ($K_3Ag(IO_4(OH)_2)_2(H_2O)_4$), 747.05 g/mol, 0.983 g) were mixed with stirring at room temperature in a 100 mL beaker to yield a clear deep red solution. Using a calibrated pipette, 0.1 mL of the barium nitrate solution was evenly distributed to ½"×½" cellulose non-woven substrate set in a petri dish. Following 1-minute dwell time, 0.1 mL of the silver diperiodate solution was evenly distributed to the same ½"×½" cellulose non-woven substrate. The substrate was left at room temperature in the petri dish for 10 minutes. The substrate was transferred onto a Whatman 40 ash-less filter paper under vacuum filtration in a Buchner funnel. The substrate was washed with 3×15 mL water and 3×5 mL acetone and left to dry under vacuum for 10 minutes to yield a bright orange non-woven substrate (CS270220-3). The coated substrate was evaluated by SEM, performed in a low vacuum 70-130 Pa imaging at 5-10 eV (FIG. 17).

Example 24

RO water (15.035 g) and silver diperiodate ($K_3Ag(IO_4(OH)_2)_2(H_2O)_4$), 747.05 g/mol, 2.560 g) were mixed with stirring at room temperature in a 100 mL beaker. This solution was titrated to pH 10.77 with 2 M KOH in 100 µL aliquots to yield a clear red solution. Barium nitrate ($Ba(NO_3)_2$, 2.544 g) and RO water (25.376 g) were mixed at room temperature in a 50 mL beaker. The barium nitrate solution was added to the silver periodate solution and left to stir at room temperature for 30 mins. The turbid orange solution was filtered through Whatman 40 ash-less filter paper under vacuum filtration in a Buchner funnel. The orange powder (VM211019-5) was washed with 3×25 mL RO water (40° C.) and 3×15 mL acetone ($C_6H_6O$ 58.8 g/mol), run under vacuum for an additional 10 mins and transferred to a weigh boat to dry under air until a steady weight was observed. The orange coloured fine powder (3.156 g; VM211019-5) was transferred into a transparent glass scintillation vial and stored under ambient light and temperature.

Example 25

RO water (17.138 g) and silver diperiodate ($K_3Ag(IO_4(OH)_2)_2(H_2O)_4$), 747.05 g/mol, 2.536 g) were mixed with stirring at room temperature in a 100 mL beaker. This solution was titrated to pH 13.51 with 2 M KOH in 100 µl aliquots to yield a clear red solution after titration. Barium nitrate ($Ba(NO_3)_2$, 2.536 g) and RO water (30.565 g) were mixed at room temperature in a 50 mL beaker. The barium nitrate solution was added to the silver diperiodate solution and left to stir at room temperature for 30 mins. The turbid orange solution was filtered through Whatman 40 ash-less filter paper under vacuum filtration in a Buchner funnel. The orange powder (VM221019-2) was washed with 3×25 mL RO water and 3×15 mL acetone ($C_6H_6O$ 58.8 g/mol), left under vacuum for an additional 10 mins, and transferred to a weigh boat to dry under until a steady weight was observed. The orange fine powder (3.584 g; VM221019-2) was transferred into a transparent glass scintillation vial and stored under ambient light and temperature.

Additional Disclosures

The following are non-limiting, specific embodiments of the semi-solid composition and methods for preparing and using same:

Embodiment A. A method for preparing an oxidized metal complex comprising: a) providing a first solution comprising a highly oxidized metal and having a pH between 0 to 7; b) providing a second solution comprising one or more ligands or a ligand precursor and having a pH between 7 to 13 or greater; and c) combining the first solution and the second solution to form a third solution comprising the first oxidized metal complex.

Embodiment B. The method of Embodiment A, wherein the third solution has a pH ranging from 7 to 13 or greater.

Embodiment C. The method of Embodiment A or B, further comprising purifying the first oxidized metal complex in solid form from the third solution.

Embodiment D. The method of any one of Embodiments A through C, wherein the pH of the first solution is less than 1.5.

Embodiment E. The method of any one of Embodiments A through D, wherein the first oxidized metal complex is obtained with a yield ranging between about 60% to about 85% or greater.

Embodiment F. The method of any one of Embodiments A through E wherein the first solution is formed by reacting a low oxidation state metal with an oxidizing means in an aqueous solution.

Embodiment G. The method of Embodiment F, wherein the oxidizing means is selected from an oxidizing agent, an electrochemical assembly, or a combination thereof.

Embodiment H. The method of any one of Embodiments F through G, wherein the low oxidation state metal is selected from silver, gold, copper, lead, ruthenium, molybdenum, iron, manganese, cobalt, platinum, lead, osmium, tungsten, nickel, cerium, low oxidation state salts thereof selected from $HCO_3^-$, $BF_4^-$, $CO_3^{2-}$, $NO_3^-$, $ClO_4^-$, $SO_4^{2-}$, $F^-$, $Br^-$, $C_3H_3O_2^-$, $NH_3$, $MnO_4^-$, $NO_2^-$, $BrO_3^-$, $IO_3^-$, $Cr_2O_7^{2-}$, $OH^-$, $ClO_3^-$, $HCO_2^-$, or combinations thereof.

Embodiment I. The method of any one of Embodiments F through H, wherein the concentration of the low oxidation state metal in the aqueous solution ranges from about 0.01 mM to about 2.0 M.

Embodiment J. The method of Embodiment G, wherein the oxidizing agent is selected from a persulfate, permanganate, periodate, perchlorate, peroxide, salt thereof, or combinations thereof, or ozone.

Embodiment K. The method of Embodiment J, wherein the concentration of the oxidizing agent ranges from about 0.01 mM to about 4.0 M.

Embodiment L. The method of any one of Embodiments F through J, wherein the reaction of the low oxidation state metal and the oxidizing agent is conducted at a temperature ranging from about 0° C. to about 100° C. for about 0 minutes to about 90 minutes.

Embodiment M. The method of any one of Embodiments A through L, wherein the highly oxidized metal is selected from silver fluoride, silver bipyridine, silver carbamate, silver pyridinecarboxylic acid, a silver porphyrin, silver biguanide, a silver oxide including AgO, $Ag_2O_2$, $Ag_4O_4$, $Ag_2O_3$, $Ag_3O_4$, $Ag_7O_8X$, wherein X comprises $HCO_3^-$, $BF_4^-$, $CO_3^{2-}$, $NO_3^-$, $ClO_4^-$, $SO_4^{2-}$, $F^-$, or a combination thereof.

Embodiment N. The method of any one of Embodiments A through M, wherein the one or more ligands is selected from a tellurate, iodate, periodate, phosphate, borate, carbonate, ammonium hydroxide, ammonium carbonate, ammonium sulfate, arsenate, dithiocarbamate, aliphatic dithioloate, aromatic dithioloate, selenium ligand, sulfur ligand, ethylenediaminetetraacetic acid, imine ligand, oxime ligand, dimethylglyoxime, macrocylic amine, porphyrin, tetraazacyclohexadiene, pyridine, pyrazine, bipyridyl, phenanthroline, dimethylphosphine, dimethylarsine, dibutylthiourea, ethylenediimine, polypeptide, guanide, biguanide, polyguanide, phosphine, arsine, and combinations thereof.

Embodiment O. The method of Embodiment N, wherein the one or more ligands is selected from an iodate or a periodate.

Embodiment P. The method of Embodiment O, wherein the first oxidized metal complex is a periodate metal complex.

Embodiment Q. The method of Embodiment P, wherein the first oxidized metal complex is a silver periodate complex.

Embodiment R. The method of Embodiment Q, wherein the first oxidized metal complex is potassium silver diperiodate complex.

Embodiment S. The method of any one of Embodiments A through R, wherein the concentration of the one or more ligands ranges from about 0.02 mM to about 4.0 M, and the concentration of the highly oxidized metal ranges from about 0.01 mM to about 2.0 M.

Embodiment T. The method of any one of Embodiments A through S, wherein the reaction of the highly oxidized metal and the one or more ligands is conducted at a temperature ranging from about 0° C. to about 100° C. for about 10 minutes to about 48 hours.

Embodiment U. The method of any one of Embodiments A through T, wherein hydroxide ions are present in the third solution at a concentration ranging from about 0.01 mM to about 11 M.

Embodiment V. The method of any one of Embodiments A through U, further comprising adding an alkali metal, alkaline earth metal, or both to one or more of the first solution, the second solution, and the third solution.

Embodiment W. The method of any one of Embodiments A through V, wherein the alkali metal is selected from lithium, sodium, potassium, rubidium, cesium, francium, or salts thereof selected from $O^{2-}$, $Cl^-$, $Br^-$, $F^-$, $I^-$, $CrO_4^{2-}$, $CN^-$, $PO_2^{3-}$, $S_2O_5^{2-}$, $C_2O_4^{2-}$, $IO_4^-$, $P_2O_7^{4-}$, $SO_4^{2-}$, $B_4O_7^{2-}$, $HCO_3^-$, $BF_4^-$, $CO_3^{2-}$, $NO_3^-$, $ClO_4^-$, $SO_4^{2-}$, $F^-$, $Br^-$, $C_3H_3O_2^-$, $NH_4^-$, $MnO_4^-$, $NO_2^-$, $BrO_3^-$, $IO_3^-$, $Cr_2O_7^{2-}$, $OH^-$, $ClO_3^-$, $HCO_2^-$, or combinations thereof.

Embodiment X. The method of Embodiment W, wherein the first oxidized metal complex is sodium silver diperiodate complex.

Embodiment Y. The method of any one of Embodiments A through V, wherein the alkaline earth metal is selected from beryllium, magnesium, calcium, strontium, barium, radium, or salts thereof selected from $O^{2-}$, $Br^-$, $F^-$, $I^-$, $CrO_4^{2-}$, $CN^-$, $PO_2^{3-}$, $S_2O_5^{2-}$, $C_2O_4^{2-}$, $IO_4^-$, $P_2O_7^{4-}$, $SO_4^{2-}$, $B_4O_7^{2-}$, $HCO_3^-$, $BF_4^-$, $CO_3^{2-}$, $NO_3^-$, $ClO_4$, $SO_4^{2-}$, $F^-$, $Br^-$, $C_3H_3O_2$, $NH_4^-$, $MnO_4^-$, $NO_2^-$, $BrO_3^-$, $IO_3^-$, $Cr_2O_7^{2-}$, $OH^-$, $ClO_3^-$, $HCO_2^-$, or combinations thereof.

Embodiment Z. The method of Embodiment Y, wherein the first oxidized metal complex is selected from calcium silver diperiodate complex, magnesium silver diperiodate complex, or barium silver diperiodate complex.

Embodiment AA. The method of any one of Embodiments A through V, wherein the first oxidized metal complex is a silver diperiodate complex comprising an alkali metal cation and an alkaline earth metal cation.

Embodiment BB. A method for preparing an oxidized metal complex comprising: a) providing a species solution comprising a first oxidized metal complex at a pH of at least pH 11; and b) adjusting the pH of the species solution to form a second oxidized metal complex.

Embodiment CC. The method of Embodiment BB, further comprising adjusting one or more of pH, temperature, concentration, or combinations thereof so that the second oxidized metal complex exhibits one or more desired properties.

Embodiment DD. The method of Embodiment BB or CC, wherein the pH of the species solution is adjusted between pH 2.0 to 11.

Embodiment EE. The method of any one of Embodiments CC through DD, wherein the one or more properties are selected from morphology, crystalline size, stability, rate of dissolution, and flowability.

Embodiment FF. The method of any one of Embodiments BB through EE, wherein the first oxidized metal complex, the second oxidized metal complex, or both are periodate metal complexes.

Embodiment GG. The method of Embodiment FF, wherein the first oxidized metal complex, the second oxidized metal complex, or both are silver periodate complexes.

Embodiment HH. The method of Embodiment GG, wherein the first oxidized metal complex, the second oxidized metal complex, or both are potassium silver diperiodate complexes.

Embodiment II. The method of any one of Embodiments BB through HH, further comprising adding an alkali metal, alkaline earth metal, or both to the species solution before or after pH adjustment, or after isolation of the second oxidized metal complex.

Embodiment JJ. The method of any one of Embodiments BB through II, wherein the alkali metal is selected from lithium, sodium, potassium, rubidium, cesium, francium, or salts thereof selected from $O^{2-}$, $Cl^-$, $Br^-$, $F^-$, $I^-$, $CrO_4^{2-}$, $CN^-$, $PO_2^{3-}$, $S_2O_5^{2-}$, $C_2O_4^{2-}$, $IO_4^-$, $P_2O_7^{4-}$, $SO_4^{2-}$, $B_4O_7^{2-}$, $HCO_3^-$, $BF_4^-$, $CO_3^{2-}$, $NO_3^-$, $ClO_4^-$, $SO_4^{2-}$, $F^-$, $Br^-$, $C_3H_3O_2^-$, $NH_4^-$, $MnO_4^-$, $NO_2^-$, $BrO_3^-$, $IO_3^-$, $Cr_2O_7^{2-}$, $OH^-$, $ClO_3^-$, $HCO_2^-$, or combinations thereof.

Embodiment KK. The method of Embodiment JJ, wherein the oxidized metal complex is sodium silver diperiodate complex.

Embodiment LL. The method of any one of Embodiments BB through II, wherein the alkaline earth metal is selected from beryllium, magnesium, calcium, strontium, barium, radium, or salts thereof selected from $O^{2-}$, $Cl^-$, $Br^-$, $F^-$, $I^-$, $CrO_4^{2-}$, $CN^-$, $PO_2^{3}$, $S_2O_5^{2}$, $C_2O_4^{2}$, $IO_4$, $P_2O_7^4$, $SO_4^2$, $B_4O_7^2$, $HCO_3$, $BF_4$, $CO_3^2$, $NO_3^-$, $ClO_4^-$, $SO_4^2$, $F^-$, $Br^-$, $C_3H_3O_2$, $NH_4$, $MnO_4$, $NO_2$, $BrO_3$, $IO_3^-$, $Cr_2O_7^2$, $OH^-$, $ClO_3^-$, $HCO_2^-$, or combinations thereof.

Embodiment MM. The method of Embodiment LL, wherein the oxidized metal complex is selected from calcium silver diperiodate complex, magnesium silver diperiodate complex, or barium silver diperiodate complex.

Embodiment NN. The method of any one of Embodiments BB-II, wherein the oxidized metal complex is a silver diperiodate complex comprising an alkali metal cation and an alkaline earth metal cation.

Embodiment OO. An oxidized metal complex formed by the method of any one of Embodiments A to NN.

Embodiment PP. A composition comprising the oxidized metal complex formed by the method of any one of Embodiments A to NN, and one or more excipients.

Embodiment QQ. An article of manufacture comprising the oxidized metal complex formed by the method of any one of Embodiments A to NN.

Embodiment RR. An article of manufacture formed by depositing one or more oxidized metal complexes on or within the article of manufacture.

Embodiment SS. The article of manufacture of Embodiment RR, wherein the one or more oxidized metal complexes are deposited by precipitating the one or more oxidized metal complexes on or within the article of manufacture by adjusting the pH of a solution comprising the one or more oxidized metal complexes.

Embodiment TT. The article of manufacture of Embodiment SS, wherein the pH of the solution is adjusted from pH 11 or greater to a pH between 2.0 to 8.5.

Embodiment UU. The article of manufacture of any one of Embodiments SS through TT, wherein the one or more oxidized metal complexes are deposited by immersing the article of manufacture in a solution comprising the one or more oxidized metal complexes, and evaporating the solution.

Embodiment VV. Use of the oxidized metal complex formed by the method of any one of Embodiments A to NN for antimicrobial, antifungal, anti-biofilm, or catalytic activity; acid-base titration; oxidizing activity; or buffering.

Additional embodiments which result from combining, integrating and/or omitting features of the embodiments explicitly described herein are not intended to be precluded.

The embodiments of the invention in which an exclusive property or privilege is claimed are defined as follows:

1. A method for preparing an oxidized metal complex comprising:
   a) providing a species solution comprising a silver periodate complex and having a pH of at least pH 11; and
   b) adjusting the pH of the species solution below pH 11 to form a silver diperiodate complex capable of providing enhanced antimicrobial activity compared to a silver periodate complex formed without performing the adjustment.

2. The method of claim 1, further comprising adjusting one or more of pH, temperature, concentration, or combinations thereof.

3. The method of claim 1, wherein the pH is adjusted between pH 2.0 to 11.

4. The method of claim 1, further comprising adding an alkali metal, alkaline earth metal, or both to the species solution before or after pH adjustment, or after isolation of the silver diperiodate complex.

5. The method of claim 4, wherein the alkali metal is selected from lithium, sodium, potassium, rubidium, cesium, or salts thereof selected from $O^{2-}$, $Cl^-$, $Br^-$, $F^-$, $I^-$, $CrO_4^{2-}$, $CN^-$, $PO_2^{3-}$, $S_2O_5^{2-}$, $C_2O_4^{2-}$, $IO_4^-$, $P_2O_7^{4-}$, $SO_4^{2-}$, $B_4O_7^{2-}$, $HCO_3^-$, $BF_4^-$, $CO_3^{2-}$, $NO_3^-$, $ClO_4^-$, $SO_4^{2-}$, $F^-$, $Br^-$, $C_3H_3O_2^-$, $NH_4^-$, $MnO_4^-$, $NO_2^-$, $BrO_3^-$, $IO_3^-$, $Cr_2O_7^{2-}$, $OH^-$, $ClO_3^-$, $HCO_2^-$, or combinations thereof.

6. The method of claim 5, wherein the oxidized metal complex is sodium silver diperiodate complex.

7. The method of claim 4, wherein the alkaline earth metal is selected from beryllium, magnesium, calcium, strontium, barium, or salts thereof selected from $O^{2-}$, $Cl^-$, $Br^-$, $F^-$, $I^-$, $CrO_4^{2-}$, $CN^-$, $PO_2^{3-}$, $S_2O_5^{2-}$, $C_2O_4^{2-}$, $IO_4^-$, $P_2O_7^{4-}$, $SO_4^2$, $B_4O_7^{2-}$, $HCO_3^-$, $BF_4^-$, $CO_3^{2-}$, $NO_3^-$, $ClO_4^-$, $SO_4^{2-}$, $F^-$, $Br^-$, $C_3H_3O_2^-$, $NH_4^-$, $MnO_4^-$, $NO_2^-$, $BrO_3^-$, $IO_3^-$, $Cr_2O_7^{2-}$, $OH^-$, $ClO_3^-$, $HCO_2^-$, or combinations thereof.

8. The method of claim 7, wherein the oxidized metal complex is selected from calcium silver diperiodate complex, magnesium silver diperiodate complex, or barium silver diperiodate complex.

9. The method of claim 4, wherein the oxidized metal complex is a silver diperiodate complex comprising an alkali metal cation and an alkaline earth metal cation.

10. The method of claim 1, wherein the pH is adjusted below pH 7.

11. The method of claim 5, wherein the oxidized metal complex is potassium silver diperiodate complex.

12. The method of claim 11, wherein the potassium silver diperiodate complex has the formula $K_{5-3}H_{0-2}Ag(IO_5OH)_2$.

13. The method of claim 1, wherein the species solution comprising a silver periodate complex is formed by reacting silver oxynitrate with potassium periodate and potassium hydroxide, and the pH of the species solution is adjusted to below 11 to form a potassium silver diperiodate complex exhibiting enhanced stability.

* * * * *